US012085652B2

(12) United States Patent  
McBurney et al.

(10) Patent No.: US 12,085,652 B2  
(45) Date of Patent: Sep. 10, 2024

(54) MODERNIZED CONSUMER GRADE GNSS SECONDARY CODE ACQUISITION AND SIGNAL TRACKING

(71) Applicant: oneNav, Inc., Sunnyvale, CA (US)

(72) Inventors: Paul McBurney, Palo Alto, CA (US); Nagaraj Shivaramaiah, Fremont, CA (US); Norman Krasner, Redwood City, CA (US); Paul A. Conflitti, Ashland, OR (US); Mark Moeglein, Ashland, OR (US)

(73) Assignee: ONENAV, INC., Sunnyvale, CA (US)

( * ) Notice: Subject to any disclaimer, the term of this patent is extended or adjusted under 35 U.S.C. 154(b) by 0 days.

(21) Appl. No.: 18/243,639

(22) Filed: Sep. 7, 2023

(65) Prior Publication Data

US 2023/0417930 A1   Dec. 28, 2023

Related U.S. Application Data

(63) Continuation of application No. 17/334,477, filed on May 28, 2021, now Pat. No. 11,821,993.

(60) Provisional application No. 62/704,882, filed on Jun. 1, 2020, provisional application No. 62/704,884, filed on Jun. 1, 2020.

(51) Int. Cl.
*H04L 1/00* (2006.01)
*G01S 19/30* (2010.01)
*G01S 19/42* (2010.01)
*G01S 19/46* (2010.01)

(52) U.S. Cl.
CPC ............ *G01S 19/30* (2013.01); *G01S 19/428* (2013.01); *G01S 19/46* (2013.01)

(58) Field of Classification Search
CPC .......... G01S 19/24; G01S 19/30; G01S 19/31; G01S 19/33; G01S 19/37; H04W 24/00; H04B 1/709; H04B 17/07; H04B 1/7075
USPC .................................................. 375/149, 130
See application file for complete search history.

(56) References Cited

U.S. PATENT DOCUMENTS

| | | | |
|---|---|---|---|
| 5,495,499 | A | 2/1996 | Fenton |
| 6,909,738 | B2 | 6/2005 | Akopian et al. |
| 6,922,167 | B2 | 7/2005 | Gerein |
| 7,885,317 | B2 | 2/2011 | Fenton |
| 2009/0213006 | A1 | 8/2009 | Nayyar et al. |
| 2012/0264453 | A1 | 10/2012 | Farmer et al. |
| 2015/0036724 | A1 | 2/2015 | Van Dierendonck et al. |
| 2015/0048973 | A1 | 2/2015 | Whitehead |
| 2015/0054680 | A1 | 2/2015 | Lennen |
| 2015/0288416 | A1* | 10/2015 | Goldberg ................ G01S 19/02 375/149 |

(Continued)

OTHER PUBLICATIONS

Nagaraj Shivaramaiah, Andrew Dempster, and Chris Rizos. "Exploiting the Secondary Codes to Improve Signal Acquisition Performance in Galileo Receivers", Jan. 2008, 9 pages. See http://citeseerx.ist.psu.edu/viewdoc/download?doi=10.1.1.161.5205&rep=rep1&type=pdf.

(Continued)

*Primary Examiner* — Khai Tran  
(74) *Attorney, Agent, or Firm* — WOMBLE BOND DICKINSON (US), LLP

(57) ABSTRACT

Global navigation satellite systems and methods use L5 GNSS signals to acquire secondary code phases of those signals without using L1 GNSS signals to aid in the acquisition of secondary code phases. Various embodiments are described to perform this acquisition.

21 Claims, 57 Drawing Sheets

(56) References Cited

U.S. PATENT DOCUMENTS

2018/0329072 A1* 11/2018 Anderson .............. G01S 19/30
2020/0081132 A1* 3/2020 Soualle ................ G01S 19/256
2022/0137236 A1 5/2022 Conflitti et al.
2024/0094409 A1* 3/2024 Ramakrishnan ........ G01S 19/30

OTHER PUBLICATIONS

Shivaramaiah, N.C; Dempster, A.G. "An analysis of Galileo E5 acquisition strategies", European Navigation Conference (ENC-GNSS), Toulouse, France (2008), 11 pages, DOI: https://doi.org/10.26190/unsworks/700.

International Search Report and Written Opinion of the International Searching Authority for PCT/US21/35258, mailed Oct. 21, 2021, 6 pages.

Leclere, J. et al., "Complexity reduction for high sensitivity acquisition of GNSS signals with a secondary code", Proceedings of the 29th International Technical Meeting of the Satellite Division of The Institute Navigation (ION GNSS+ 2016), Sep. 12, 2016; pp. 436-443; DOI: https://doi.org/10.33012/2016.14753.

Leclere, Landry, Adrianarison, "Efficient GNSS secondary code correlations for high sensitivity acquisition", Conference Paper—Presented at the European Navigation Conference (ENC), Session F3, Lausanne, Switzerland, May 2017.

Leclere, Botteron, "High sensitivity acquisition of GNSS signals with secondary code on FPGAs", IEEE Aerospace and Electronic Systems Magazine, Aug. 2017.

Leclere, Landry Jr., Botteron, "Comparison of L1 and L5 Bands GNSS Signals Acquisition", Sensors 2018, 2779: doi: ~ 10.3390/s18092779, www.mdpi.com/journal/sensors.

Hegarty, C. et al. "Acquisition Algorithms for the GPS L5 Signal", GPS/GNSS 2003—Proceedings of the 16th International Technical Meeting of the Satellite Division of the Institute of Navigation (ION GPS/GNSS 2003), The Institute of Navigation, 8551 Rixlew Lane Suite 360 Manassas, VA, USA, (Sep. 12, 2003), pp. 165-177.

Lin, S. et al. "Inter-block Differentially Coherent Integration for GPS L5 signal acquisition", 2013 IEEE Third International Conference on Information Science and Technology (ICIST), IEEE (Mar. 23, 2013), pp. 1217-1220, DOI: 10.1109/ICIST.2013.6747756.

Extended European Search Report from related EP Application No. 21816701.3, mailed on Jul. 12, 2024, 11 pages.

* cited by examiner

CODE WITHOUT FREQUENCY MODULATION

CODE WITH 10$_{HZ}$ FREQUENCY ERROR

→ Service1 → Service2 → Service3 → Service4 → Service5 → Service6 → Service7 → Service8 → Service9
→ Service10 → Service11 → Service12 → Service13 → Service14 → Service15 → Service16 → Service17 → Service18
→ Service19 → Service20 → Service21 → Service22 → Service23 → Service24 → Service25 → Service26 → Service27
→ Service28 → Service29 → Service30 → Service31 → Service32 → Service33 → Service34 → Service35 → Service36
→ Service37 → Service38 → Service39 → Service40 → Service41 → Service42 → Service43 → Service44 → Service45
→ Service46 → Service47 → Service48 → Service49 → Service50 → Service51 → Service52 → Service53 → Service54
→ Service55 → Service56 → Service57 → Service58 → Service59 → Service60 → Service61 → Service62 → Service63
→ Service64 → Service65 → Service66 → Service67 → Service68 → Service69 → Service70 → Service71 → Service72
→ Service73 → Service74 → Service75 → Service76 → Service77 → Service78 → Service79 → Service80 → Service81
→ Service82 → Service83 → Service84 → Service85 → Service86 → Service87 → Service88 → Service89 → Service90
→ Service91 → Service92 → Service93 → Service94 → Service95 → Service96 → Service97 → Service98 → Service99
→ Service100

FIG. 8U
(Continued)

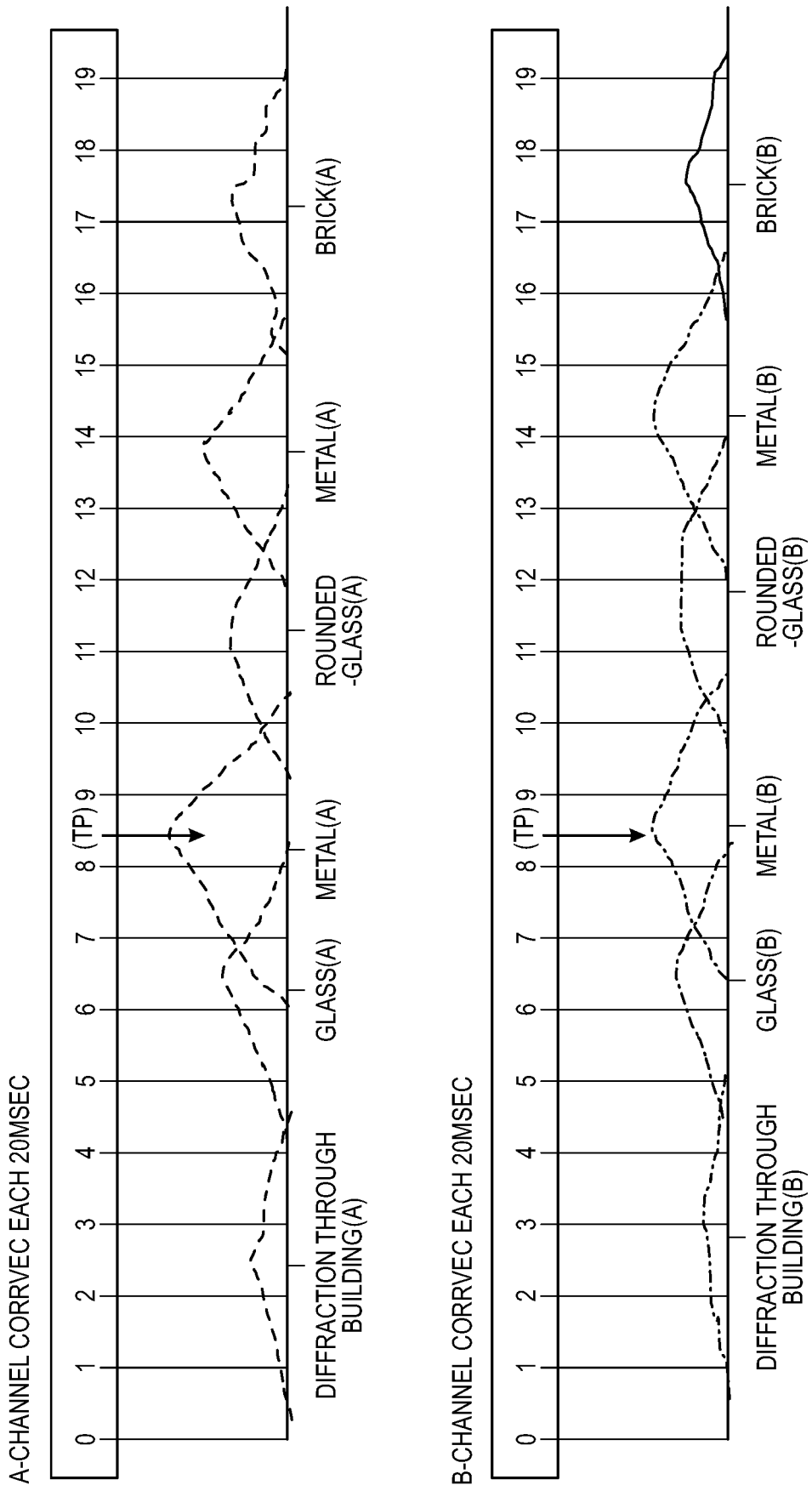

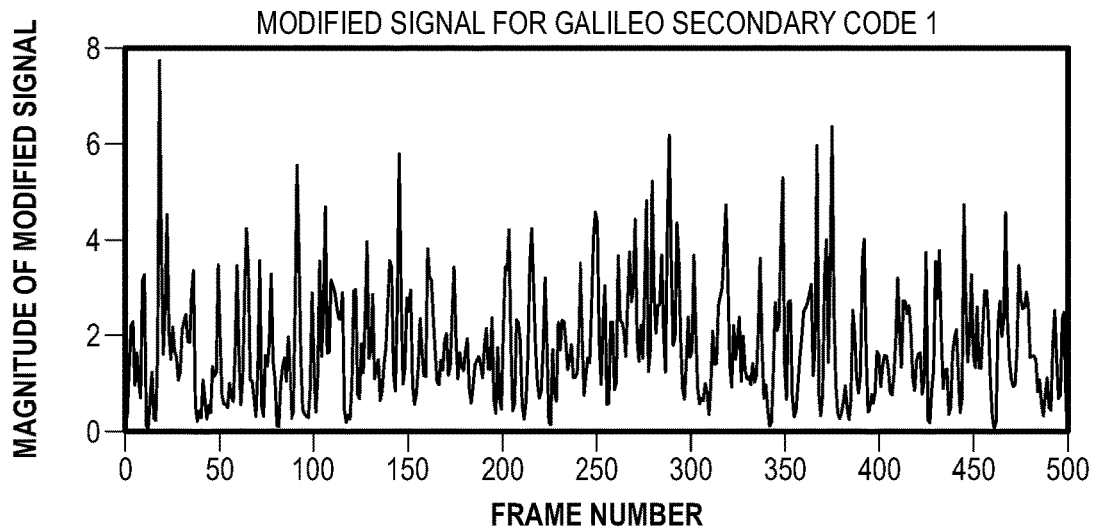
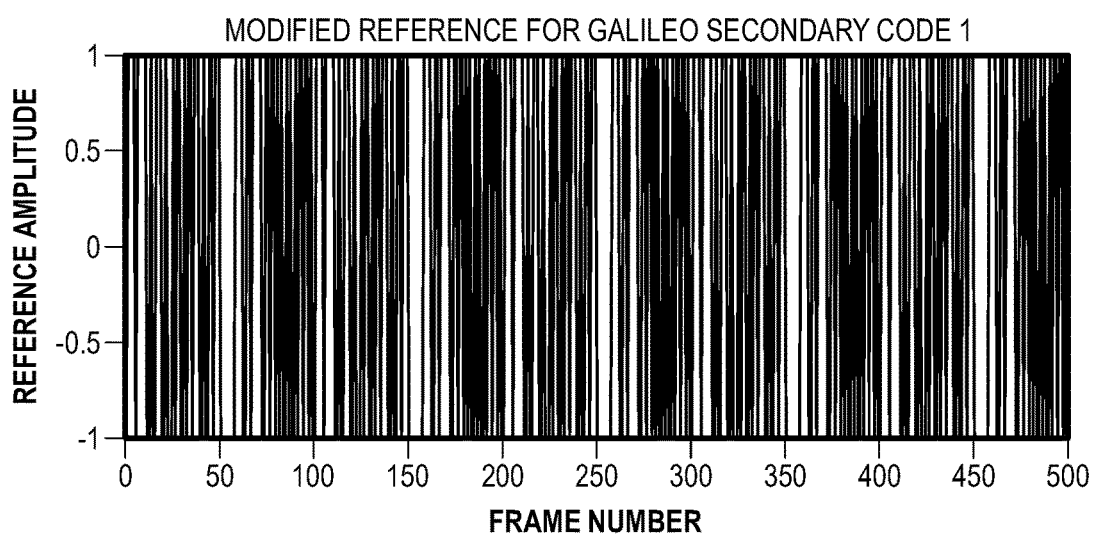
FIGURE 8WW

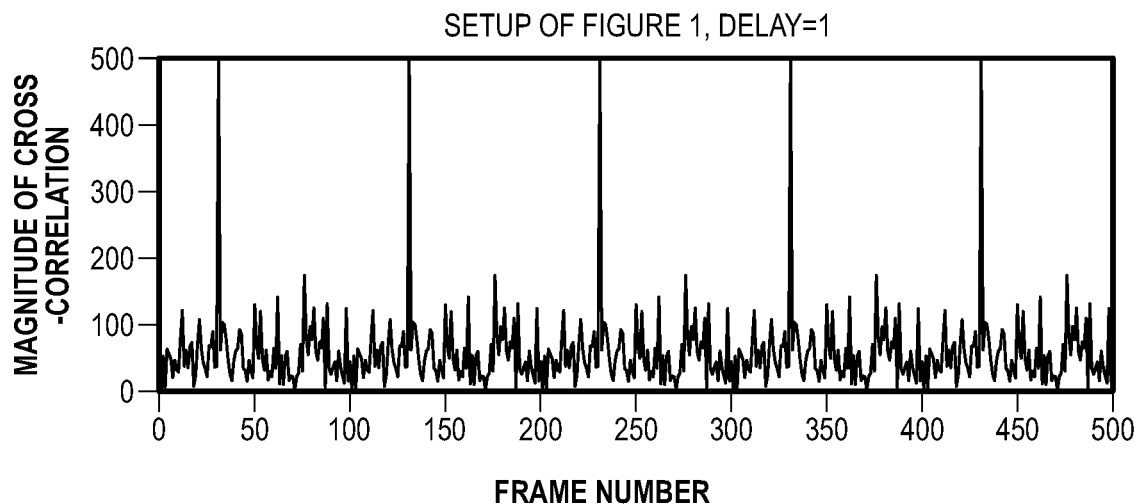
COMPARISON OF RESULTS WITH DELAY=1 AND DELAY=2
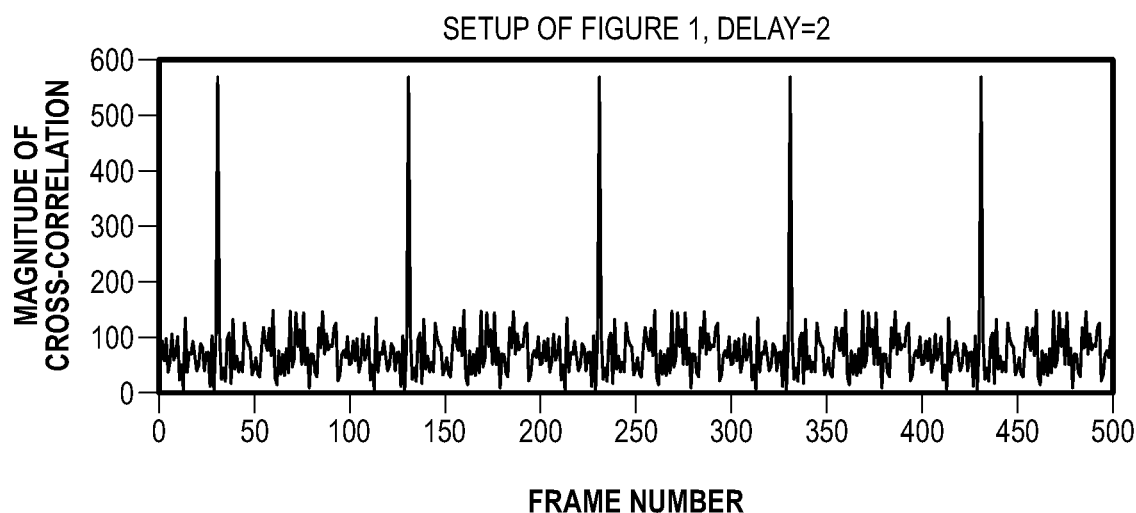
FIGURE 8ZZ

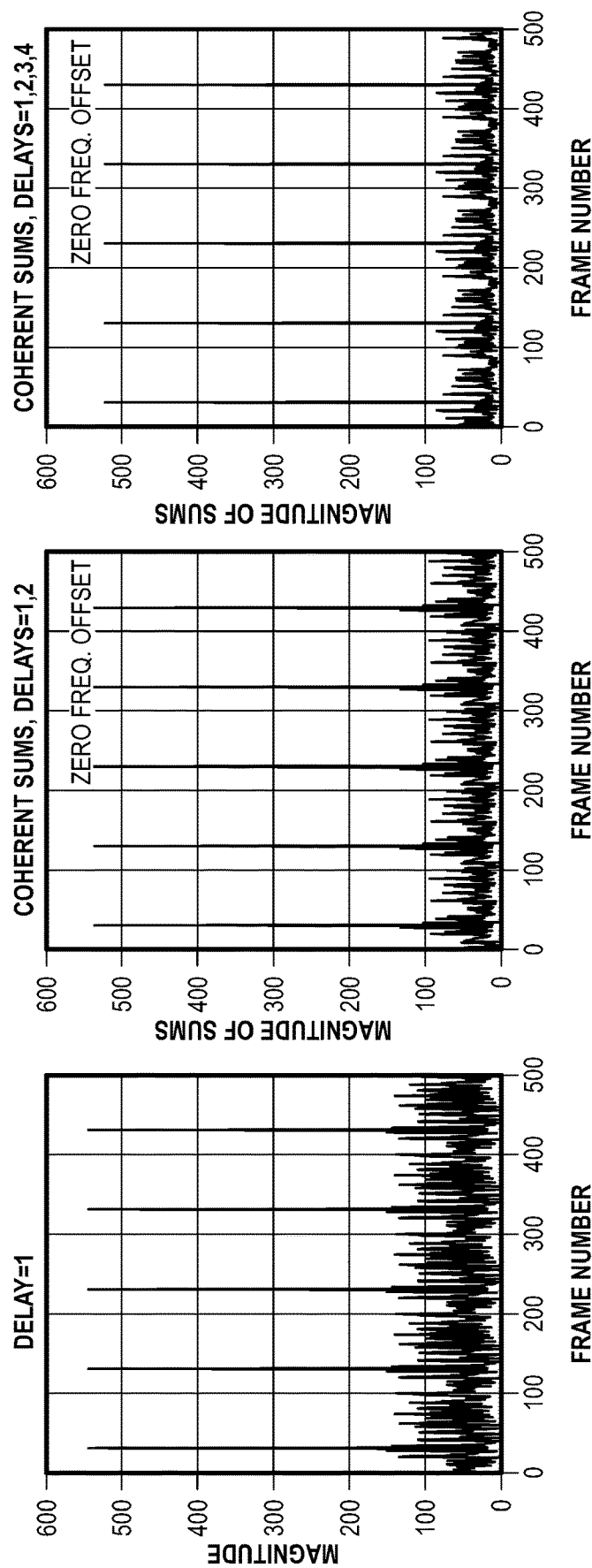
FIGURE 8AAA

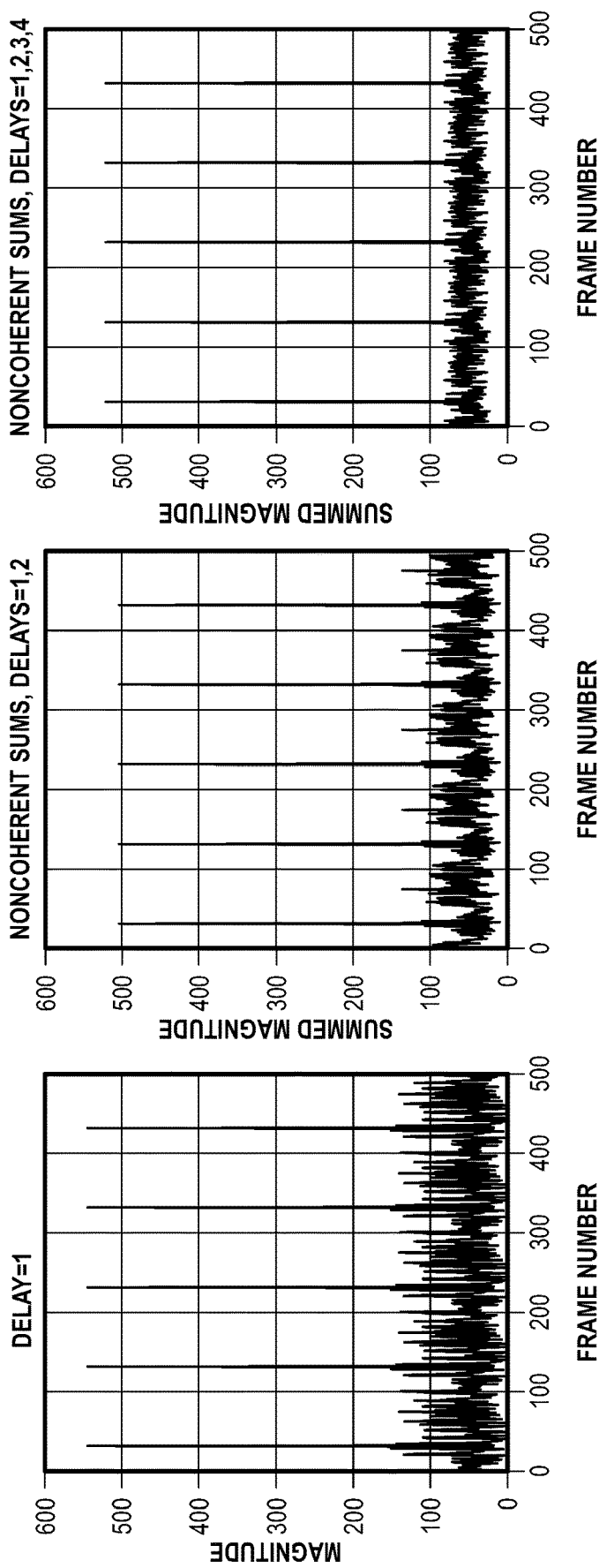
FIGURE 8BBB

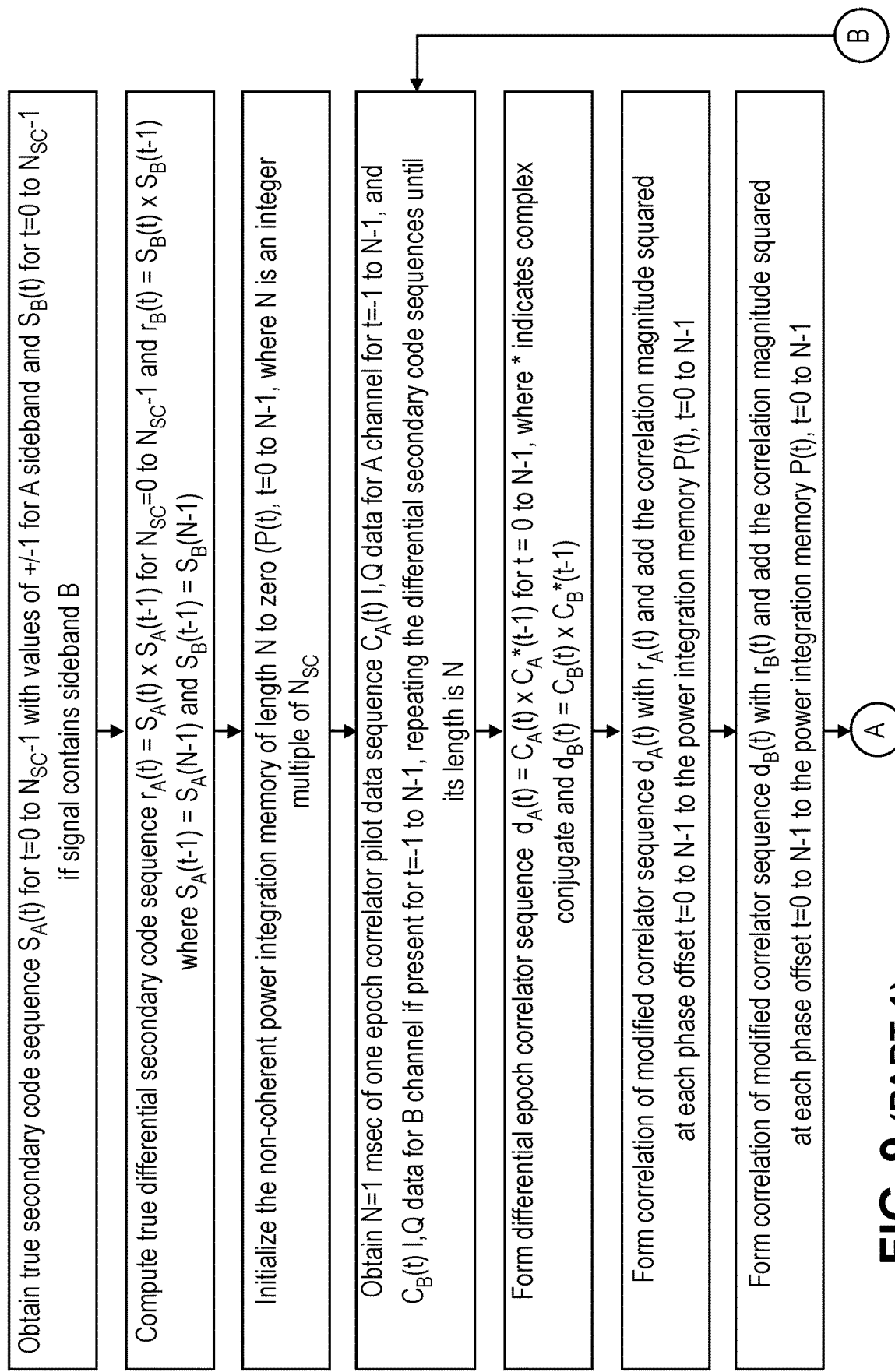
FIG. 9 (PART 1)

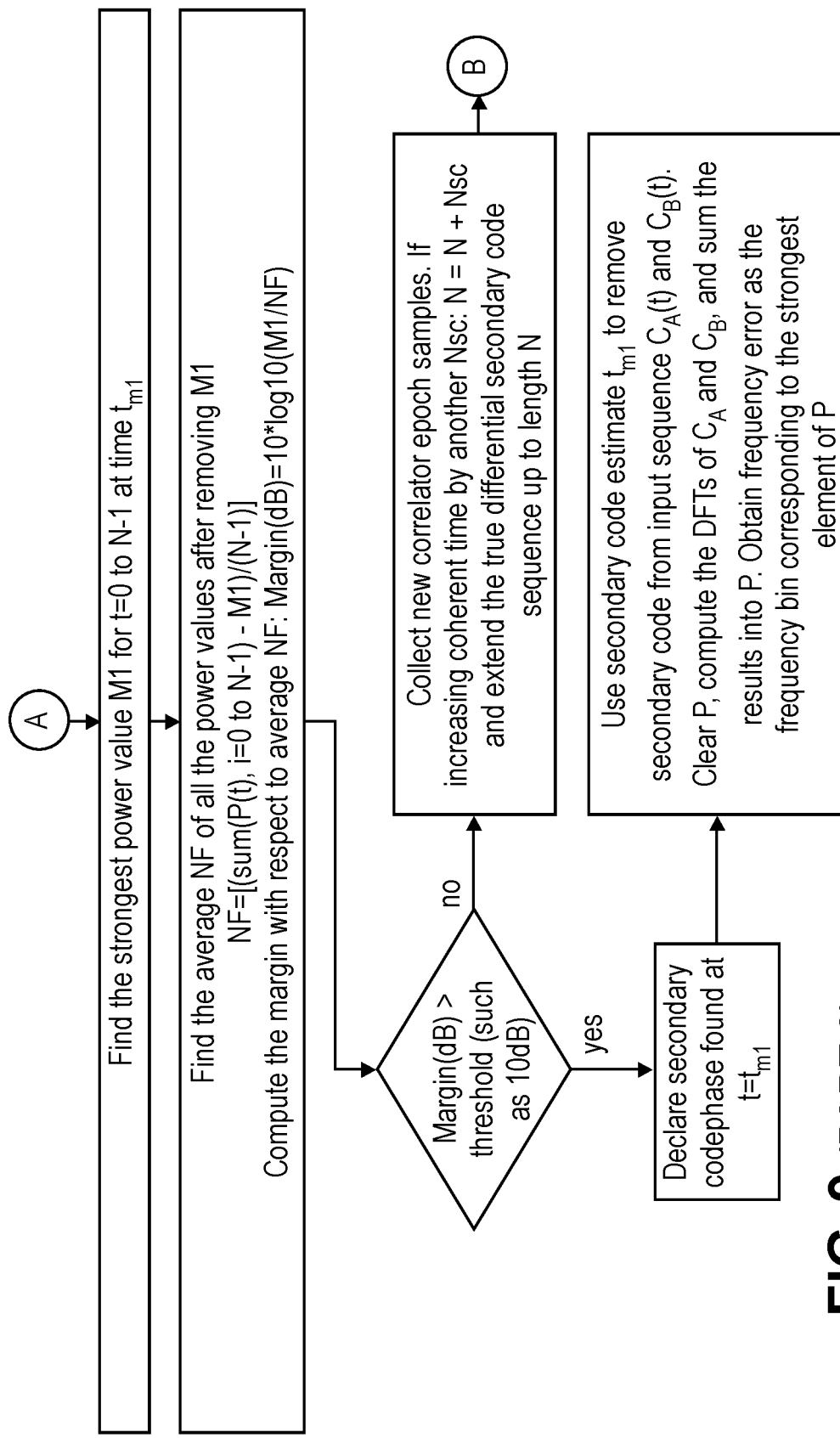
FIG. 9 (PART 2)

MODERNIZED CONSUMER GRADE GNSS SECONDARY CODE ACQUISITION AND SIGNAL TRACKING

This application is a continuation of U.S. patent application Ser. No. 17/334,477, filed on May 28, 2021, which claims the benefit of U.S. Provisional Patent Application No. 62/704,882, filed on Jun. 1, 2020, and U.S. Provisional Patent Application No. 62/704,884, filed on Jun. 1, 2020, and these applications are incorporated herein by reference.

BACKGROUND

This disclosure relates to the field of Global Navigation Satellite Systems (GNSS) and in particular, this disclosure in one embodiment relates to GNSS receivers that use a modern L5 signal in the L5 frequency band. There are numerous GNSS systems that are available, including the United States' GPS (Global Positioning System), GLONASS, Galileo, Beidou, and regional systems that exist or may be deployed in the future. The United States' GPS system was initially available in only the L1 frequency band. Now, the United States' GPS system includes GNSS signals in the L5 band, and the Galileo system includes modernized GNSS signals (such as E5A and E5B) in the L5 band centered at 1191.79 MHz. The modernized GNSS signals in the L5 band provide certain advantages relative to GNSS signals in the L1 band, and some of the advantages are described below. However, the acquisition in a GNSS receiver of L5 band GNSS signals directly without the prior acquisition of L1 GNSS signals in the GNSS receiver has been considered difficult and thus conventional GNSS receivers employ a technique in which the L1 GNSS signals are acquired first. This initial acquisition provides information, such as time information and Doppler estimates, that is used to acquire GNSS signals in the L5 band. Thus, conventional GNSS receivers that support GNSS L5 signals use a radiofrequency front end that receives both L5 and L1 signals; this means there is a duplication of radiofrequency components in these GNSS receivers. Moreover, the conventional receivers must store and use pseudorandom noise (PRN) code sequences for both L1 and L5 GNSS signals.

Modern GNSS signals, such as the GNSS signals from the European Galileo constellation of satellites (SVs), include both primary code sequences and secondary code sequences. Secondary code sequences are overlayed upon primary code sequences, typically by modulo-2 addition. The inclusion of secondary code sequences provide the modern GNSS signals with some advantages relative to older GPS signals that do not include such secondary code sequences. For example, the secondary code sequences can reduce cross correlation between signals received from different satellites; this improves the reliability of the receiving system by reducing false tracking. The secondary code sequences produce a sequence of zero or 180 degree phase shifts that are synchronized to the epochs of the primary code. The secondary code sequence may be long, such as 100 msec as in the case of certain of the Galileo L5 signals. The epochs of the primary code typically occur every 1 msec. This means that a GNSS receiver cannot use coherent integration longer than 1 millisecond (ms or msec) unless the secondary code phase is first determined in the GNSS receiver. If the secondary code is determined, coherent integration may be extended well beyond 1 msec and hence allow the receiver to achieve high sensitivity. However, without such a determination tracking an acquired primary code GNSS signal is difficult. Existing GNSS receivers avoid this problem by acquiring the L1 signals first before attempting to acquire the L5 signals. Such acquisition effectively allows the determination of the phasing of the secondary code associated with the L5 signals, hence circumventing the requirement to determine such phasing by independent means.

SUMMARY OF THE DESCRIPTION

This disclosure includes various aspects and embodiments that provide systems, GNSS receivers, methods and techniques to acquire secondary code phase of GNSS signals, including for example, GNSS receivers that acquire secondary code phase of L5 GNSS signals without using L1 GNSS signals to acquire the secondary code phase of L5 GNSS signals. In one embodiment, such a GNSS receiver comprises: an analog to digital converter (ADC) to generate a digital representation of received GNSS signals in an L5 wideband GNSS frequency band; a baseband sample memory to store the digital representation of the received GNSS signals, the baseband sample memory coupled to the ADC; a GNSS processing system coupled to the baseband sample memory to process the digital representation of the received GNSS signals, the GNSS processing system configured to acquire code phases of one or more secondary codes of one or more GNSS signal components of L5 wideband GNSS signals without using L1 GNSS signals to acquire the code phases of one or more secondary codes of one or more GNSS signal components of L5 wideband GNSS signals. In one embodiment, the system includes only a single GNSS antenna tuned to a frequency in the L5 wideband frequency band and the GNSS receiver does not receive and does not acquire L1 GNSS signals. In one embodiment, the GNSS receiver acquires the code phases of the one or more secondary codes after acquiring one or more primary codes of the GNSS signal components but before narrowband tracking of the GNSS signal components. In one embodiment, a code phase of a first secondary code in the one or more secondary codes is acquired by using multiple GNSS signal components in L5 wideband GNSS signals from a single GNSS satellite (e.g., a GNSS sideband A signal and a GNSS sideband B signal from the same GNSS satellite such as the E5a and E5b signals from the same Galileo GNSS SV). In one embodiment, the GNSS receiver detects phase changes between successive primary code epochs, wherein the phase changes are detected from in-phase and quadrature results of correlation outputs in a GNSS processing system in the GNSS receiver; the GNSS processing system averages the phase changes detected from the in-phase and quadrature results of correlation outputs to produce an estimated frequency error. The GNSS processing system provides a compensated frequency, based on the estimated frequency error, to one or more discriminators of a frequency lock loop (FLL), the FLL configured to reduce error in estimations of frequency of received L5 GNSS signals based on the estimated frequency error. In one embodiment, the FLL comprises a first discriminator for a first sideband of L5 GNSS signals and a second discriminator for a second sideband of L5 GNSS signals, and the estimated frequency error is a filtered estimate based on the averages of the phase changes detected from the in-phase and quadrature results of correlation outputs. In one embodiment, the averages can be over two, three, or four GNSS signal components from a single GNSS SV.

Several different methods, described below, allow a GNSS receiver to acquire secondary code phase of L5 GNSS signals without using L1 GNSS signals. According to one embodiment, a method to acquire secondary code phase of GNSS signals can include the following operations: acquiring one or more primary codes of received L5 GNSS signals; determining, for each transition between received primary code epochs in each of the one or more primary codes of the received L5 GNSS signals, a phase change value for each L5 GNSS signal, wherein a set of phase change values in a sequence over time is determined; storing the set of phase change values in a data structure (e.g., a histogram); comparing the set of phase change values in the data structure to a set of expected phase change values derived from one or more secondary codes associated with the one or more primary codes from one or more GNSS satellites, wherein these primary and secondary codes are further associated with a uniquely identified GNSS satellite and its signal transmissions; and determining, from the comparison, one or more code phases of the one or more secondary codes. In one embodiment, the method can further include the operations of: performing, after a primary code phase and an associated secondary code phase have been determined for components of one of the received L5 GNSS signals, narrowband tracking operations on at least one of the components of the received L5 GNSS signals; determining, based on one or more outputs from the tracking operations, one or more position solutions. Each phase change value represents an indication of a change in phase of the secondary code associated with the primary code from the GNSS satellite that transmitted the primary code, and the operation of determining the phase change values comprises computing a cosine of a value at each transition between two consecutive primary code epochs. The set of expected phase change values are derived from a secondary code by transforming the secondary code into a sequence of phase change values, across epochs in the secondary code, over a set of index values in the data structure. The acquisition of the primary code comprises determining a code phase of the primary code. In one embodiment, the method can further include the operation of: cross checking determined secondary code phases from different channels of L5 GNSS signals from the same GNSS satellite, and the comparing uses the phase change values from the different channels of the same GNSS SV to derive a comparison output that is used to determine one or more secondary code phases.

According to another embodiment, another method to acquire secondary code phase of GNSS signals can include the following operations: receiving GNSS signals from a GNSS satellite containing a first set of secondary codes and a first set of primary codes, the first set of secondary codes including at least a first secondary code having a first length in bits and a second secondary code having a second length in bits, the first length being greater than the second length; correlating coherently, in a first correlation operation, a first set of the received GNSS signals (e.g., from a first Galileo GNSS SV) with locally generated secondary codes corresponding to the first set of secondary codes, the first correlation operation extending over the first length of the first set of received GNSS signals, and the first correlation operation correlating coherently for each value of a set of possible code phase hypotheses and a set of frequencies; correlating coherently, in a second correlation operation that follows the first correlation in time, a second set of the received GNSS signals (e.g., from the first Galileo GNSS SV that were received after the first set of received GNSS signals) with the locally generated secondary codes corresponding to the first set of secondary codes, the second correlation operation extending over the first length of the second set of received GNSS signals, and the second correlation operation correlating coherently for each value of a set of possible code phase hypotheses and over the set of frequencies; combining results from the first correlation operation with results from the second correlation operation; and determining from the combined results one or more secondary code phases for the first set of secondary codes. The first correlation operation and the second correlation operation can be performed using discrete Fourier transforms or hardware correlators. The first set of secondary codes can comprise four secondary codes for four components of GNSS signals from the same GNSS satellite, and the first correlation operation is coherent over the first length for the first set of secondary codes and the second correlation operation is coherent over the first length for the first set of secondary codes. In one embodiment, the combining integrates non-coherently the results from the first correlation operation with results from the second correlation operation. In one embodiment, the first correlation operation includes correlating the first set of the received GNSS signals from a GNSS satellite with locally generated primary codes corresponding to the first set of secondary codes, and wherein the second correlation operation includes correlating the second set of the received GNSS signals (from the GNSS satellite) with the locally generated primary codes corresponding to the first set of secondary codes; the second set of received GNSS signals are received after reception of the first set of received GNSS signals.

According to another embodiment, another method to acquire secondary code phase of GNSS signals can include the following operations: acquiring, over multiple primary code epochs, primary code phases of a plurality of GNSS signals from a plurality of GNSS satellites of at least one GNSS constellation, the acquisition producing a set of correlation values over a set of time intervals of the multiple primary code epochs for the plurality of GNSS satellites, such that for each time interval there are a plurality of correlation values specifying the acquired primary code phases from the plurality of GNSS satellites; evaluating, within each time interval in the set of time intervals, the plurality of correlation values in one of the time intervals to determine a pattern of values, derived from the plurality of correlation values in the time interval, that maximizes a sum of the plurality of correlation values; determining, based on the plurality of GNSS satellites for which primary code phases have been acquired, an expected sequence of phase reversals for secondary codes associated with the primary code phases that have been acquired, the expected sequence determined over the set of time intervals; comparing each determined pattern of values for one of the time intervals with the expected sequence of phase reversals for the secondary codes; and determining, from the comparison, one or more code phases for the secondary codes. A set of discrete Fourier transform operations can be used to acquire the primary code phases. In one embodiment, the plurality of GNSS satellites are from only one GNSS constellation while in another embodiment, the plurality of GNSS SVs are from a plurality of different constellations. In one embodiment, the comparison determines a plurality of code phases for the secondary codes by considering relative delay information across the received GNSS signals from different GNSS satellites and the comparison concurrently determines, at once for all of the different GNSS satellites, the plurality of code phases for the secondary codes. The method can also determine whether the set of intervals is sufficiently large to provide reliable determination of the one or more code phases for the secondary codes.

According to another embodiment, another method to acquire secondary code phase of GNSS signals can include the following operations: determining a secondary code phase of a received GNSS signal from a first GNSS satellite; determining a difference between the determined secondary code phase of the received GNSS signal from the first GNSS satellite and a predicted secondary code phase of a received GNSS signal from a second GNSS satellite which is different than the first GNSS satellite; and correcting the predicted secondary code phase based on the determined difference. The correcting can include: (1) comparing the determined difference to a fraction of a code length in time of an epoch of the secondary code and (2) (a) adding the code length in time to the determined difference if the determined difference is less than the fraction and wrapping a result of the addition within a range of possible values in milliseconds of the code length or (b) subtracting the code length in time from the determined difference if the determined difference is more than the fraction and wrapping a result of the subtraction within a range of possible values in milliseconds of the code length. In one embodiment, the method can further include the operations of: determining additional secondary code phases of other received GNSS signals from other GNSS satellites; determining additional differences between the determined additional secondary code phases and the predicted secondary code phase; and wherein the correcting is based on the determined difference and the additional differences. In one embodiment, the correcting can be based on the highest likelihood difference among the determined difference and the additional differences.

According to another embodiment, another method to acquire secondary code phase of GNSS signals can include the following operations: receiving GNSS signals containing one or more primary codes and one or more secondary codes from a GNSS satellite; generating, from the received GNSS signals, first correlation outputs from an acquisition correlation process that operates on the received GNSS signals, the first correlation outputs including secondary code correlation cycles, over time, of the one or more secondary codes; determining a set of one or more expected secondary code sequences, over time, of the one or more secondary codes; computing a differential secondary code sequence based on the determined set of one or more expected secondary code sequences; computing a set of differential correlation samples based on the first correlation outputs and a complex conjugate of each of the first correlation outputs; correlating the set of differential correlation samples against the differential secondary code sequence to provide a set of second correlation outputs; and determining, from the set of second correlation outputs one or more secondary code phases of the one or more secondary codes. The differential secondary code sequence can be computed based on a product of an expected secondary code sequence and a delayed version of the expected secondary code sequence. The delayed version can be delayed by a fraction of one or more primary code epochs or by a duration of one bit in the secondary code. In one embodiment, the first correlation outputs provide complex data that comprises real part data and imaginary part data, and the complex conjugate operates on the imaginary part data. The correlating can be performed over a plurality of secondary code epochs and can be performed with one or more discrete Fourier transform operations. In one embodiment, the set of second correlation outputs includes a value of a real part of a peak, and the secondary code phase is determined from an absolute value of the real part. In one embodiment, the correlating includes: circularly cross correlating the set of differential correlation samples against the differential secondary code. In one embodiment the correlating can include the following operations: computing a discrete Fourier transform of the set of differential correlation samples to produce a first set of results; computing a discrete Fourier transform of the differential secondary code sequence to produce a second set of results; multiplying the first set of results by a complex conjugate of the second set of results to produce a first product; and computing an inverse discrete Fourier transform of the first product. In one embodiment, the method can further include the operation of: correlating a set of differential correlation outputs against a further delayed differential secondary code, based on the determined set of one or more expected secondary code sequences, to provide a set of third set of correlation outputs that is used to check the set of second correlation outputs.

Another aspect relates to the synthesis of a set of punctual correlation outputs. These synthesized punctual correlation outputs can be used, in one embodiment, to determine an error signal for a discriminator to adjust a carrier phase lock loop to lock to a carrier phase of a GNSS signal that is being tracked during tracking mode of a GNSS receiver. An embodiment according to this aspect can include the following operations: generating a sample clock having a sample clock frequency; determining a set of correlation outputs that include a set of early correlation outputs at the sample clock frequency and a set of late correlation outputs at the sample clock frequency; and synthesizing a set of punctual correlation outputs from at least one of: (a) the set of early correlation outputs or (b) the set of late correlation outputs. The set of punctual correlation outputs can be synthesized in the GNSS receiver during a tracking mode of operation in which a GNSS signal is tracked after having been successfully acquired (by having determined the primary code phase and the secondary code phase of the GNSS signal). In one embodiment, no local punctual code is generated in the GNSS receiver during the tracking mode and no set of punctual correlation outputs is created in a correlator in the GNSS receiver. In one embodiment, the synthesized set of punctual correlation outputs can be used to estimate signal power to normalize a discriminator of a delay lock loop. In one embodiment, a spacing in time between samples for successive early and late correlation outputs for a GNSS signal is a single sample clock separation that is less than a chip in the GNSS signal, and the sample clock frequency can be less than a factor of 3 times an L5 chipping rate of 10.23 MHz. In one embodiment, the spacing is a narrowed code delay that reduces multipath error while maintaining the sample frequency clock frequency at less than a factor of 4 times an L5 chipping rate of 10.23 MHz. In one embodiment, the set of early correlation outputs are a set of very early correlation outputs, and wherein, if a GNSS signal is strong, the synthesized set of punctual correlation outputs is synthesized by multiplying the set of very early correlation outputs by a factor greater than 1. In one embodiment, the synthesizing comprises computing a product of a scale factor and a sum of early and late correlation outputs; the scale factor can be computed to produce, for each synthesized punctual correlation output, a synthesized punctual correlation output that has the same amplitude as a true punctual correlation output when early and late correlation outputs are balanced. In one embodiment, the set of early correlation outputs comprises a set of very early correlation outputs and early correlation outputs, and the set of late correlation outputs comprises a set of very late correlation outputs and late correlation outputs, and wherein the synthesizing comprises averaging, for each synthesized punctual correlation output, a very early correlation output, an early correlation output, a late correlation output, and a very late correlation output. In one embodiment, the set of early correlation outputs comprises a set of very early correlation outputs and early correlation outputs, and the synthesizing comprises averaging, for each synthesized punctual correlation output, a very early correlation output and an early correlation output.

In one embodiment, the set of punctual correlation outputs is synthesized for an Altboc formatted signal in a C channel of GNSS signals, and the set of punctual correlation outputs uses known predetermined phase offsets between correlations that are beyond a main peak of an Altoboc correlation. There can be one or more secondary peaks beyond the main peak that have a different phase than the main peak.

In one embodiment, the synthesized set of punctual correlation outputs can be used to adjust a carrier phase lock loop, and a carrier phase for the carrier phase lock loop is generated with a synthesized punctual correlation that averages multiple correlations so as to produce a carrier phase estimate with reduced carrier multipath than the multipath at a correlator between the early and late correlators. This averaging tends to favor the earlier correlations so as to produce a carrier phase estimate with reduced carrier multipath than the multipath at a correlator between the early and late correlators.

The aspects and embodiments described herein can include non-transitory machine readable media that can store executable computer program instructions that when executed cause one or more data processing systems (e.g., a GNSS processing system in a GNSS receiver) to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of GNSS receivers or data processing systems that are built or programmed to perform these methods. For example, a data processing system can be built with hardware logic to perform these methods or can be programmed with a computer program to perform these methods and such a data processing system can be considered a system that processes GNSS signals or a GNSS receiver.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

FIG. 9 is a flowchart that shows a more detailed method of the embodiment shown in FIG. 6.

DETAILED DESCRIPTION

Figure 1:
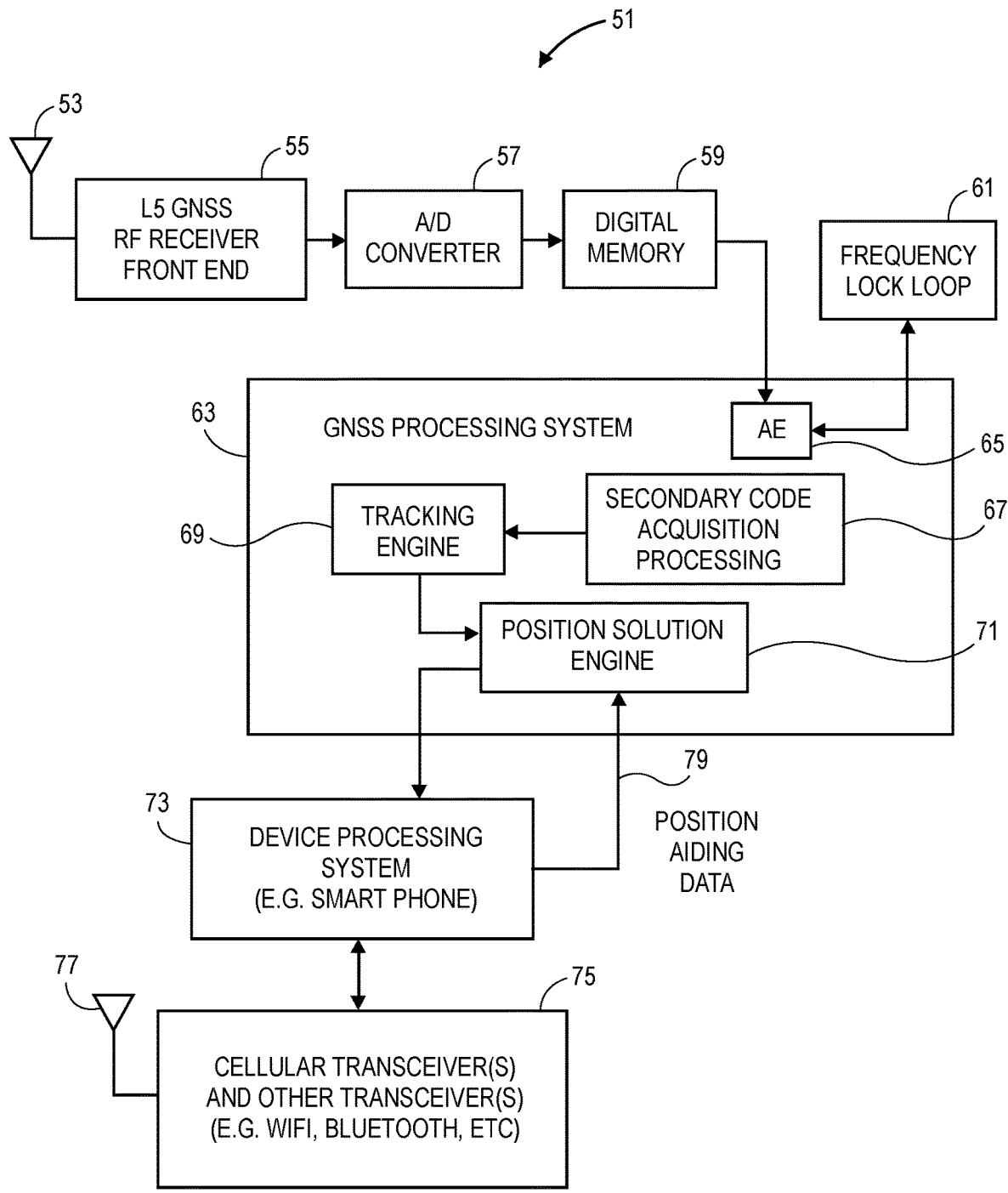
FIG. 1 shows an example of a device (e.g., a smart phone) containing a GNSS receiver according to one or more embodiments described herein.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

This disclosure describes various embodiments of GNSS (Global Navigation Satellite System) methods, apparatuses, systems, and non-transitory machine readable media, such as methods used in GNSS receivers, GNSS receivers, components within such receivers and non-transitory machine readable media that store executable computer program instructions which when executed in one or more processing systems in a GNSS receiver can perform one or more of the methods described in this disclosure. This description provides examples of various embodiments that can be combined in various ways as noted below; for example, one method of acquiring secondary codes of GNSS signals can be combined with another method of acquiring secondary codes of GNSS signals. For example, one such method can be used for strong GNSS signals and another such method can be used for weak GNSS signals. Thus, the embodiments are not mutually exclusive and can be combined. This description provides non-limiting examples and should not be construed as requiring, in all instances of possible implementations, all features described. All systems and methods can be practiced from all suitable combinations of the various aspects and embodiments disclosed in the description below. It will be evident that various modifications may be made to those aspects and embodiments without departing from the broader spirit and scope set forth in the following claims and the enumerated exemplary embodiments that precede the claims. This description is, accordingly, to be regarded in an illustrative sense rather than a restrictive sense.

The embodiments described herein can use one or more GNSS receiver architectures (or components, methods or portions of such architectures) described in U.S. provisional patent application No. 62/915,510, filed Oct. 15, 2019 by Paul Conflitti, et. al., and this provisional patent application is hereby incorporated herein by reference. Further, the embodiments described herein can use one or more GNSS receiver architectures (or components, methods or portions of such architectures) described in U.S. patent application Ser. No. 17/068,659, filed Oct. 12, 2020 by Paul Conflitti, et. al., and this patent application is hereby incorporated herein by reference.

FIG. 1 shows a general example of a device 51 that includes a GNSS receiver that can use or implement one or more embodiments described herein. These embodiments can also be used or implemented in devices that include fewer components (e.g., no cellular transceiver, no other transceiver, etc.). In one embodiment, the device 51 is a smart phone or tablet computer or laptop computer or is part of a vehicle (e.g., automobile) or is part of a wearable device or accessory (e.g., a fitness watch or smart watch or head mounted display, etc.). In an alternative embodiment, the device 51 is a simple GNSS receiver that does not include the transceivers 75. The GNSS receiving elements in the device 51 includes a GNSS antenna 53, an L5 GNSS radio frequency (RF) front end 55, an analog-to-digital (A/D) converter 57, baseband digital memory 59, a frequency lock loop (FLL which may be implemented as a phase lock loop), and a GNSS processing system 63. The GNSS antenna 53 can be a conventional GNSS antenna or a GNSS antenna that is tuned to the L5 GNSS band. Received GNSS signals from the antenna 53 can be amplified and filtered in the L5 GNSS RF front end 55 which can include at least a first RF filter that is tuned to only a frequency in the L5 wideband frequency band and a low noise amplifier. In another embodiment, the RF front end can be conventional GNSS RF front end. The U.S. patent application Ser. No. 17/068,659, filed Oct. 12, 2020, provides examples of RF front ends that can be used as the RF front end 55. The processed RF GNSS signals are output by the RF front end 55 and provided as an input to the A/D converter 57 (which can be a conventional A/D converter used for GNSS signals). The A/D converter 57 digitizes the received GNSS signals and causes them to be stored in the baseband digital memory 59; the digitized GNSS signals in the memory 59 are then processed by the GNSS processing system 63. The digitized GNSS signals are, in one embodiment, only L5 GNSS signals (no L1 GPS signals and no L1 GNSS signals). In one embodiment, the GNSS receiver in device 51 does not receive and does not acquire L1 GNSS signals. In one embodiment, the GNSS receiver in device 51 does not use L1 GNSS signals to aid in the acquisition of secondary codes in L5 GNSS signals.

The GNSS processing system 63 in FIG. 1 can include an acquisition engine (AE) 65, a secondary code processing system 67, a tracking engine 69, and a position solution engine 71. The acquisition engine 65 can be the same as one of the acquisition engines described in U.S. application Ser. No. 17/068,659, filed Oct. 12, 2020. This acquisition engine 65 can acquire the primary codes in GNSS signals from a plurality of L5 GNSS SVs (such as SVs from: a Galileo E5 constellation of GNSS satellites; or an L5 GPS constellation of GNSS satellites; or a Glonass K2 constellation of GNSS satellites; or a QZSS constellation of GNSS satellites; or a Beidou B2 constellation of GNSS satellites). The acquisition engine 65 and the tracking engine 69 can use the frequency lock loop (FLL) 61 to maintain a lock to the carrier phase of the GNSS signals as is known in the art. The methods described herein also include methods that use the FLL with synthesized punctual correlation outputs. The tracking engine 69 can use techniques known in the art to track acquired GNSS signals, and the position solution engine 69 can be a conventional position solution engine that uses techniques known in the art to compute position solutions based on pseudoranges and GNSS SV ephemeris data from the tracking engine 69 and other data available to the position solution engine 69. The secondary code acquisition processing system 67 can use one or more of the methods (see, e.g., FIGS. 2-6) described herein to acquire secondary code phase from L5 GNSS signals (normally done after the primary code phases have been acquired by the AE 65 but before narrowband tracking of the GNSS signal components in the tracking engine 69). The secondary code acquisition processing system 67 can be implemented in hardware logic and circuitry or can be implemented in programmable logic such as a digital processing system that executes one or more computer programs or can be implemented in a combination of hardware logic and circuitry and programmable logic. The secondary code acquisition processing system 67, in one embodiment, acquires the secondary code phases of L5 GNSS signals without using L1 GNSS signals to acquire those secondary code phases.

The device 51 in FIG. 1 also includes a device processing system 73 that can include most or all of the components found in a smartphone including an application processing system with DRAM and flash memory and a set of sensors, such as accelerometers, compass, gyros, cameras, proximity sensors, etc. The device processing system 73 can also include a baseband processing system for controlling the cellular transceiver 75, and the device processing system is coupled to the cellular transceiver 75. The cellular transceiver 75 is coupled to one or more antennas, such as antenna 77, to provide wireless voice and data communication with a cellular telephone network. The cellular transceiver 75 can also include other wireless transceivers, such as transceivers for WiFi networks, Bluetooth, etc. The transceiver 75 can be used to provide assistance data or position aiding data 79 (e.g., estimated Doppler data for GNSS SVs in view of the GNSS receiver based on an approximate location of the GNSS receiver, SV ephemeris data, etc.) to the GNSS receiver; the use of such position aiding data is known in the art, including many US patents issued to SnapTrack, Inc. of California.

In the methods described below, the secondary code acquisition processing system 67 in FIG. 1 can acquire code phases of secondary codes of L5 GNSS signals while a time uncertainty exceeds 0.5 milliseconds; for example, the estimated error for current time can exceed 1 millisecond, in one embodiment, prior to acquiring the code phases of one or more secondary codes of L5 GNSS signals. When a set of acquired code phases from the different methods described below provide consistent, similar values (e.g., their code phase measurements are essentially the same), this verifies that the uncertainty or estimated error for current time is less than 0.5 msec. The secondary code acquisition processing system 67 in one embodiment as described below can acquire a code phase of a secondary code by using multiple GNSS signal components in L5 wideband GNSS signals from a single GNSS satellite (e.g., E5a GNSS signal and E5b signal from the same SV). The secondary code acquisition processing system 67, in one embodiment described below, can acquire a code phase of a secondary code using multiple GNSS signals from multiple GNSS SVs.

The GNSS receiver in device 51 can use detected phase changes between successive primary code epochs to generate a compensated frequency used in the FLL 61 to reduce errors in estimating frequency of received L5 GNSS signals. For example, the GNSS processing system 63 can detect phase changes between successive primary code epochs, the phase changes detected from in-phase and quadrature results of correlation outputs in the GNSS processing system; the GNSS processing system 63 can average the phase changes detected from the in-phase and quadrature results of correlation outputs to produce an estimated frequency error. The GNSS processing system 63 can provide a compensated frequency, based on the estimated frequency error, to one or more discriminators of the FLL 61, and the FLL 61 can be configured to reduce error in estimations of frequency of received L5 GNSS signals based on the estimated frequency error. In one embodiment, the FLL 61 can include a first discriminator for a first sideband of L5 GNSS signals (e.g., an E5a signal) and a second discriminator for a second sideband of L5 GNSS signals (e.g., an E5b signal), and wherein the estimated frequency error is a filtered estimate based on the averages of the phase changes detected from the in-phase and quadrature results of correlation outputs. In one embodiment, the averaging comprises averaging phase changes detected over two, three, or four GNSS signal components from a single GNSS satellite, and the FLL 61 detects phase changes between successive primary code epochs. The use of multiple signal components from the same GNSS SV can improve the accuracy and reliability of the FLL 61.

A method for acquiring secondary code phases of secondary codes in L5 GNSS signals will now be described while referring to FIG. 2. The method shown in FIG. 2 can create a data structure, such as a histogram, that can be used to determine secondary code phases of secondary codes in L5 GNSS signals that are received by a GNSS receiver, such as the GNSS receiver shown in FIG. 1. In operation 101 in FIG. 2, a GNSS receiver can acquire one or more primary codes of received L5 GNSS signals; for example, in the case of the GNSS receiver shown in FIG. 1, the AE 65 can acquire these primary codes; the acquisition of a primary code includes identifying the GNSS SV that transmitted the primary code and determining the code phase of the received primary code. Then in operation 103 the GNSS receiver can determine, for each transition between received primary code epochs, a phase change value for each acquired GNSS signal and generate a set of phase change values in a sequence over time represented by a sequence of time bins (with at least one phase change value in each time bin that represents a portion of time in the sequence over time). Each phase change value (e.g., a 1 or a zero) represents a decision about whether a change in angular phase (e.g., a quantized change from 0 degrees to 180 degrees or a quantized change from 180 degrees to 0 degrees) occurred in a particular time bin for the secondary code associated with the primary code from the GNSS satellite that transmitted the primary code. This decision can be represented by a binary value that represents whether a 180 degree angular phase change occurred within each of the time bins, and each phase change value can be expressed as one of the binary values. This set of phase change values can then be stored in operation 105 in a data structure, such as a histogram (which can be visualized with time bins along the x axis and counts of 180 degree angular phase change events in the y axis). The set of phase change values stored in the data structure can then be compared, in operation 107, to a set of expected phase change values derived from secondary codes associated with the acquired primary code (from operation 101) in the GNSS signals from the GNSS SV. Each primary code from an identified GNSS SV (identified by acquiring its primary code phase) will have an associated secondary code with known angular phase changes relative to the primary code. The comparison in operation 107 allows the GNSS receiver to determine, in operation 109, a secondary code phase for each GNSS signal that was processed using operations 101, 103, 105, and 107. For example, the method shown in FIG. 2 can be used on the E5a and E5b signals from the same GNSS SV to determine the secondary code phase of the E5a GNSS signal and the secondary code phase of the E5b GNSS signal from the same GNSS SV. In one embodiment, the method can cross check the results of the secondary code phase from these different channels of L5 GNSS signals from the same GNSS SV. After operation 109, the GNSS receiver has acquired the primary and secondary code phases for a GNSS signal and can proceed to track, using narrowband tracking in operation 111, the GNSS signals to derive pseudoranges using techniques known in the art. Then in operation 113, the GNSS receiver can determine one or more position solutions based on the tracked GNSS signals.

Figure 2:
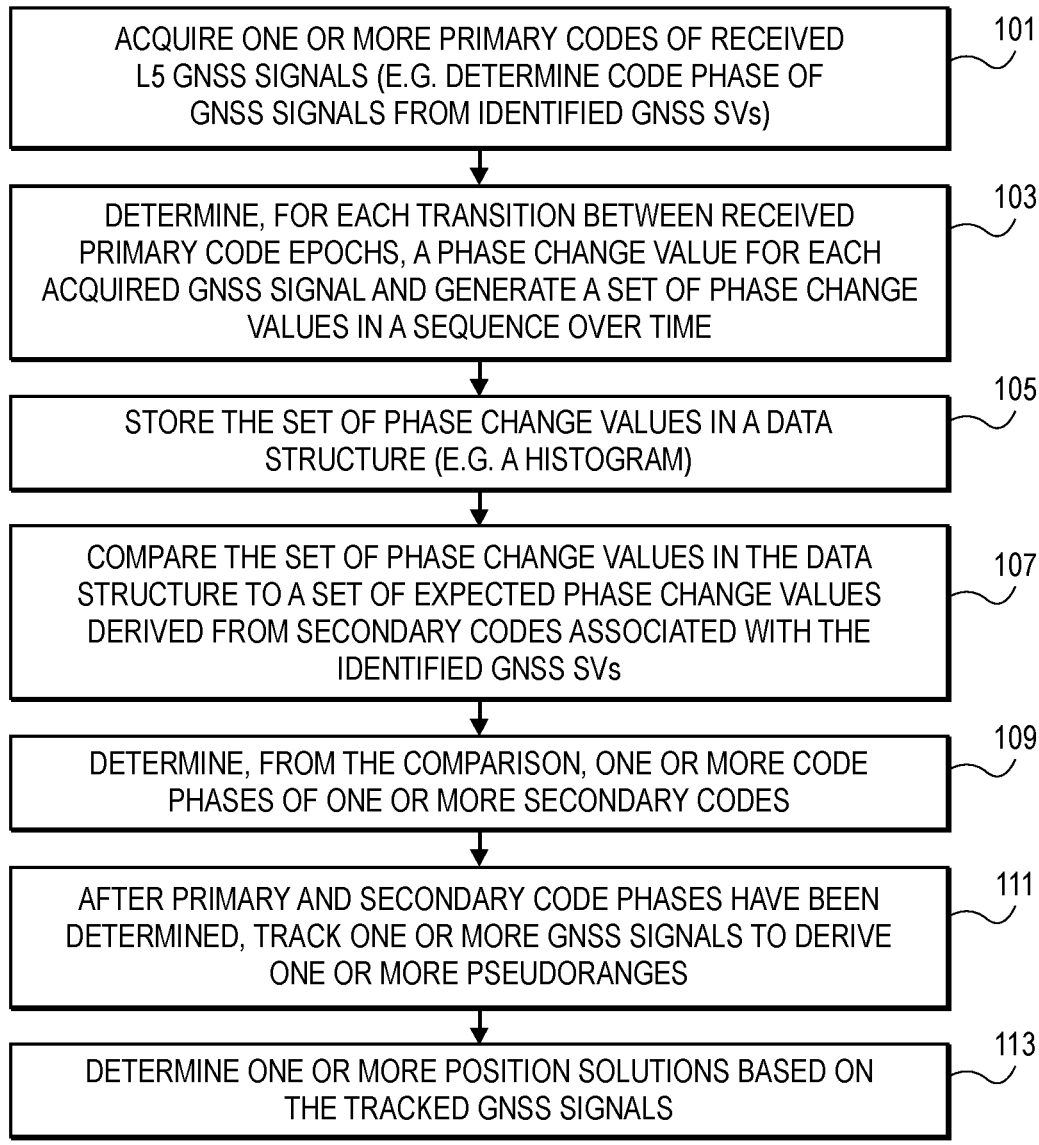
FIG. 2 is a flowchart that shows a method, according to one embodiment, to acquire secondary code phases of GNSS signals.

In one embodiment of the method shown in FIG. 2, the set of expected phase change values are derived from a secondary code by transforming the secondary code into a sequence of phase change values, across epochs in the secondary code, over a set of index values in the data structure. In one embodiment of the method shown in FIG. 2, the determining of the phase change values comprises computing a cosine of a value at each transition between two consecutive primary code epochs. In one embodiment of the method shown in FIG. 2, the data structure is a set of histograms, with at least one histogram per channel of L5 GNSS signals from a particular GNSS satellite, and the stored set of phase change values comprise phase change values for the two orthogonal data and pilot signal components in the same band of the same satellite, and wherein the comparing uses the phase change values from these data and pilot components to derive a comparison output that is used to determine one or more secondary code phases. In one embodiment of the method in FIG. 2, the GNSS receiver can determine if the phase change values are faulty due to frequency error and reset the data structure if the phase change values are faulty. In one embodiment of the method shown in FIG. 2, the method can estimate one or more frequencies of the one or more primary codes of the received L5 GNSS signals, and the method can detect a frequency error across a bank of correlators using a code phase trajectory across the bank of correlators and can, in response to the detected frequency error, reset data in the data structure. In one embodiment of the method shown in FIG. 2, the GNSS receiver can predict code Doppler slope from a discriminator trajectory over time, the discriminatory trajectory being an output from a discriminator in a code tracking loop; the GNSS receiver can then estimate a frequency error based on the predicted code Doppler slope and then detect secondary code phase from phase change values associated with primary codes at a frequency offset determined by the estimated frequency error. In one embodiment of the method in FIG. 2, the GNSS receiver can end the method if a time uncertainty value is less than 0.5 millisecond. In one embodiment, if the secondary code phase results from a plurality (e.g., 2 or 3) of the secondary code phase methods (described herein) are substantially consistent and agree, then it can be concluded that time uncertainty is less than 0.5 millisecond (so that current time is known within less than 0.5 millisecond error).

In one embodiment of the method in FIG. 2, the GNSS receiver can perform two sets of correlation operations on a primary code (at different frequency offsets) to determine two sets of phase change values at the different frequency offsets. For example, the GNSS receiver can perform a first set of correlation operations on primary codes at a first frequency offset from a center frequency to determine phase change values at the first frequency offset and also perform a second set of correlation operations on primary codes at a secondary frequency offset from the center frequency to determine phase change values at the second frequency offset. This can allow the GNSS receiver to determine the effect of variations in frequency due to frequency error. The GNSS receiver can also apply confidence values to the phase change values and store these confidence values in the data structure; for example, the GNSS receiver can determine, for each phase change value in at least a subset of the phase change values in the data structure, a confidence value based on a signal to noise ratio associated with each phase change value and storing the confidence values in the data structure. Decreasing confidence values over time can indicate increasing frequency errors (or other problems), which can indicate that the GNSS receiver should reset the data structure (e.g., wiping out or erasing all the data in the data structure to begin collecting new phase change values). Further details regarding the embodiments that can use a method in FIG. 2 are provided in the appendix (e.g., see the section under the heading that includes the phrase: "differential histogram method").

Figure 3:
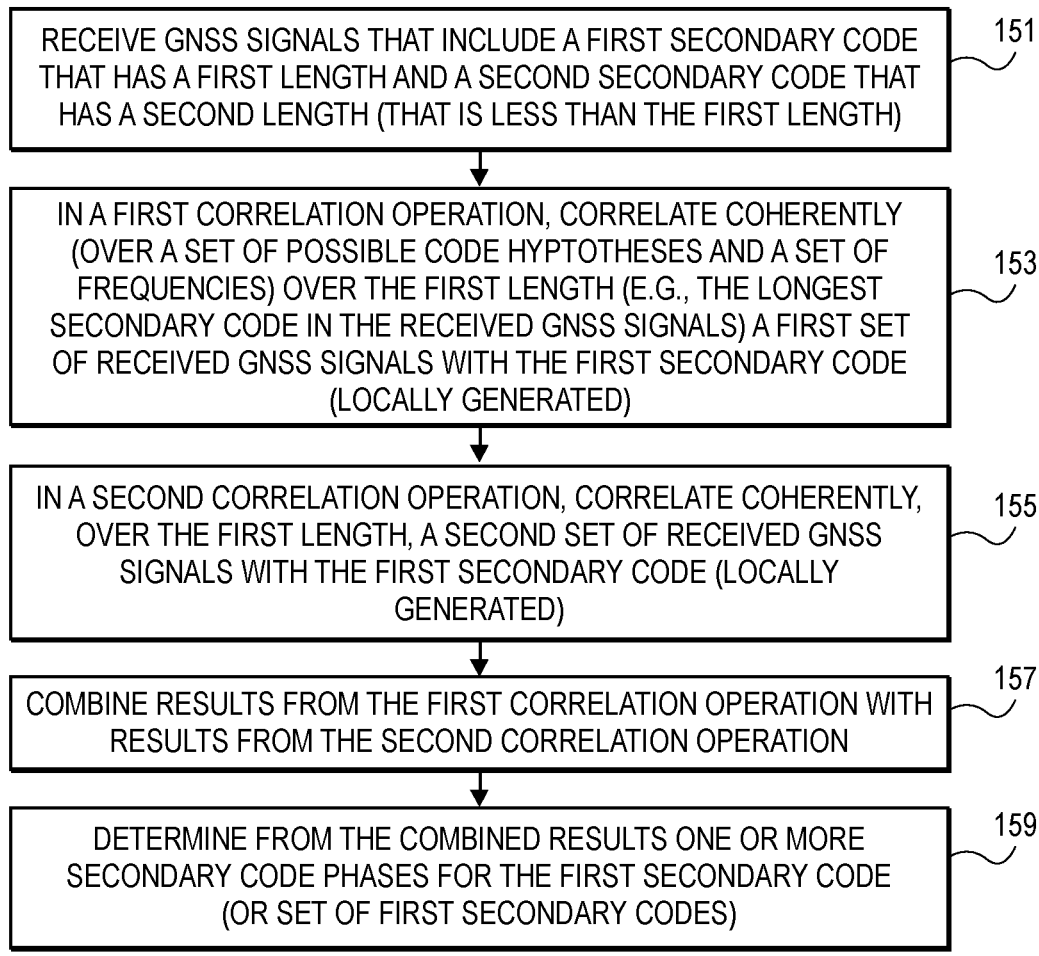
FIG. 3 is a flowchart that shows another method, according to another embodiment, to acquire secondary code phases of GNSS signals.

Another method for acquiring secondary code phases of secondary codes in L5 GNSS signals will now be described while referring to FIG. 3. The method shown in FIG. 3 can use several coherent correlation operations using the longest secondary code length as the period of time for the coherent correlation operations over all of the secondary codes (or a subset of the secondary codes). Different secondary codes from the same GNSS SV have different lengths in certain L5 GNSS systems; for example, in the Galileo E5 constellation, the secondary codes associated with different primary codes from the same GNSS SV have different lengths, and this property is used in the method in FIG. 3. In operation 151 in FIG. 3, a GNSS receiver receives a first set of GNSS signals and a second set of GNSS signals that include a first secondary code that has a first length (e.g., the first secondary code has the longest length of all codes from the same GNSS SV) and a second secondary code that has a second length that is smaller than the first length. In operation 153, the GNSS receiver performs a first coherent correlation operation on the first set of received GNSS signals (e.g., from a first Galileo GNSS SV), over a set of possible code phase hypotheses and a set of frequencies for the first secondary code and the second secondary code, over the period of time of the first length; in one embodiment, the GNSS receiver in operation 153 locally generates the first and the second secondary codes at each value of the possible code phase hypotheses and set of frequencies when coherently correlating against the received first set of GNSS signals. In one embodiment, the first coherent correlation operation (in operation 153) can be performed for all four secondary code components in GNSS signals from a GNSS SV such as a Galileo GNSS SV (so all four secondary code components are correlated in the first coherent correlation operation). In operation 155, the GNSS receiver performs a second coherent correlation operation (that follows, in time, the first correlation operation) on the second set of received GNSS signals (e.g., from the first Galileo GNSS SV), over a set of possible code phase hypotheses and a set of frequencies for the first secondary code and the second secondary code, again over the period of time of the first length; in one embodiment, the GNSS receiver in operation 155 locally generates the first and the second secondary codes at each of the possible code phase hypotheses and each of the set of frequencies when coherently correlating against the received second set of GNSS signals. The second set of received GNSS signals, in one embodiment, are received after the first set of GNSS signals are received. In one embodiment, the second coherent correlation operation (in operation 155) can be performed for all four secondary code components in GNSS signals from a GNSS SV such as a Galileo GNSS SV (so all four secondary code components are correlated in the second coherent correlation operation). Then in operation 157, the GNSS receiver can combine the results from the first and second coherent correlation operations and determine, in operation 159, one or more secondary code phases for one or more secondary codes based on the combined results; for example, the code phase of the longest secondary code is determined in operation 159. The combining in operation 157 can be a non-coherent integration in one embodiment, and the integrated results are sorted within each frequency to select the highest magnitude value in the combined results. In one embodiment, the first and the second correlation operations can be performed in the GNSS receiver using discrete Fourier transforms; in another embodiment, the first and the second correlation operations can be performed in the GNSS receiver using hardware correlators. In one embodiment, the first correlation operation is coherent over the first length for all four secondary codes in the first set of received GNSS signals, and the second correlation operation is coherent over the first length for all four secondary codes in the second set of received GNS signals, and in both of these correlation operations all four secondary codes are correlated. In one embodiment, the first correlation operation includes correlating the first set of the received GNSS signals with locally generated primary codes corresponding to the first set of secondary codes, and the second correlation operation includes correlating the second set of the received GNSS signals with the locally generated primary codes corresponding to the first set of secondary codes. In the context of this method in FIG. 3, it will be understood that a correlation is a comparison of a sequence of received data samples with a stored set of reference samples, typically performed by multiplying each received data sample by a corresponding reference sample and summing the result. In one embodiment, the set of frequencies are separated by a minimum step size, and an improved frequency estimate for one or more channels is further determined. Further details about the method in FIG. 3 are provided, among other locations, in the appendix under the heading that includes the phrase "Coherent secondary code methods".

Another method for acquiring secondary code phases of secondary codes in L5 GNSS signals will now be described while referring to FIG. 4. The method shown in FIG. 4 can use multiple signals from several GNSS SVs from the same GNSS constellation or different GNSS constellations to derive one or more secondary code phases. In operation 201 in FIG. 4, a GNSS receiver can acquire, over multiple primary code epochs, primary code phases of a plurality of GNSS signals from a plurality of GNSS satellites of at least one GNSS constellation, the acquisition producing a set of correlation values over a set of time intervals of the multiple primary code epochs for the plurality of GNSS satellites, such that for each time interval there are a plurality of correlation values specifying the acquired primary code phases from the plurality of GNSS satellites. In the context of this description, code phase means a difference, in time, between a detected beginning of a code sequence (e.g., a detected beginning of an epoch of the code sequence in a received GNSS signal) and an expected (or local reference) beginning of the code sequence (e.g., a beginning of an epoch of a locally generated code sequence). Then in operation 203, the GNSS receiver can evaluate, within each time interval in the set of time intervals, the plurality of correlation values in one of the time intervals to determine a pattern of values, derived from the plurality of correlation values in the time interval, that maximizes a sum of the plurality of correlation values. In operation 205, the GNSS receiver can determine, based on the plurality of GNSS satellites for which primary code phases have been acquired, an expected sequence of phase reversals for secondary codes associated with the primary code phases that have been acquired, the expected sequence determined over the set of time intervals. In operation 207, the GNSS receiver can compare each determined pattern of values for one of the time intervals with the expected sequence of phase reversals for the secondary codes. This comparison in operation 207 can allow the GNSS receiver to determine, in operation 209, one or more code phases for the secondary codes. In one embodiment, the comparison determines a plurality of code phases for the secondary codes by considering relative delay information across the received GNSS signals from different GNSS satellites, and the comparison concurrently determines, at once for all of the different GNSS satellites, the plurality of code phases for the secondary codes.

Figure 4:
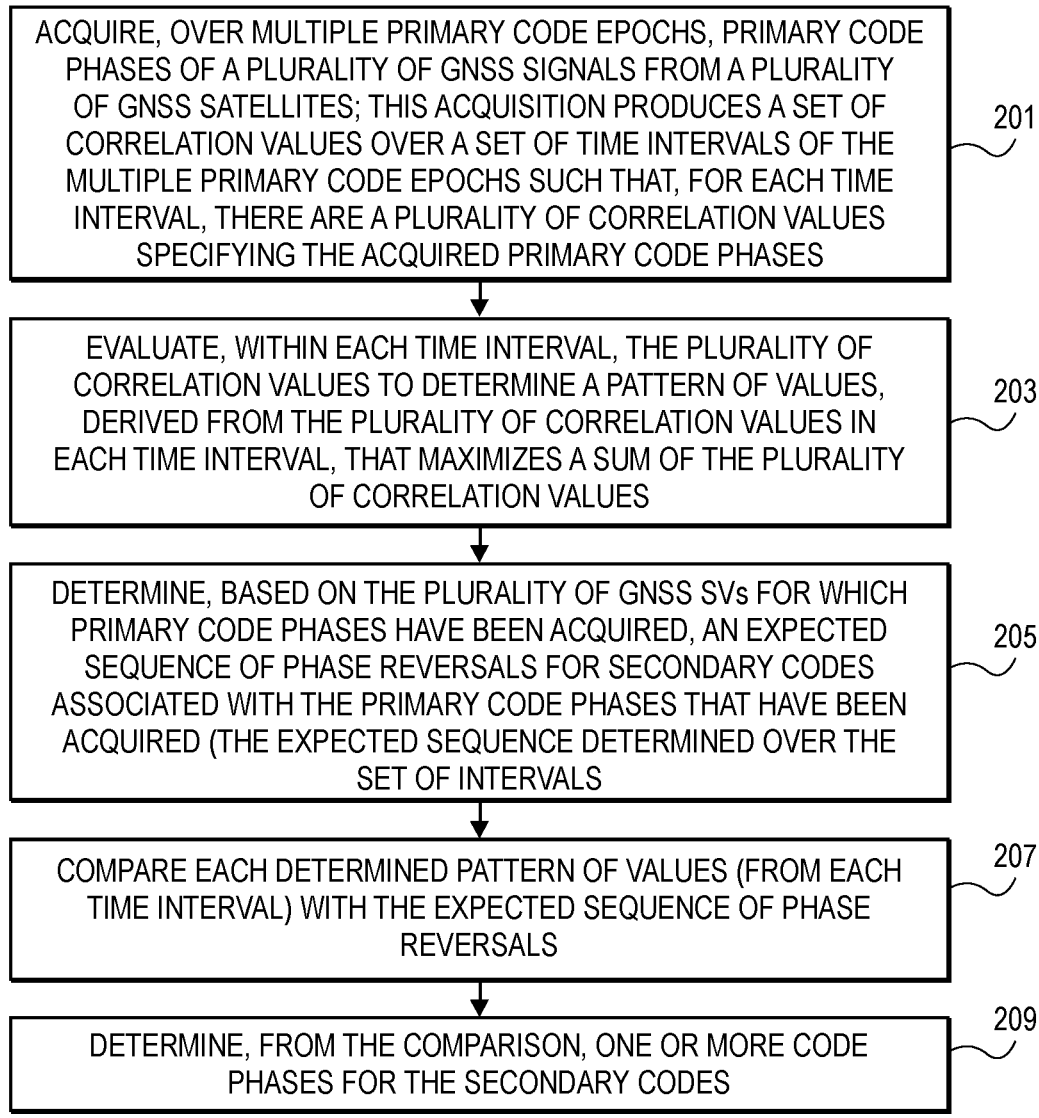
FIG. 4 is a flowchart that shows another method, according to another embodiment, to acquire secondary code phases of GNSS signals.

In one embodiment, the method in FIG. 4 can determine whether the set of intervals is sufficiently large to provide reliable determination of the one or more code phases for the secondary codes. In one embodiment, the primary code phases are acquired either with discrete Fourier transforms or hardware correlators. Following the method shown in FIG. 4, A GNSS receiver can also perform, after a primary code phase and an associated secondary code phase have been determined for components of one of the received GNSS signals, tracking operations on at least one of the components of the received GNSS signals and determine, based on one or more outputs from the tracking operations, one or more position solutions. Further details about the method in FIG. 4 are provided, among other locations, in the appendix under the heading that includes the phrase "Cross-SV ensemble correlation integration method".

Figure 5:
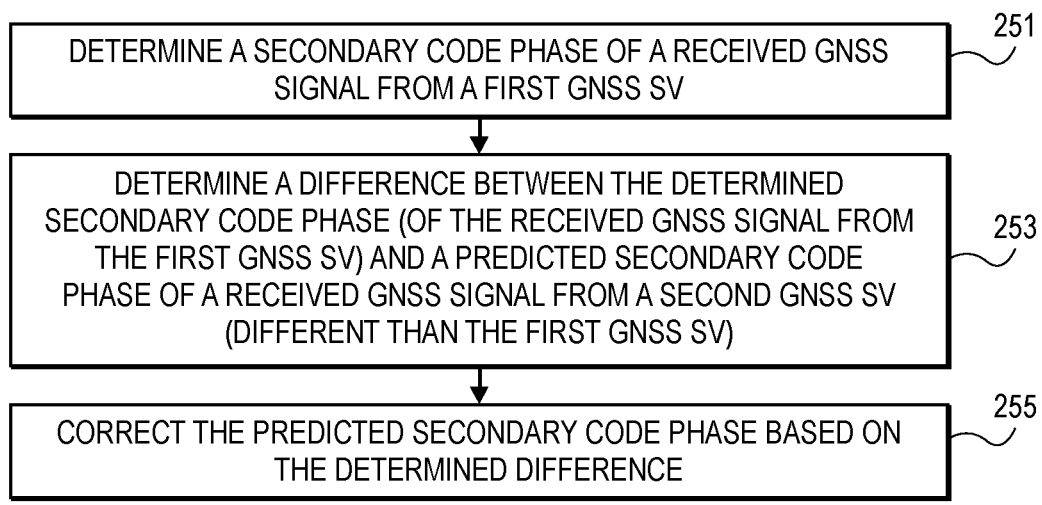
FIG. 5 is a flowchart that shows another method, according to another embodiment, to acquire secondary code phases of GNSS signals.

Another method for acquiring secondary code phases of secondary codes in L5 GNSS signals will now be described while referring to FIG. 5. The method shown in FIG. 5 can use data about secondary code phase measurements for a first secondary code to adjust correlations for a secondary code acquisition process for a second secondary code that is different than the first secondary code. This method can be referred to as a "transfer" method, and it can provide fast results (often faster than the other secondary code phase acquisition methods described herein). In operation 251 in FIG. 5, a GNSS receiver determines a secondary code phase of a received GNSS signal from a first GNSS SV. Then in operation 253, the GNSS receiver determines a difference between the determined secondary code phase of the received GNSS signal from the first GNSS satellite and a predicted secondary code phase of a received GNSS signal from a second GNSS satellite which is different than the first GNSS satellite. The GNSS receiver can then, in operation 255, correct the predicted secondary code phase based on the difference determined in operation 253. For example, if the difference indicates that the predicted secondary code phase is early in time, the correction can adjust the predicted secondary code phase by making less early in time. This allows the GNSS receiver to use strong signals from some GNSS SVs (e.g., unobstructed signals) to correct predicted secondary code phases for other (e.g., weaker) GNSS signals from other GNSS SVs. The method in one embodiment can further include the operations of: determining additional secondary code phases of other received GNSS signals from other GNSS satellites; determining additional differences between the determined additional secondary code phases and the predicted secondary code phase; and correcting the predicted secondary code phase based on the determined difference and the additional differences. In one embodiment, the correcting is based on the highest likelihood difference among the determined difference and the additional differences. In one embodiment, the correcting can include: (1) comparing the determined difference to a fraction of a code length in time of an epoch of the secondary code and (2) (a) adding the code length in time to the determined difference if the determined difference is less than the fraction and wrapping a result of the addition within a range of possible values in milliseconds of the code length or (b) subtracting the code length in time from the determined difference if the determined difference is more than the fraction and wrapping a result of the subtraction within a range of possible values in milliseconds of the code length. In one embodiment, the method can further include the operation of: using the corrected secondary code phase for the second GNSS satellite to wipe the secondary code from the received GNSS signal from the second GNSS satellite to allow coherent integration of a primary code from the second GNSS satellite. A GNSS receiver using the method in FIG. 5 can determine a position solution for the GNSS receiver from a plurality of GNSS satellites including the first GNSS satellite but not the second GNSS satellite prior to correcting the predicted secondary code phase. Further details about the method in FIG. 5 are provided, among other locations, in the appendix under the heading that includes the phrase "Transfer method to Predict Secondary Code Phase".

Another method for acquiring secondary code phases of secondary codes in L5 GNSS signals will now be described while referring to FIG. 6. The method shown in FIG. 6 can use what may be referred to as a coherent differential method to determine secondary code phases; this method is further described in the appendix (e.g., see the section under the heading that includes the phrase: "Coherent Differential Method"). This method has the merit that it largely circumvents the requirement to search for carrier frequency in acquiring the secondary code phase. In operation 301 in FIG. 301, a GNSS receiver receives GNSS signals containing one or more primary codes and one or more secondary codes from a GNSS SV. Then in operation 303, the GNSS receiver, using the received GNSS signals, acquires the primary pseudorandom code by determining the code phase between the received signal and a reference code and generates a first set of correlation outputs that includes a set of one or more secondary code correlation cycles of the one or more secondary codes. This first set of correlation outputs typically are a sequence of data with each element produced once per cycle of the primary pseudorandom code; in particular for L5 bands the rate is once per millisecond. Each such output is typically further modulated by the secondary code. To avoid confusion, in the following discussion, additional correlation outputs sets refer to that produced by cross-correlation operations between samples of data and locally generated secondary code data, where an output set contains correlation values for a set of different hypothesized sample delays (samples being increments of 1 msec in the L5 example). Hence, in an exemplary embodiment the set of second or third correlation outputs discussed in the following may be of size 100 if the secondary code length is 100. The second or third correlation outputs are sometimes referred to as cross-correlation "functions" or "correlation functions". In operation 305, the GNSS receiver locally generates a set of one or more expected secondary code sequences, over time, based on the SVs in view of the GNSS receiver. This set of expected secondary code sequences is used by the GNSS receiver in operation 307 to compute a differential secondary code sequence based on the set of one or more expected secondary code sequences. In operation 309, the GNSS receiver computes a set of differential correlation samples based on the first correlation outputs and a complex conjugate of each of the first correlation outputs. Then in operation 311, the GNSS receiver computes a correlation function from the set of differential correlation samples and the differential secondary code sequence to provide a set of second correlation outputs. Using the set of second correlation outputs, the GNSS receiver in operation 313 determines one or more code phases of the one or more secondary codes. In one embodiment, the differential secondary code sequence is computed based on a product of an expected secondary code sequence (e.g., the expected sequence of phase changes in an expected secondary code from a GNSS in view of the GNSS receiver at the current time) and a delayed version of the expected secondary code sequence; the delayed version can be delayed by a fraction of one or more primary code epochs or by a duration of one or more bits in the secondary code. In one embodiment the differential correlation samples are computed based on a product of the first correlation outputs and a delayed version of the complex conjugate of the first correlation outputs. In one embodiment the delay is set to that corresponding to a delay used in the differential secondary code sequence. For example, a delay of one sample of the differential correlation sample set corresponds (e.g. a delay of 1 msec) to a delay of one sample of the secondary code sequence. In this manner the new sample set and code sequences so constructed differentially will have the same code phase sequences, when aligned properly in phase. This alignment is performed by the subsequent correlation process formed upon the differential correlation samples and the differential code phase sequence. In one embodiment, the first correlation outputs provide complex data that comprises real part data and imaginary part data, and the complex conjugate operates on the imaginary part data. In one embodiment, the correlation in operation 311 is performed over a plurality of secondary code epochs and can be performed with one or more discrete Fourier transforms. In one embodiment, the set of second correlation outputs includes a value of a real part of a peak, and the secondary code phase is determined from an absolute value of the real part. In one embodiment the secondary code phase is determined from the magnitude of the second correlation outputs.

In one embodiment, the correlation in operation 311 is a circular cross correlation of the set of differential correlation samples against the differential secondary code sequence. In one embodiment, the correlation in operation 311 can include the following operations: computing a discrete Fourier transform of the set of differential correlation samples to produce a first set of results; computing a discrete Fourier transform of the differential secondary code sequence to produce a second set of results; multiplying the first set of results by a complex conjugate of the second set of results to produce a first product; and computing an inverse discrete Fourier transform of the first product.

Figure 6:
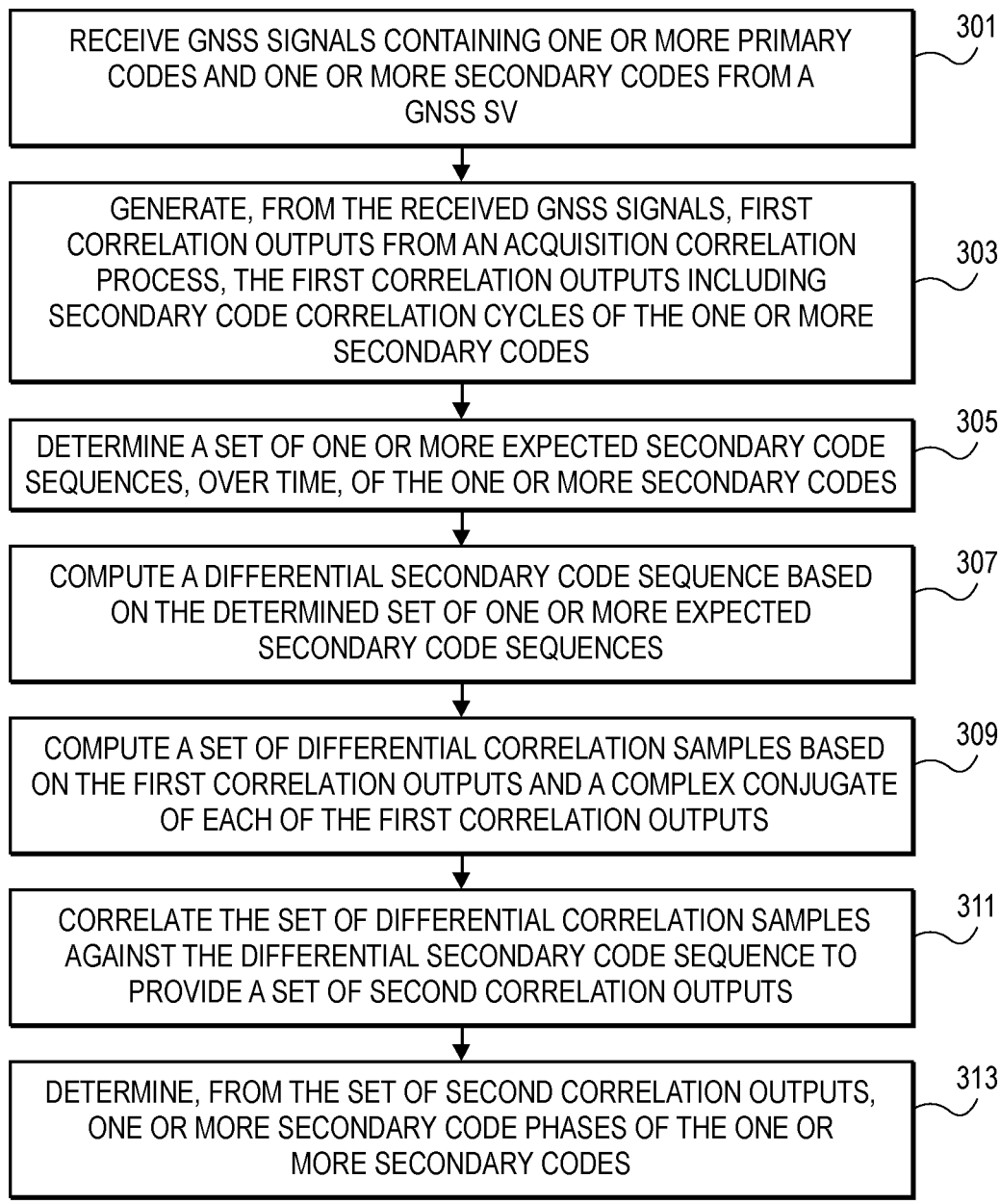
FIG. 6 is a flowchart that shows another method, according to another embodiment, to acquire secondary code phases of GNSS signals.

In one embodiment, the method according to FIG. 6 can include a further correlation in which a different set differential correlation samples is correlated against a further delayed differential secondary code, based on the determined locally generated set of one or more expected secondary code sequences, to provide a set of third set of correlation outputs that may be used to check the set of second correlation outputs. This different set of samples may be formed, for example, by utilizing a different delay in forming a product of the first correlation outputs and a delayed version of it. In another embodiment the second set of correlation outputs is added to the third set of correlation outputs to provide a correlation output function with improved fidelity. In one embodiment second and third correlation outputs are added coherently and either the individual real and imaginary components are examined to determine secondary code phase or the magnitude or squared magnitude of the third correlation outputs is examined to determine the secondary code phase. An example of this operation (for Galileo SV code 1 secondary code 1) is shown in the middle portion of FIG. 8AAA. In another embodiment the magnitudes of the second and third correlation outputs are added. An example of this operation is shown in the middle portion of FIG. 8BBB. In yet another embodiment the squares of the magnitudes of the second and third correlation outputs are added. The rightmost portion of these plots also show results when including fourth and fifth correlation outputs. One notes the improved output SNR with the combining of a multiplicity of outputs. The addition of magnitudes or magnitudes squared (incoherent addition), rather than coherent addition of components, reduces losses present when large carrier frequency errors exist. The plots 8AAA assume zero frequency error, in order to show improvement when performing coherent combining under small frequency error conditions. With larger errors, coherent combining may provide less improvement or even reduction in performance. This is contrast to noncoherent combining which is little affected by frequency errors. However, the coherent combining produces better performance when frequency errors are small. In these embodiment utilizing a combination of the second and third correlation outputs, the third correlation output calculation uses a delay for the differential secondary code and for the differential correlation samples corresponding to one another and different than that used to form the second set of correlation outputs. For example, the second set of correlation outputs may have used delay of one sample time to construct the differential samples and differential secondary code and the third set of correlation outputs may have used delay 2 sample times. FIG. 10B shows an example of the use of different delays using a method based on the method shown in FIG. 6. In other embodiments additional delays may be employed to form additional sets of correlation outputs which may be added together coherently or noncoherently in a manner similar to that described above. By constructing these additional sets the fidelity of the combined correlation outputs is improved both from a signal-to-noise standpoint as well as reducing so-called correlation sidelobes that may mask the position of the maximum correlation peak and hence provide incorrect secondary phase determination. The choice of a specific delay set may be done to minimize the resulting correlation sidelobes, whereas the choice of the number of delays in the set principally determines the improvement in signal-to-noise ratio. For example, simulation has indicated that for Galileo SV number 1, if 4 delays are to be used with each delay in the range of 1 to 8 secondary code samples, the optimal choice of delays to minimize the maximum sidelobe are 4, 5, 7, and 8 yielding a peak to maximum sidelobe of 8⅓ (18.4 dB) whereas if one used 1,2,3, and 4 the peak to maximum sidelobe would be 7.14 (17 dB).

Figure 8A:
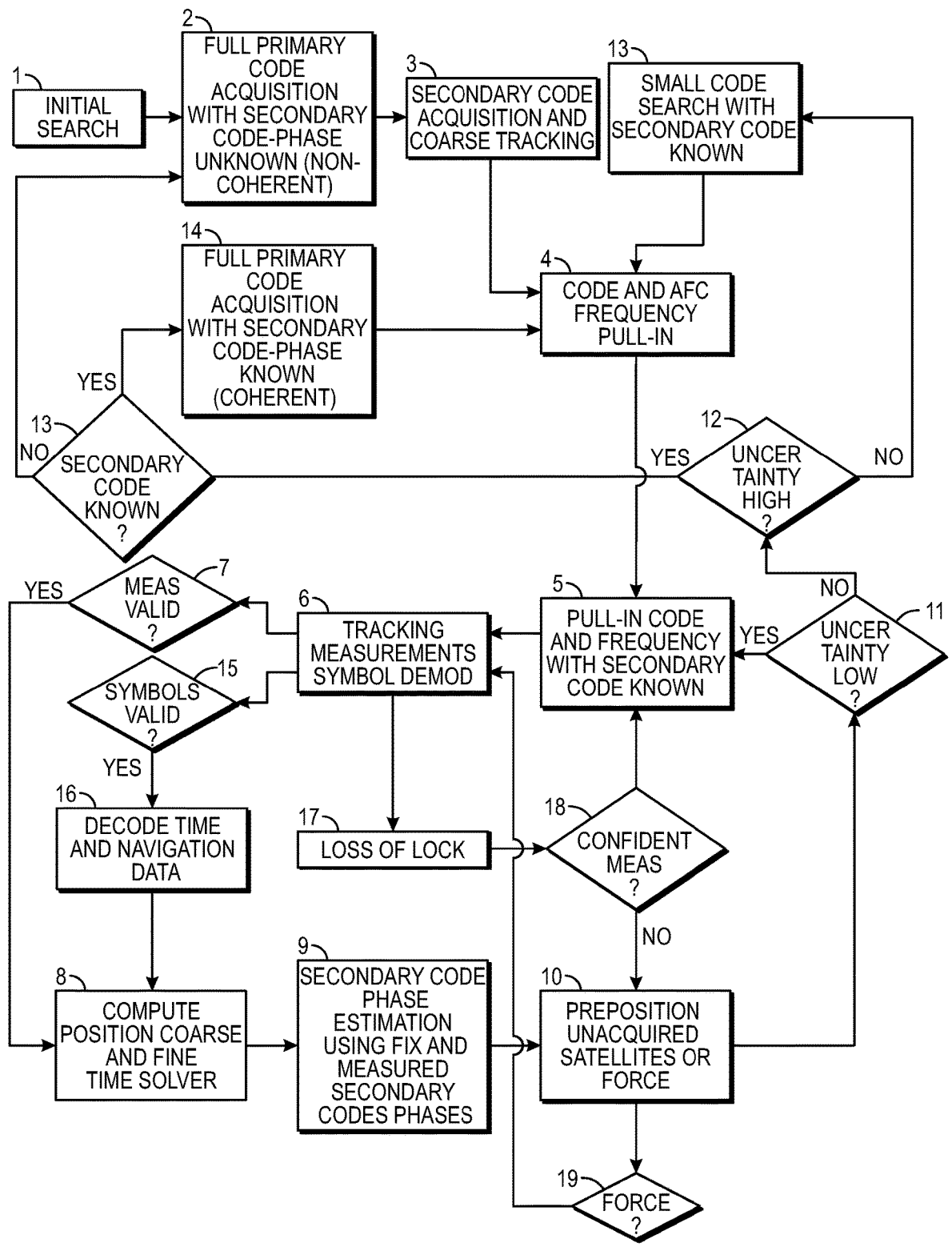
FIGS. 8A through 8BBB are figures that are referred to in the appendix.
Figure 8B:
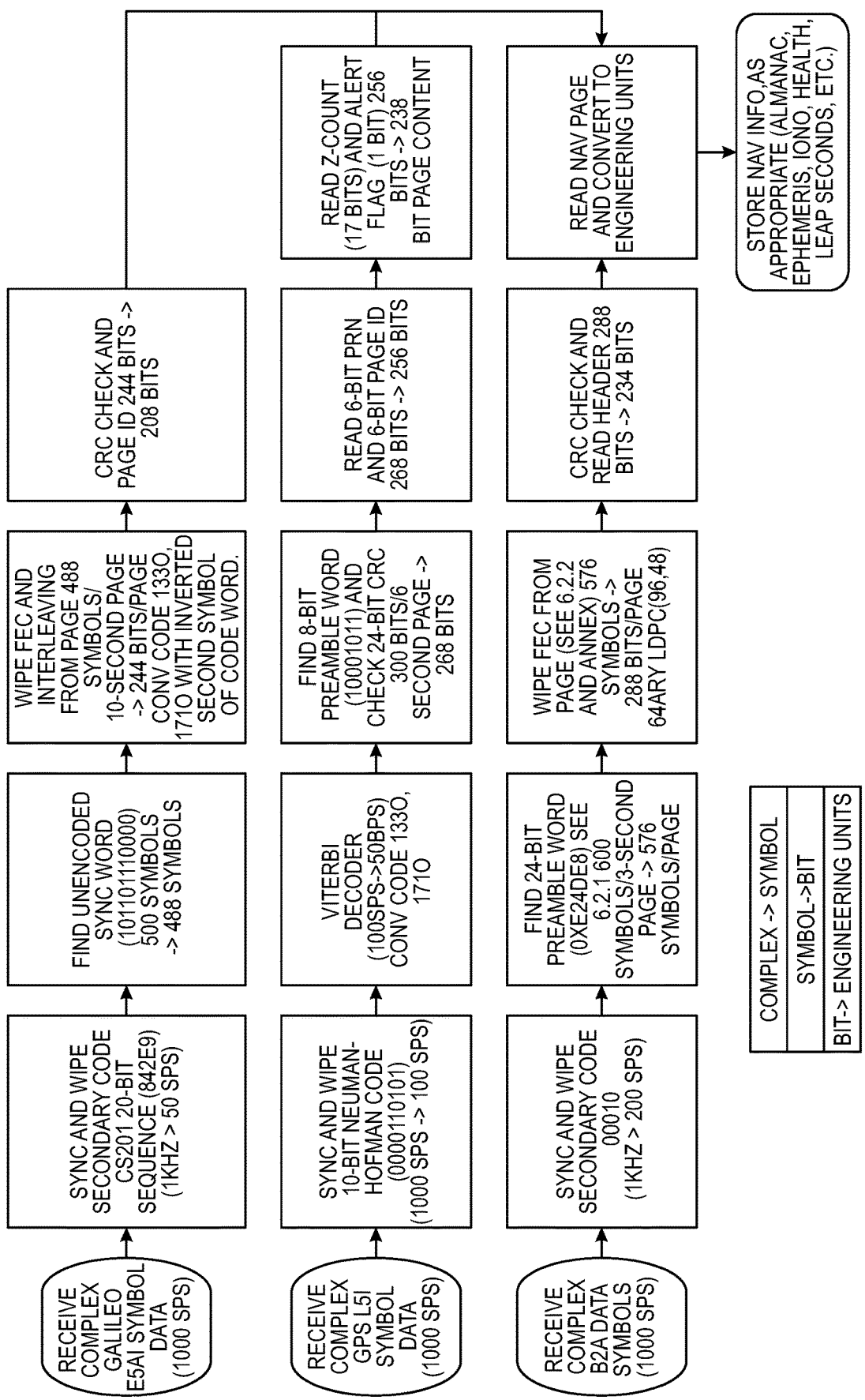
Figure 8C:
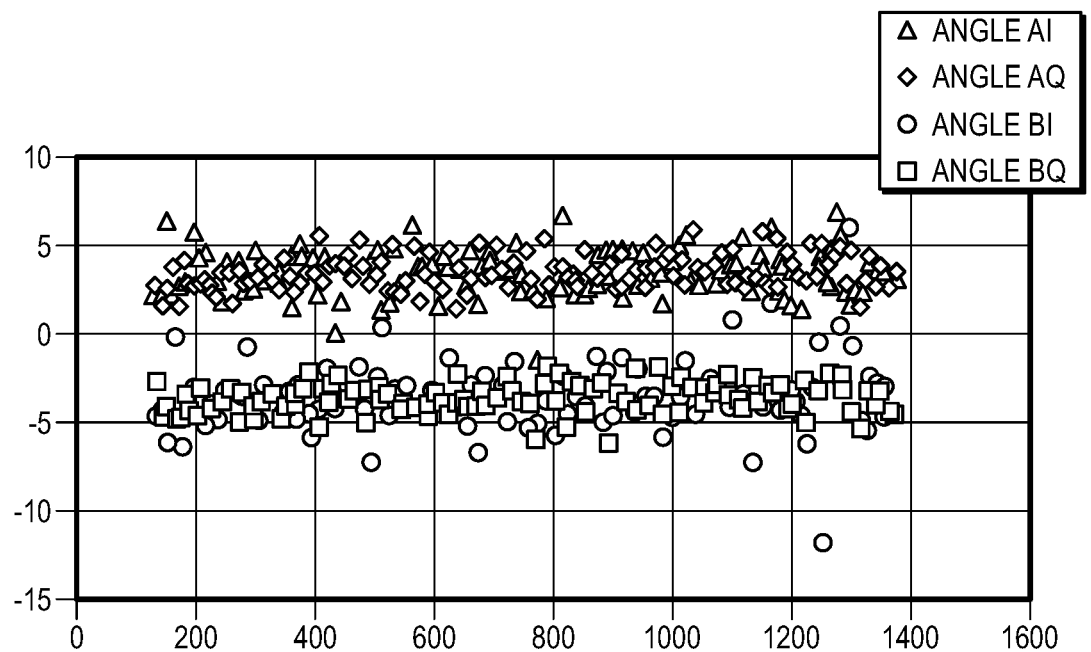
Figure 8D:
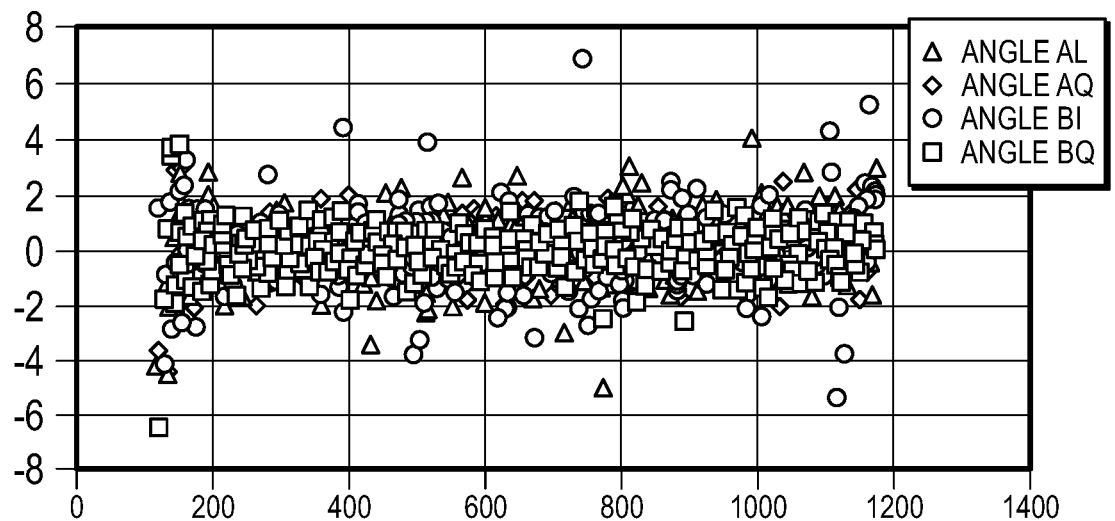
Figure 8E:
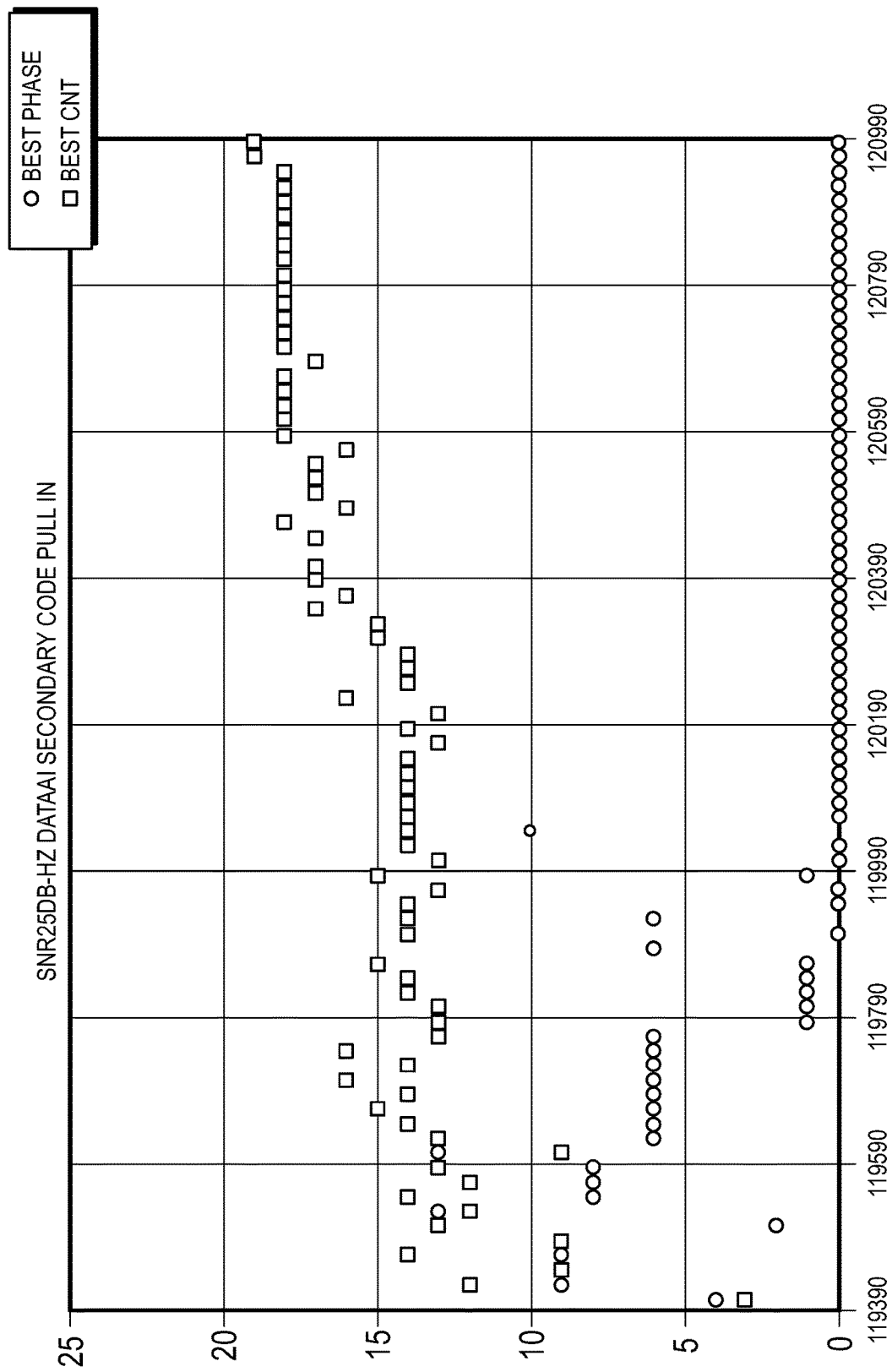
Figure 8F:
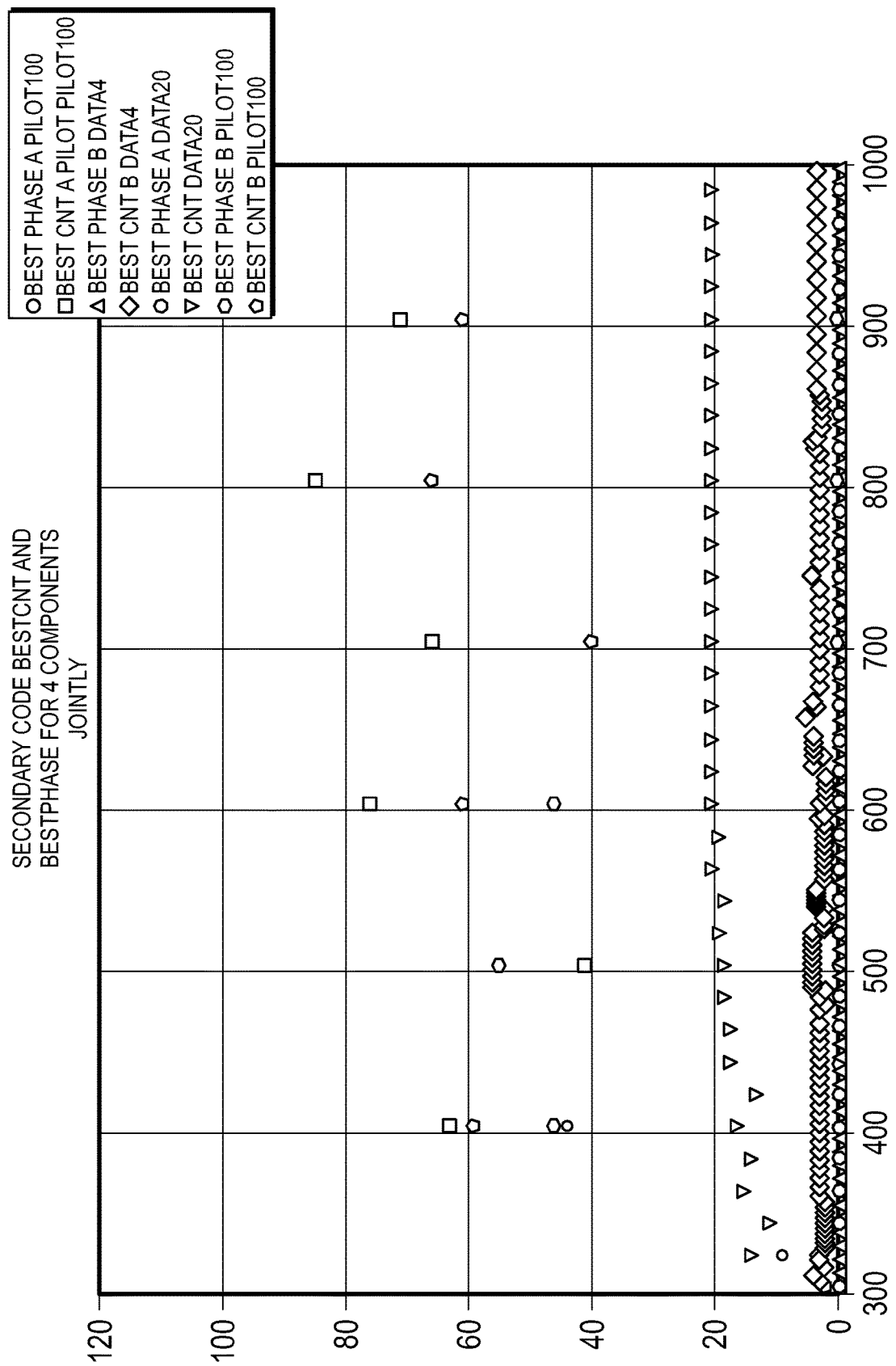
Figure 8G:
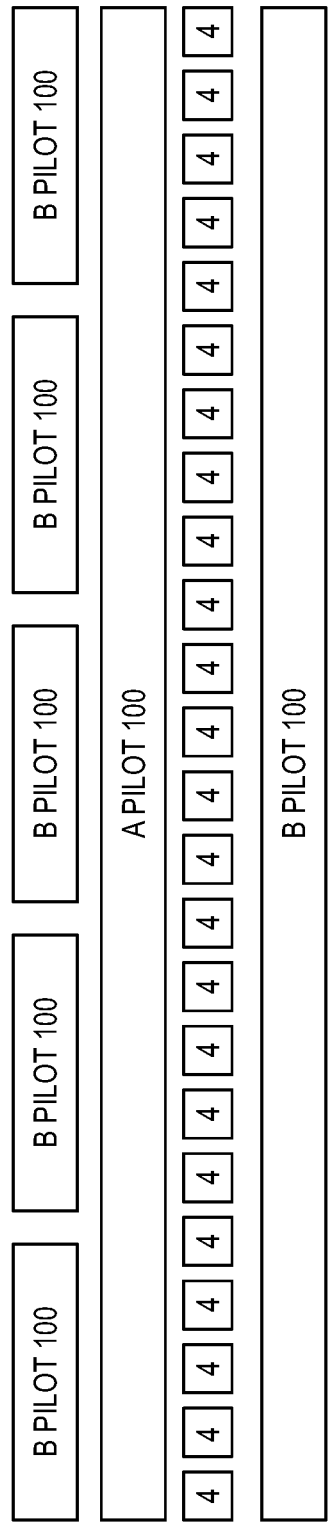
Figure 8H:
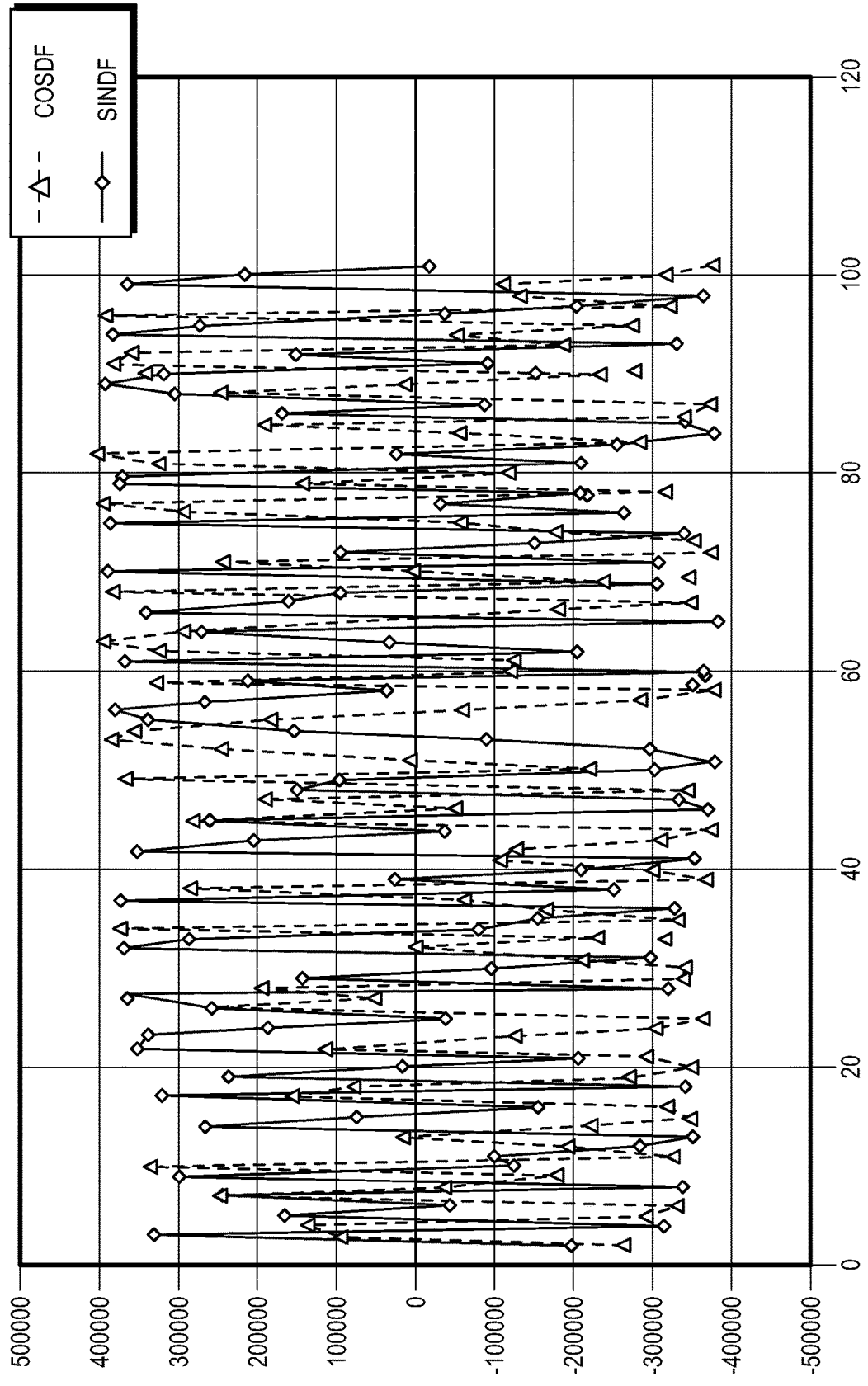
Figure 8I:
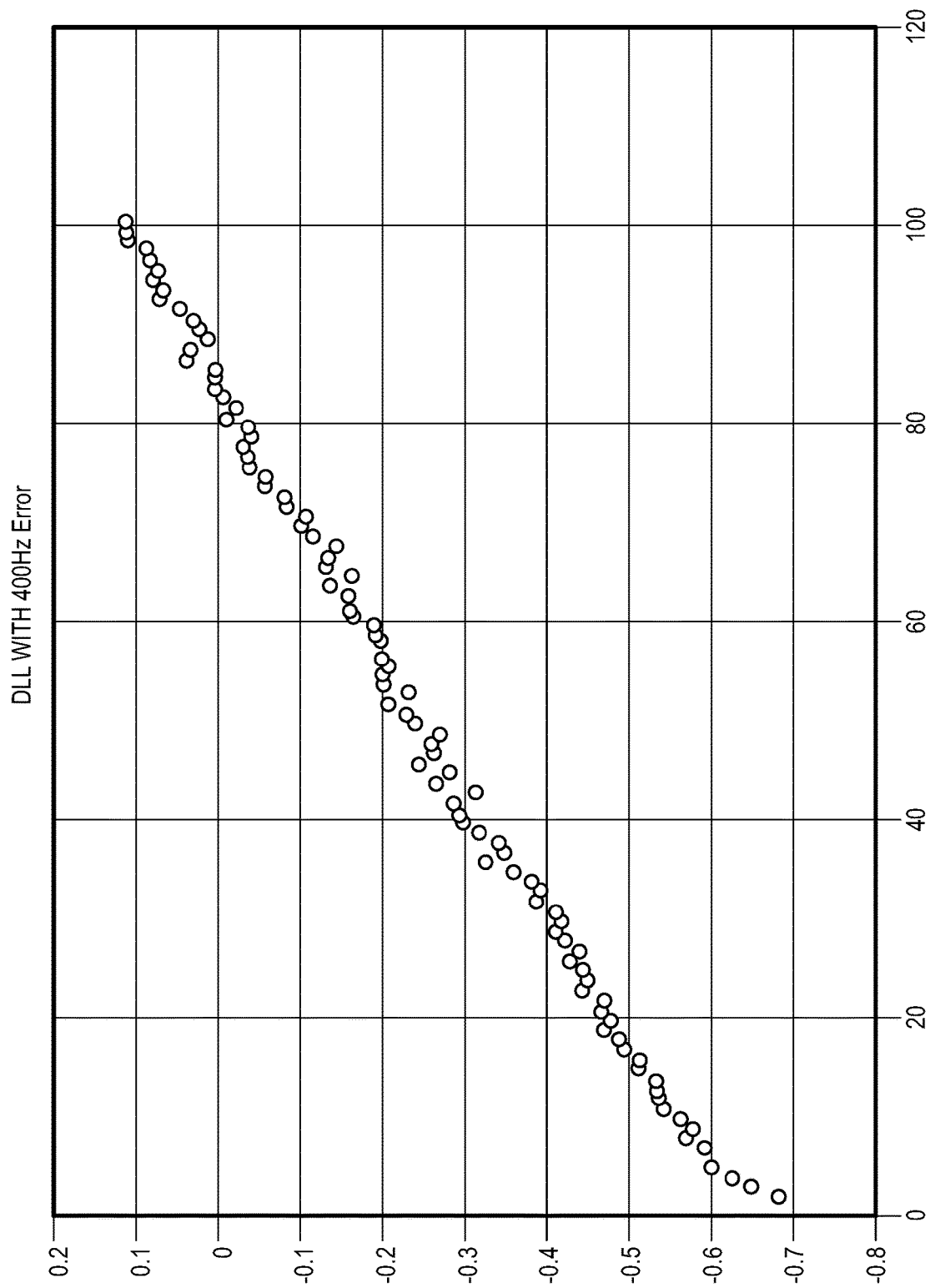
Figure 8J:
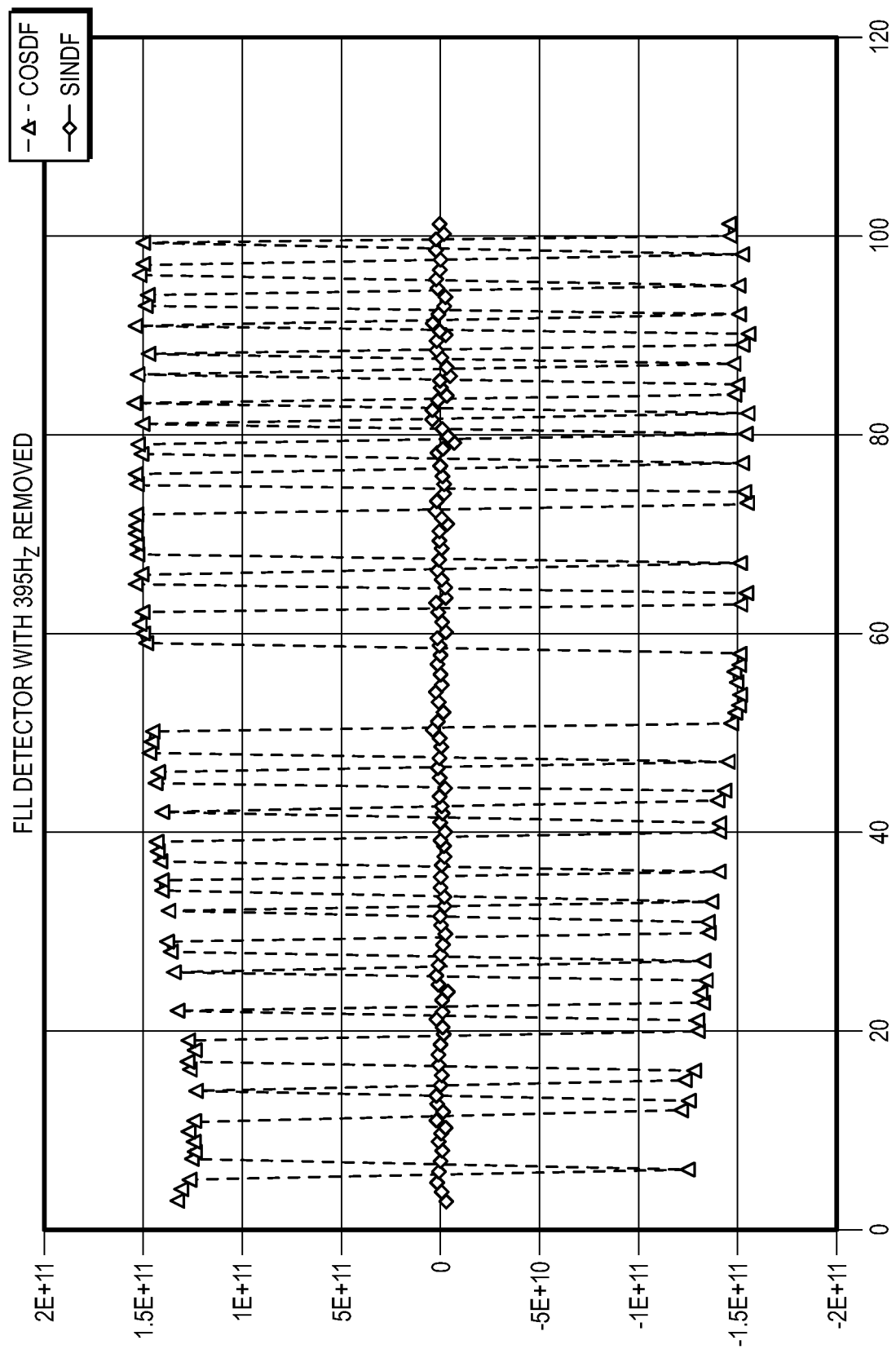
Figure 8K:
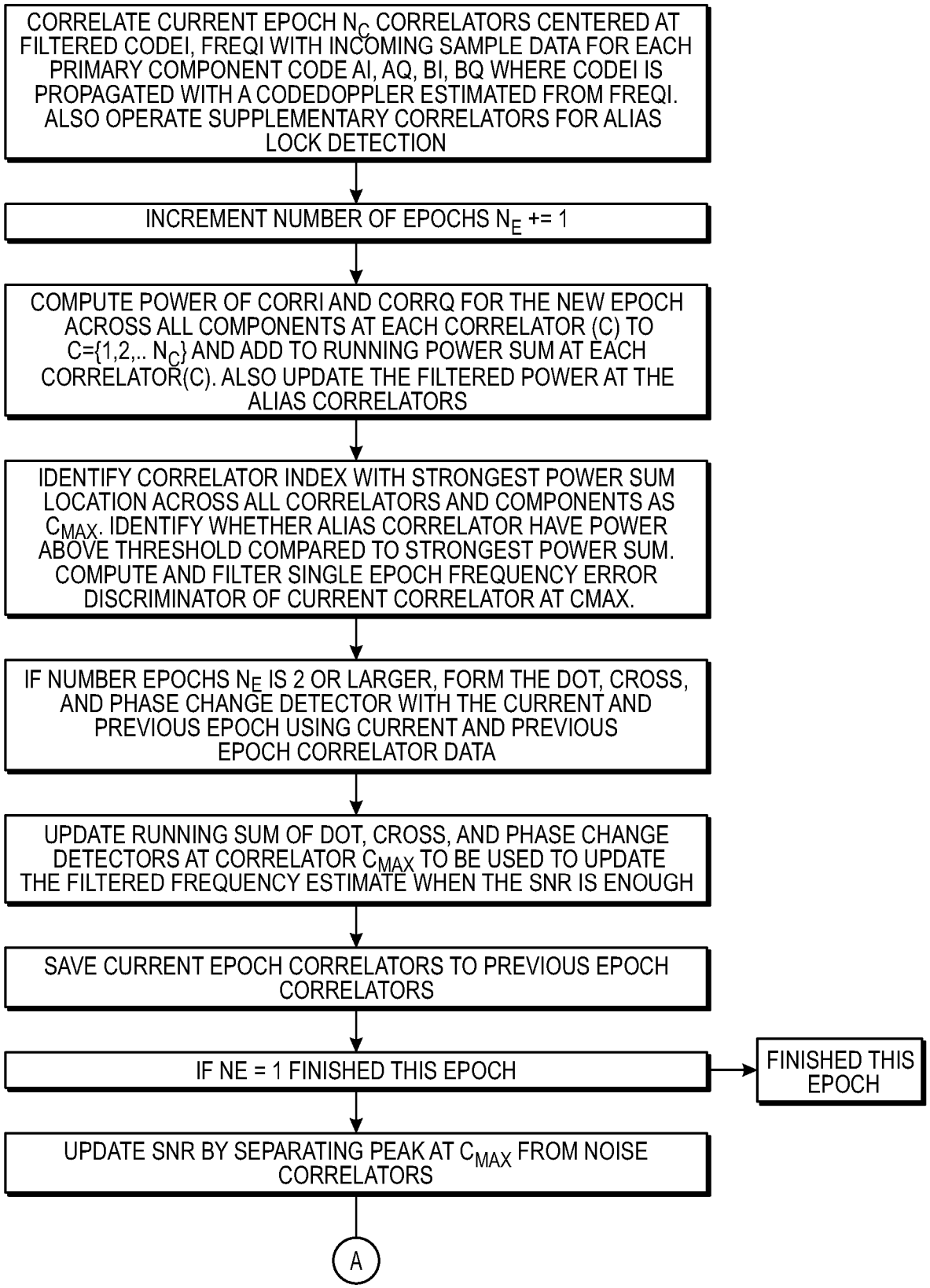
Figure 8K:
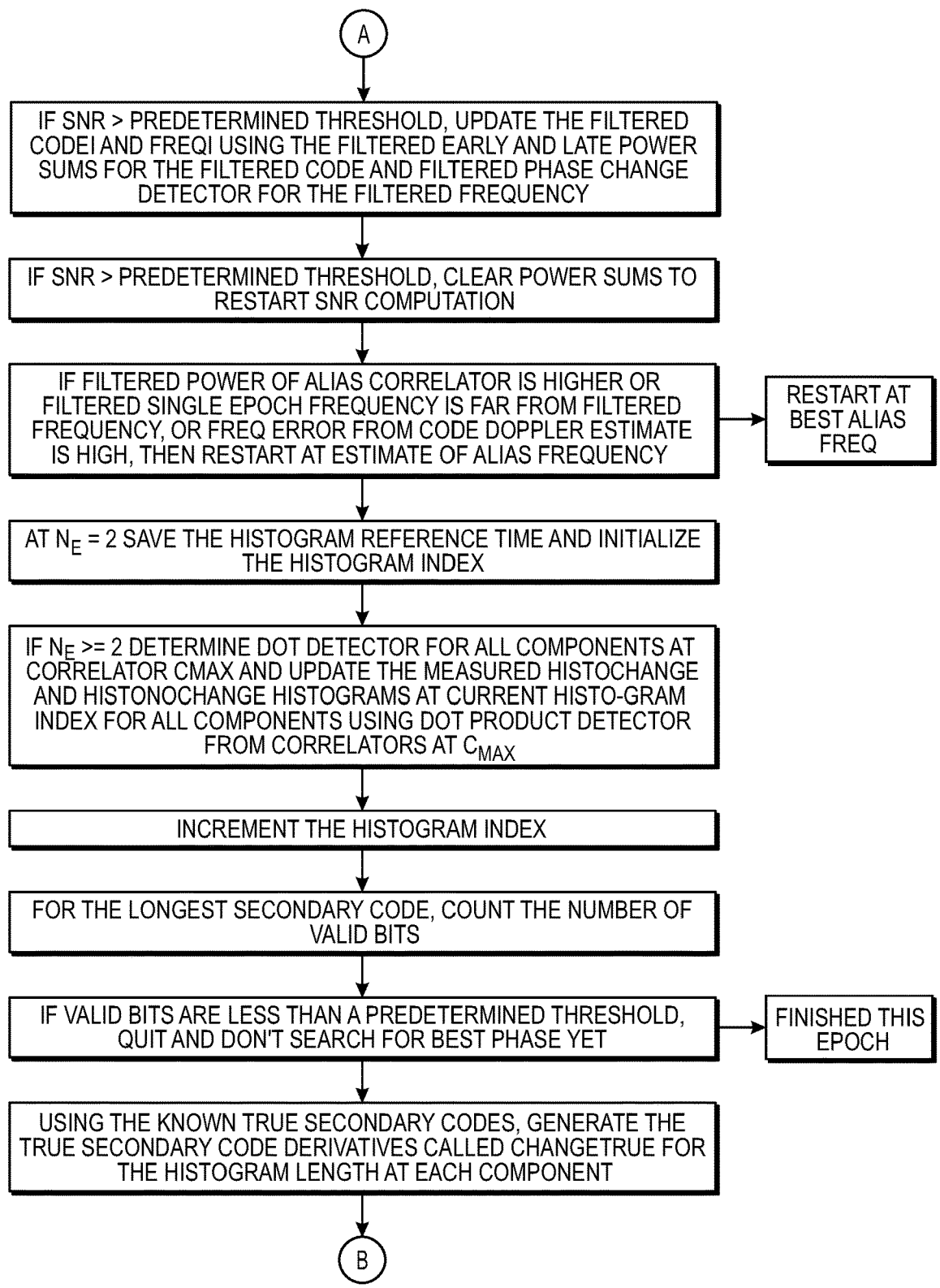
Figure 8K:
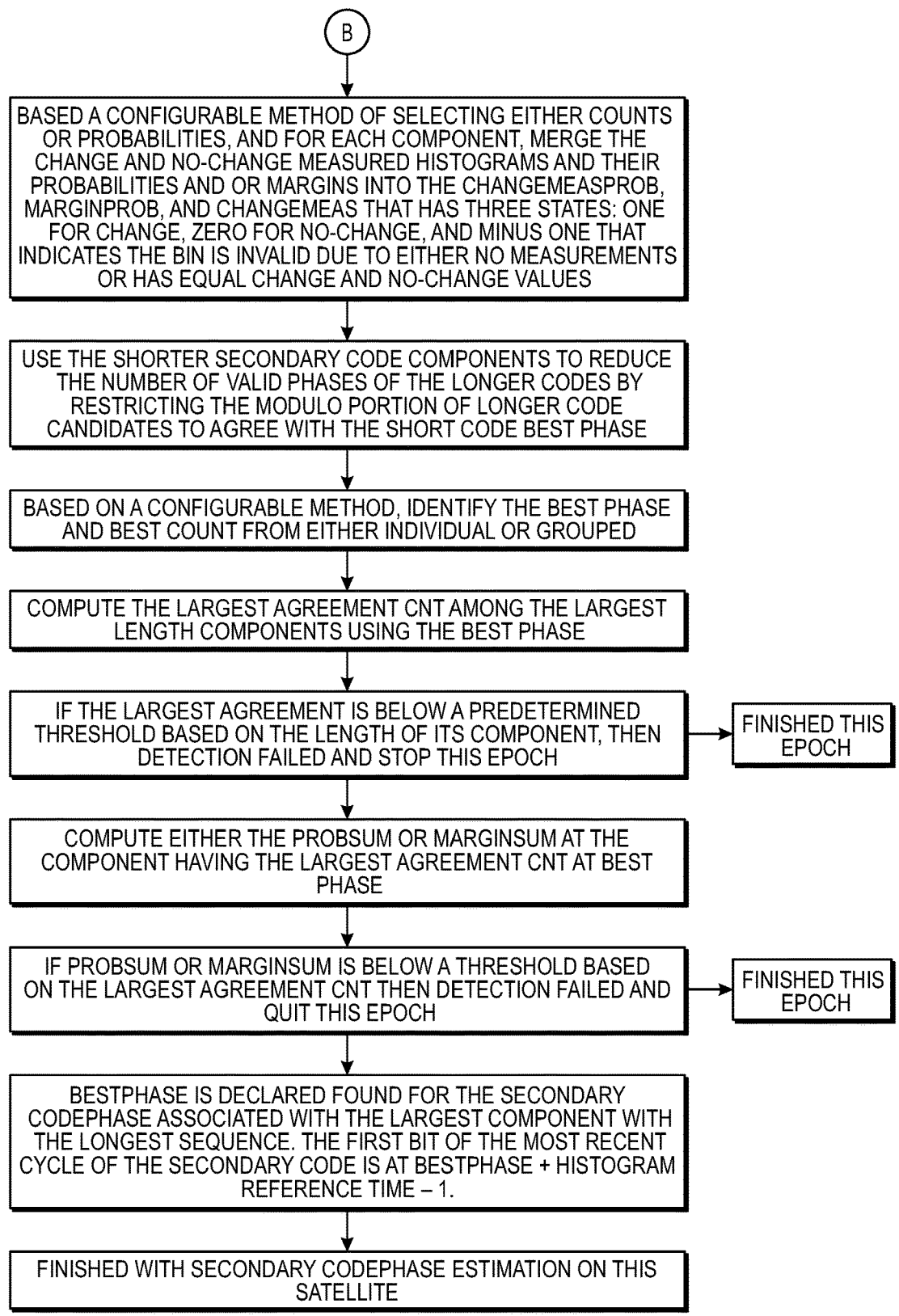
Figure 8L:
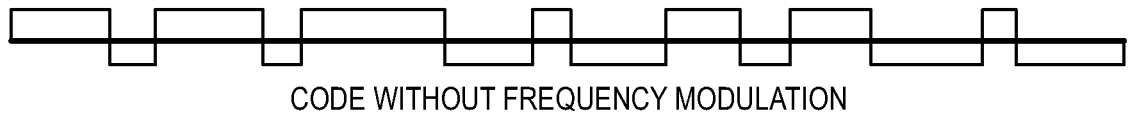
Figure 8M:
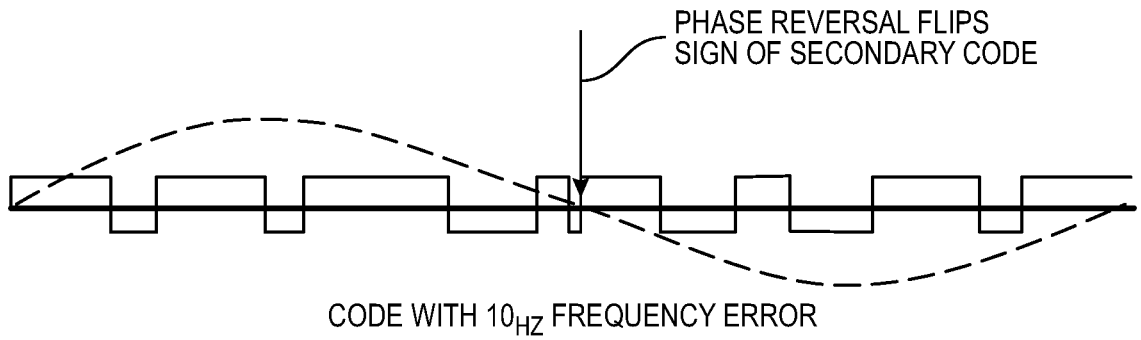
Figure 8N:
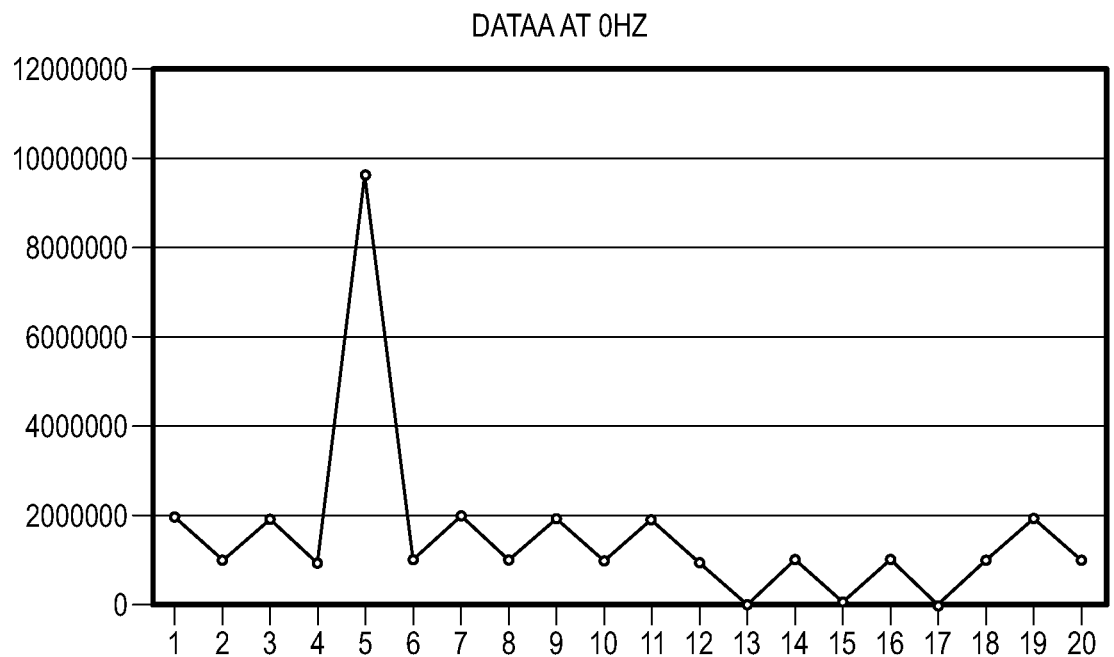
Figure 8O:
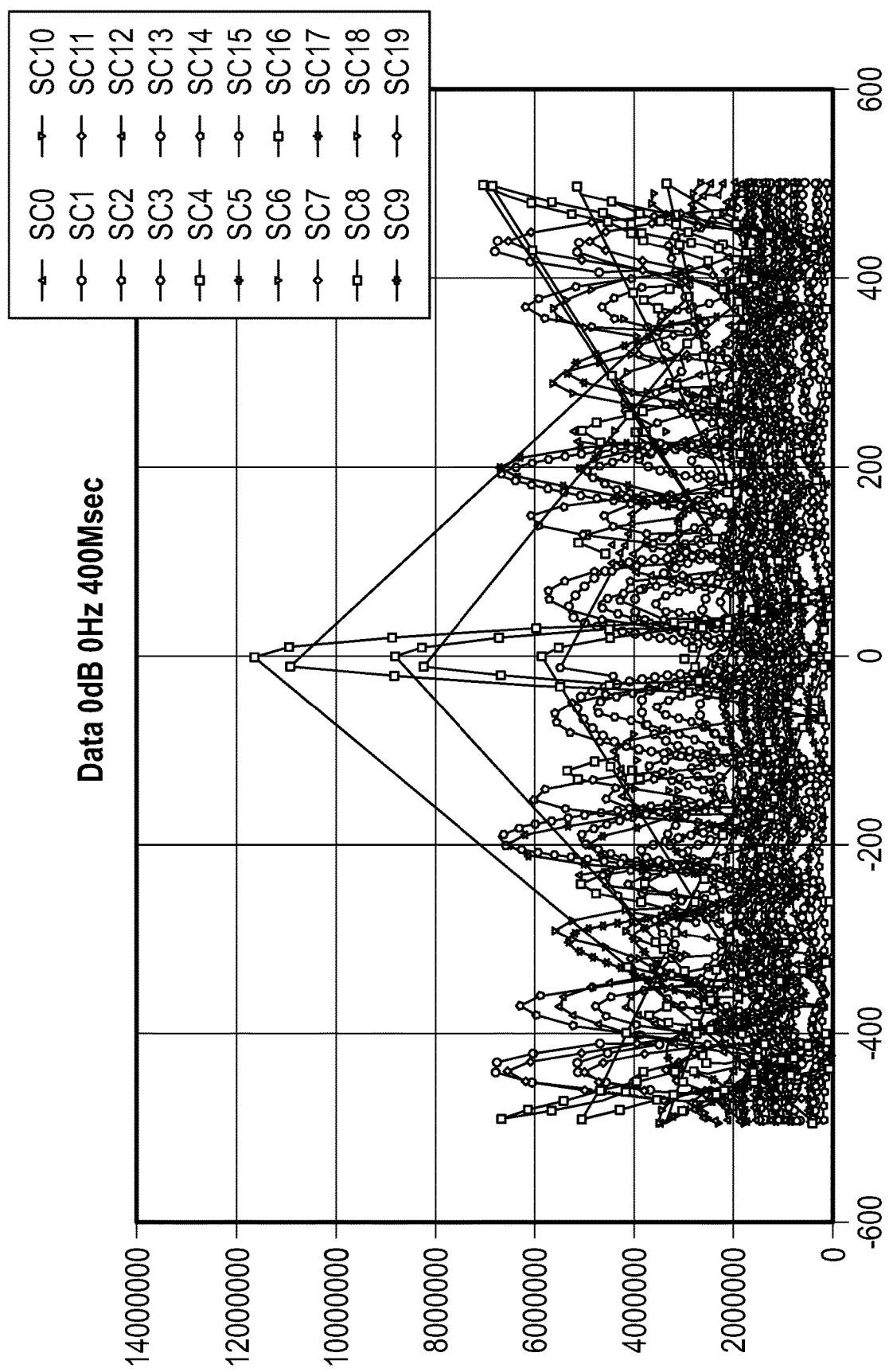
Figure 8P:
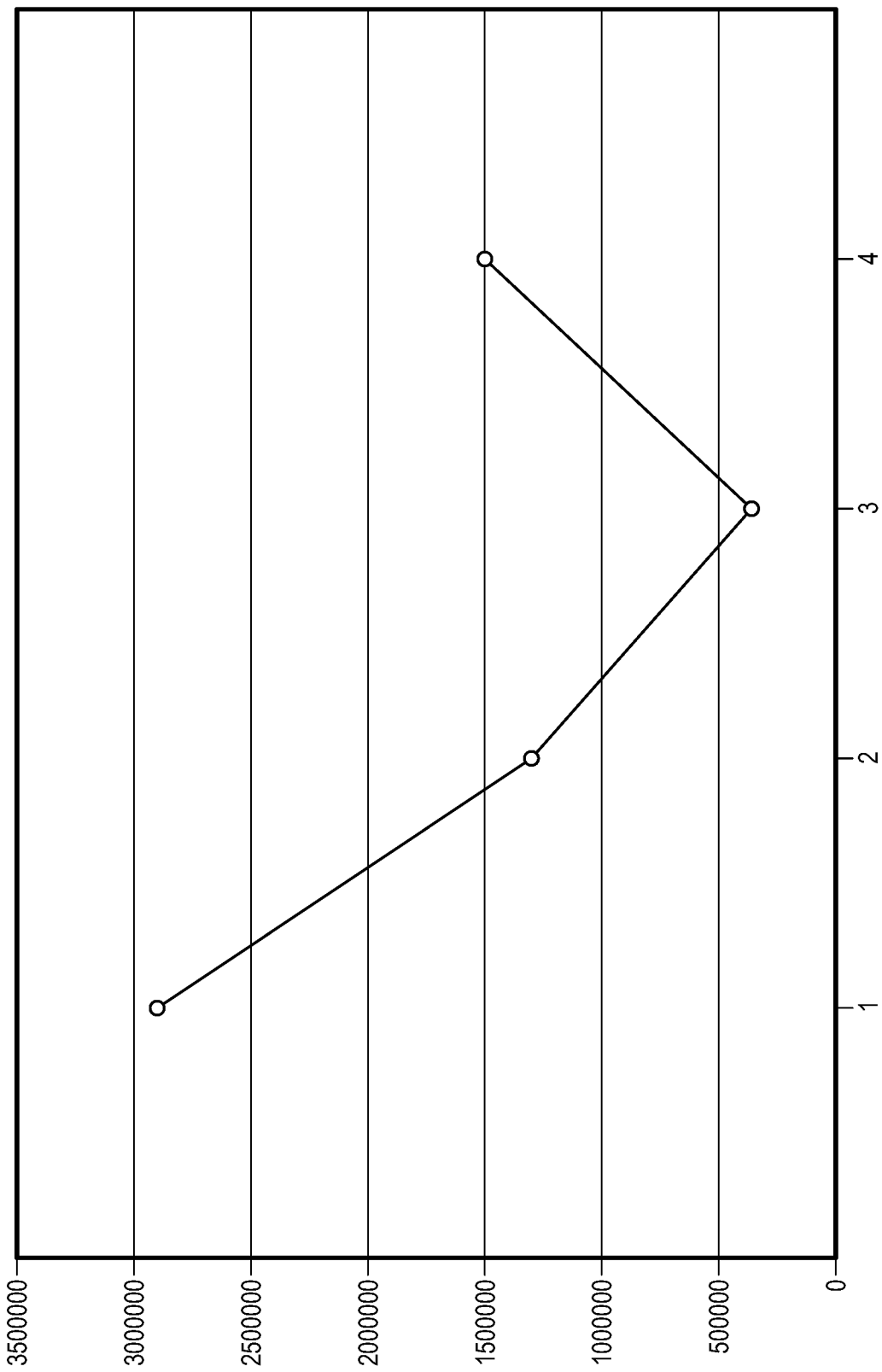
Figure 8Q:
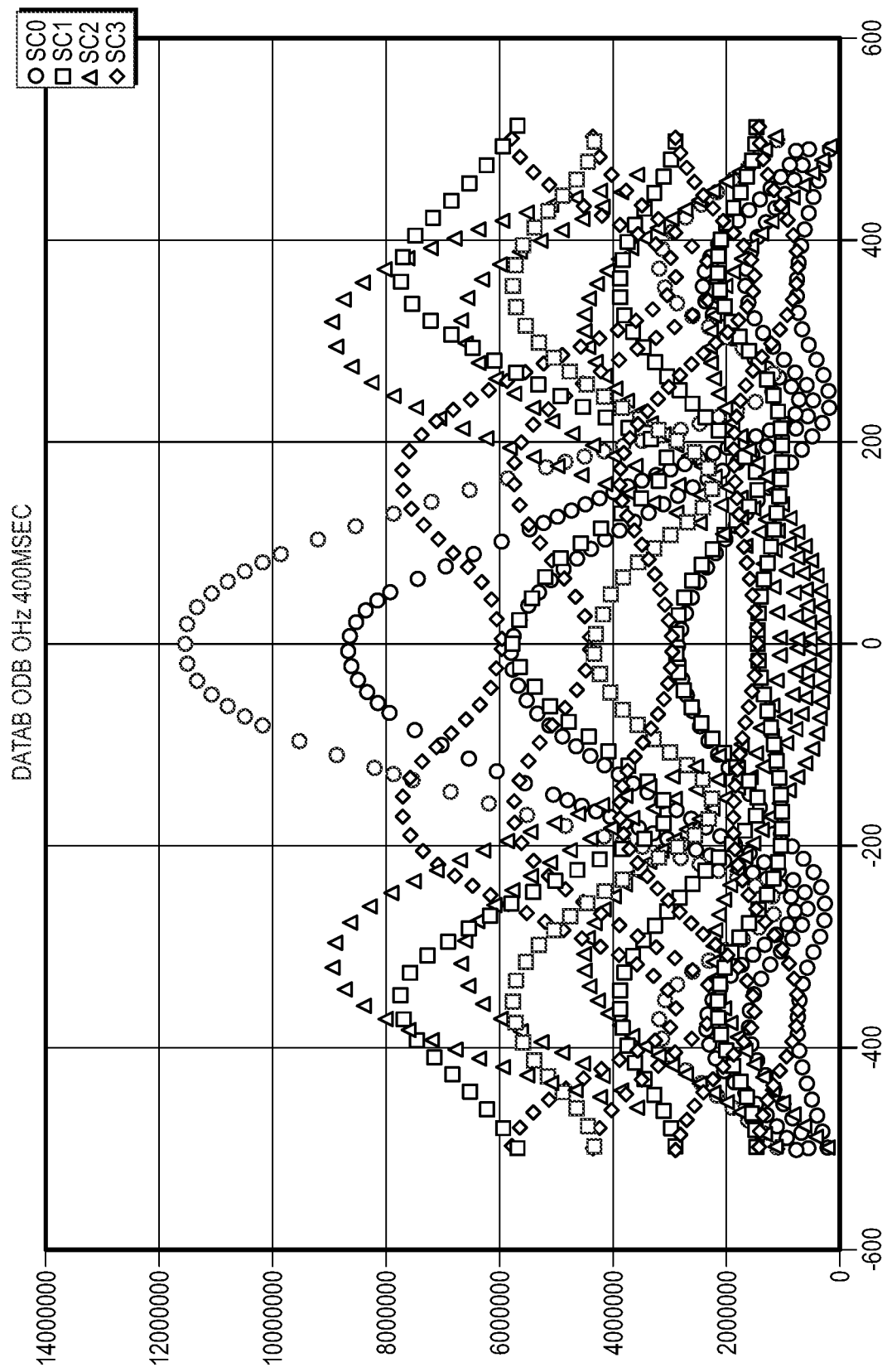
Figure 8R:
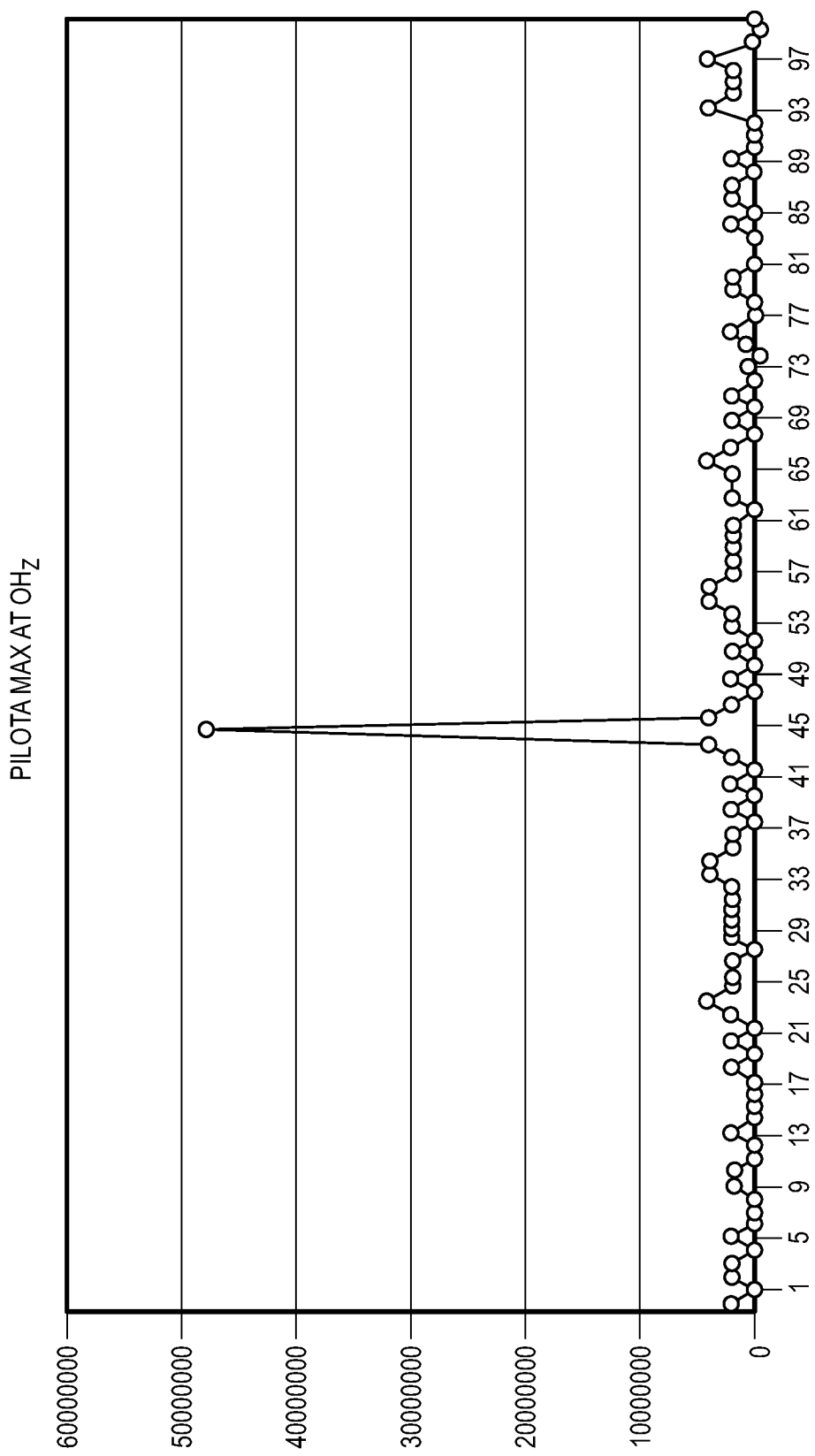
Figure 8S:
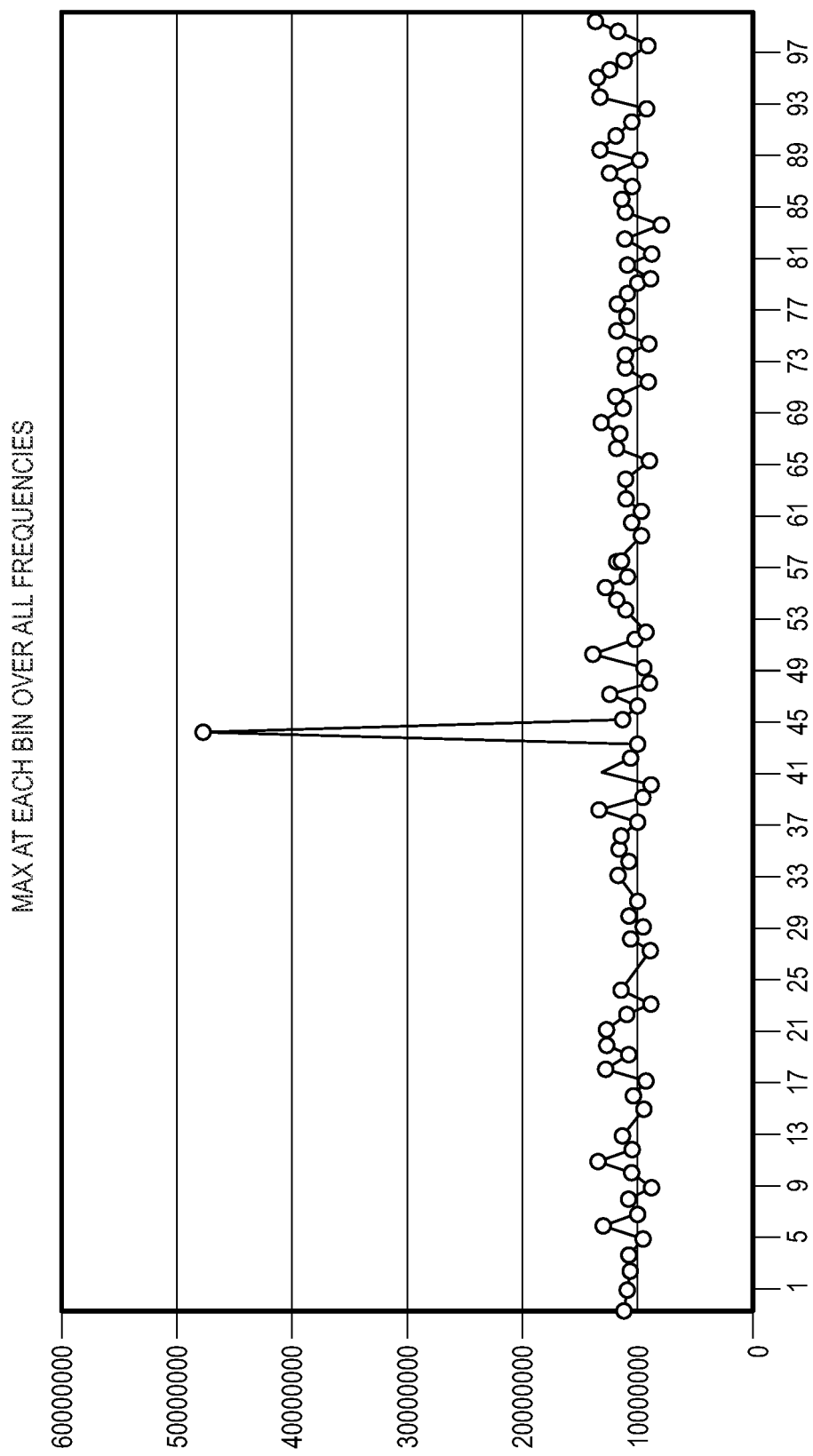
Figure 8T:
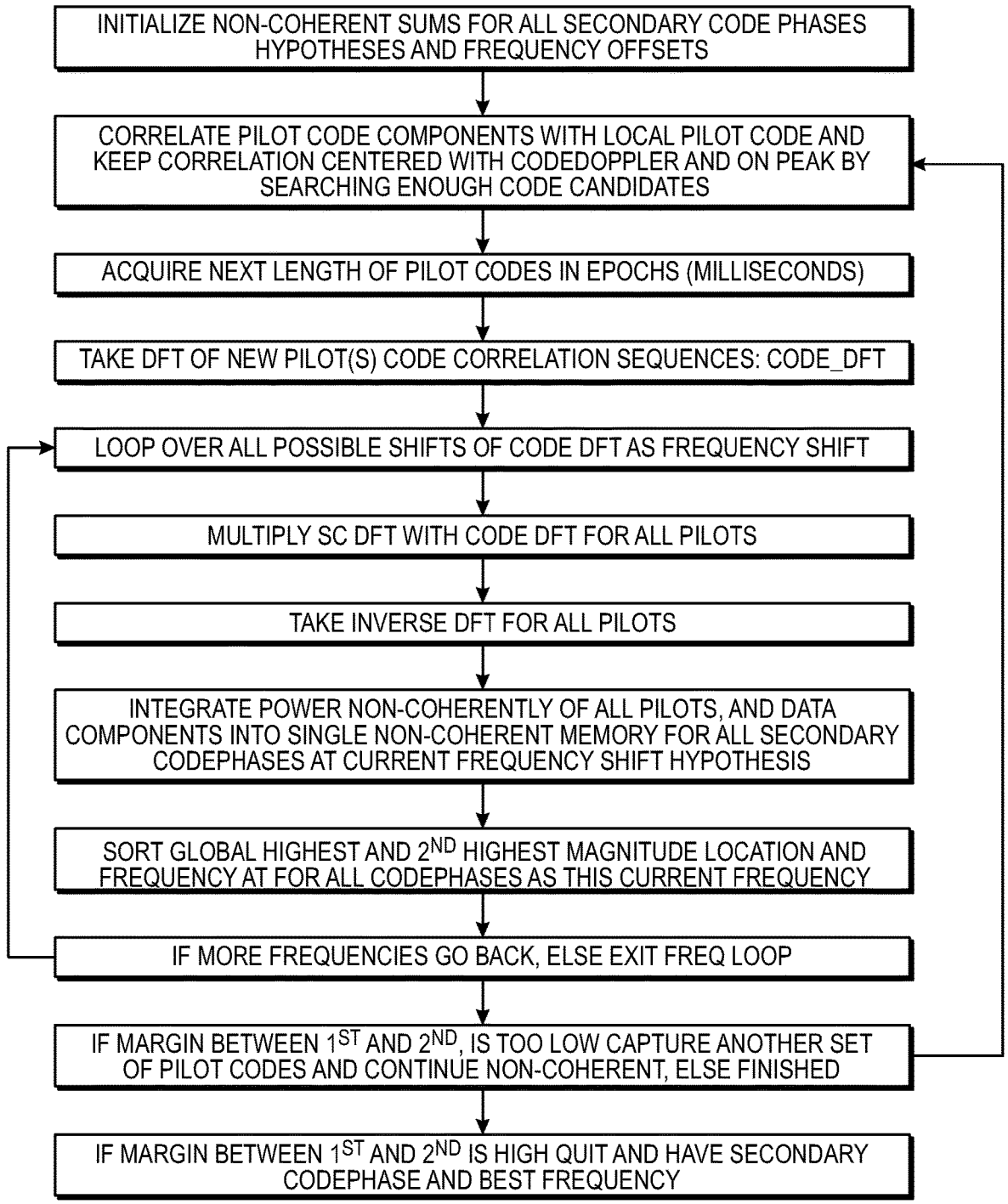
Figure 8U:
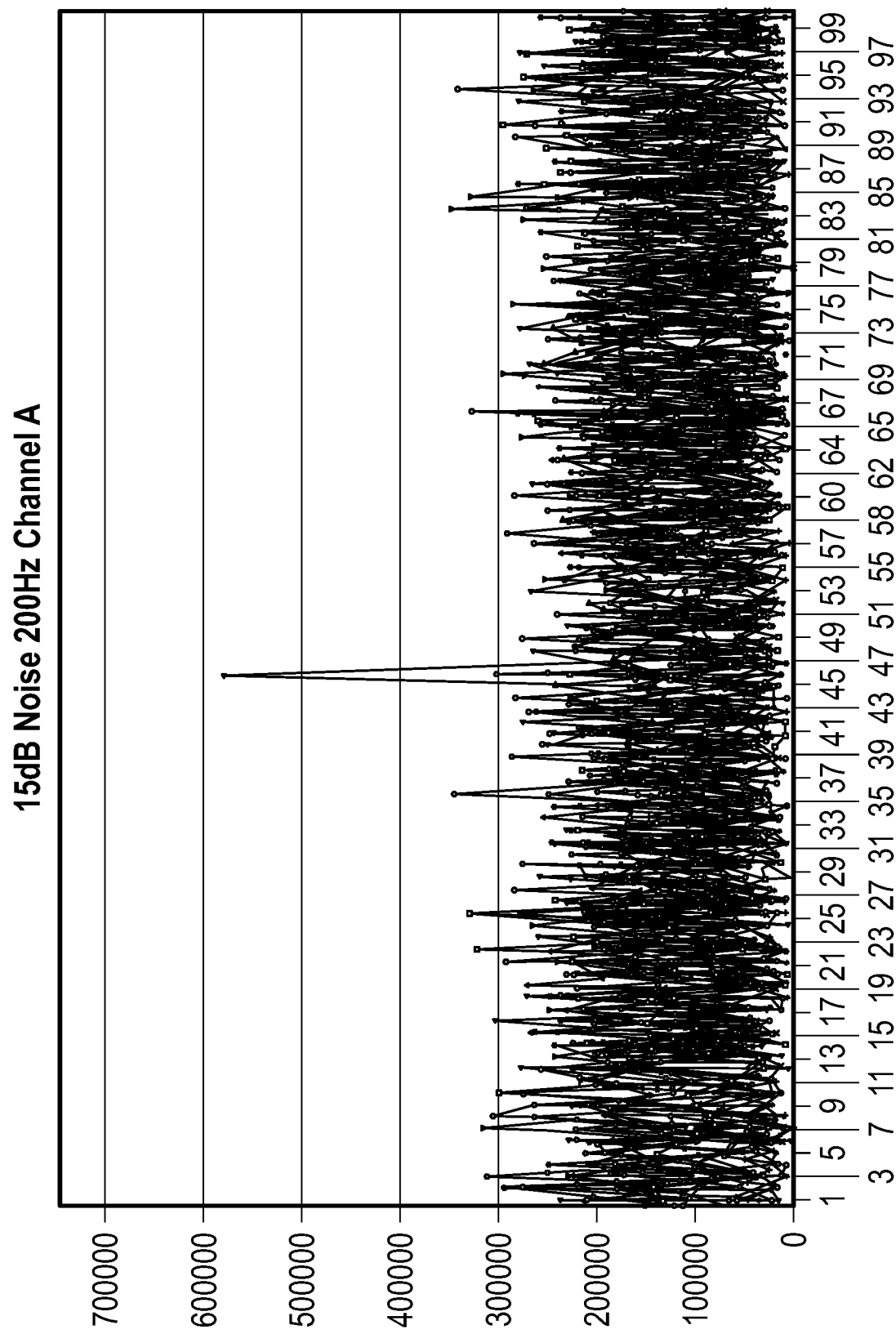
Figure 8V:
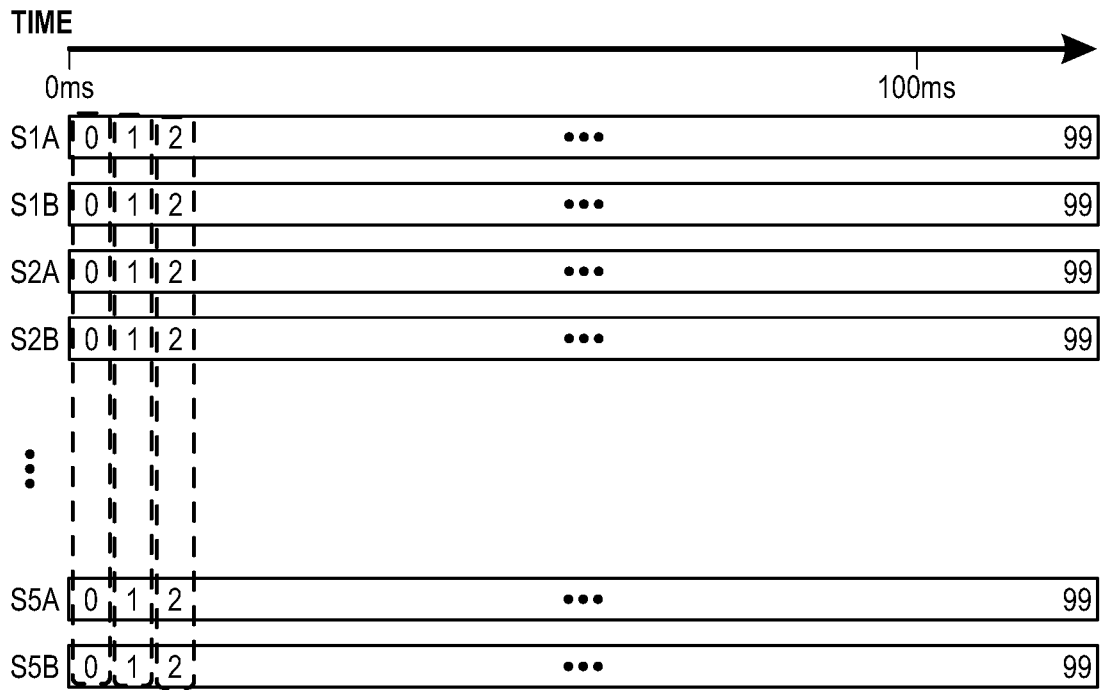
Figure 8W:
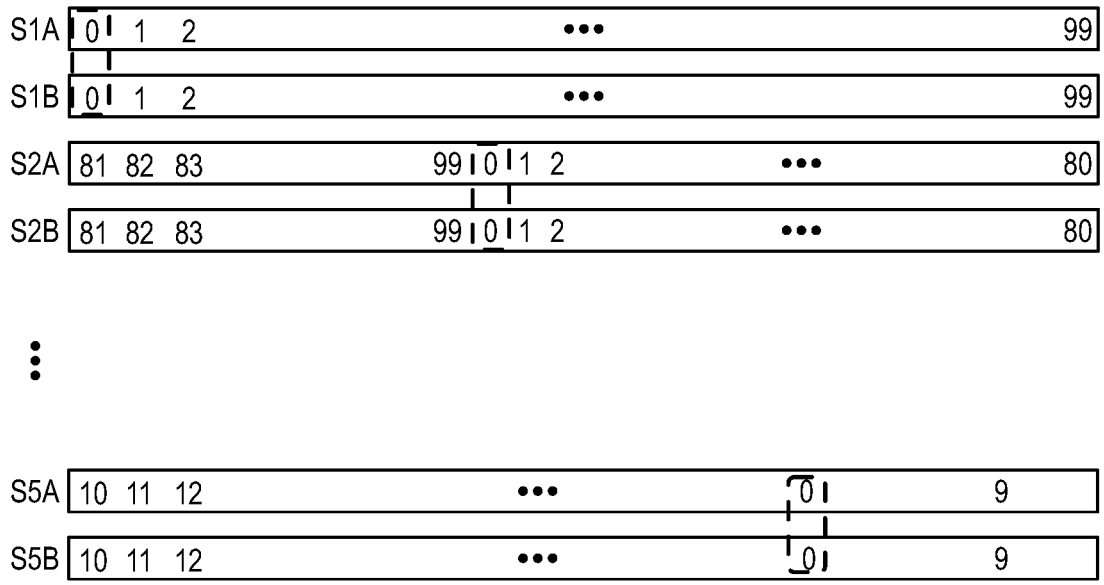
Figure 8X:
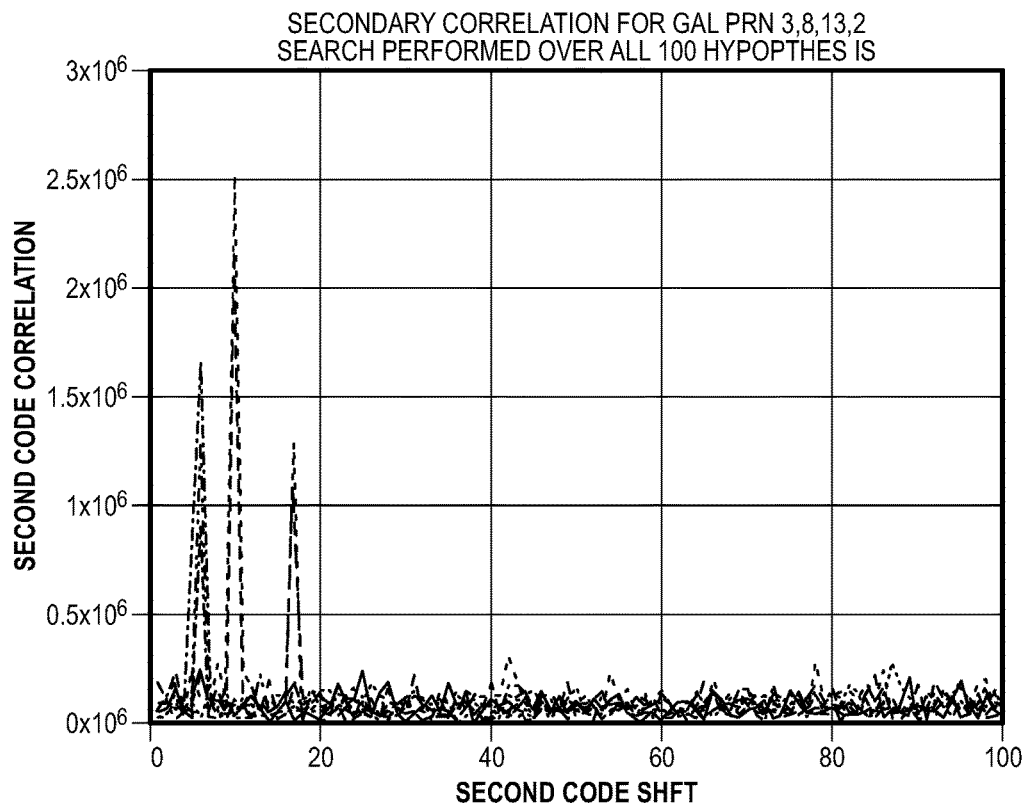
Figure 8Y:
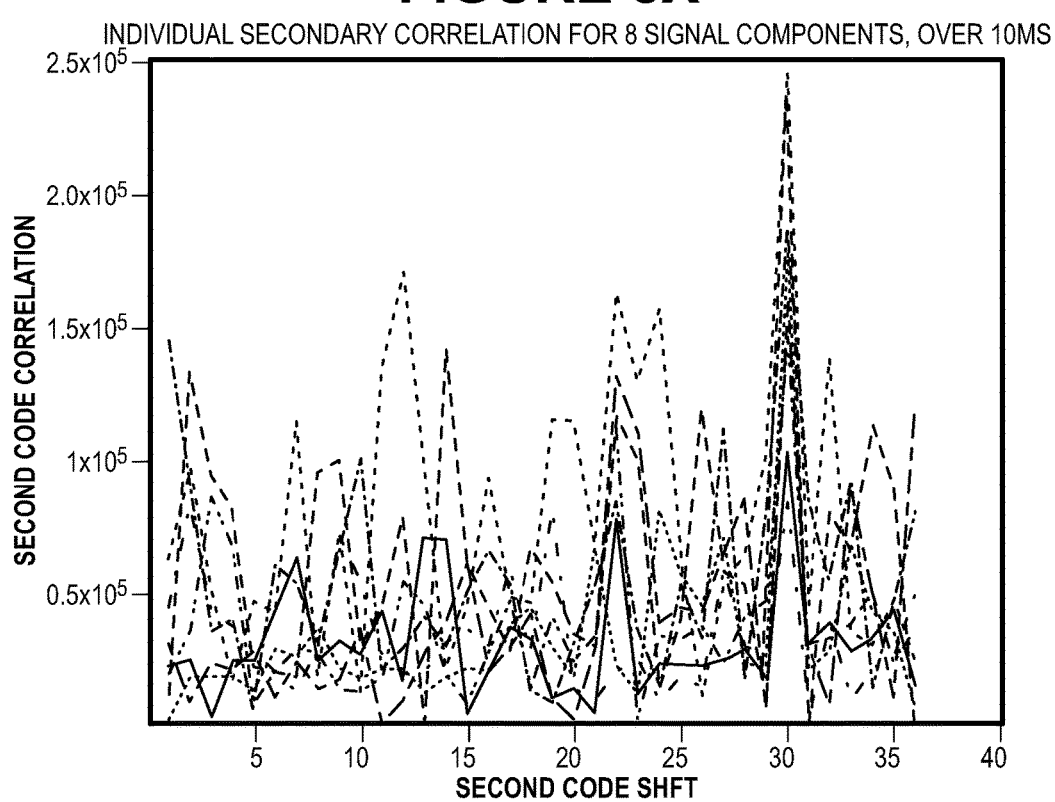
Figure 8Z:
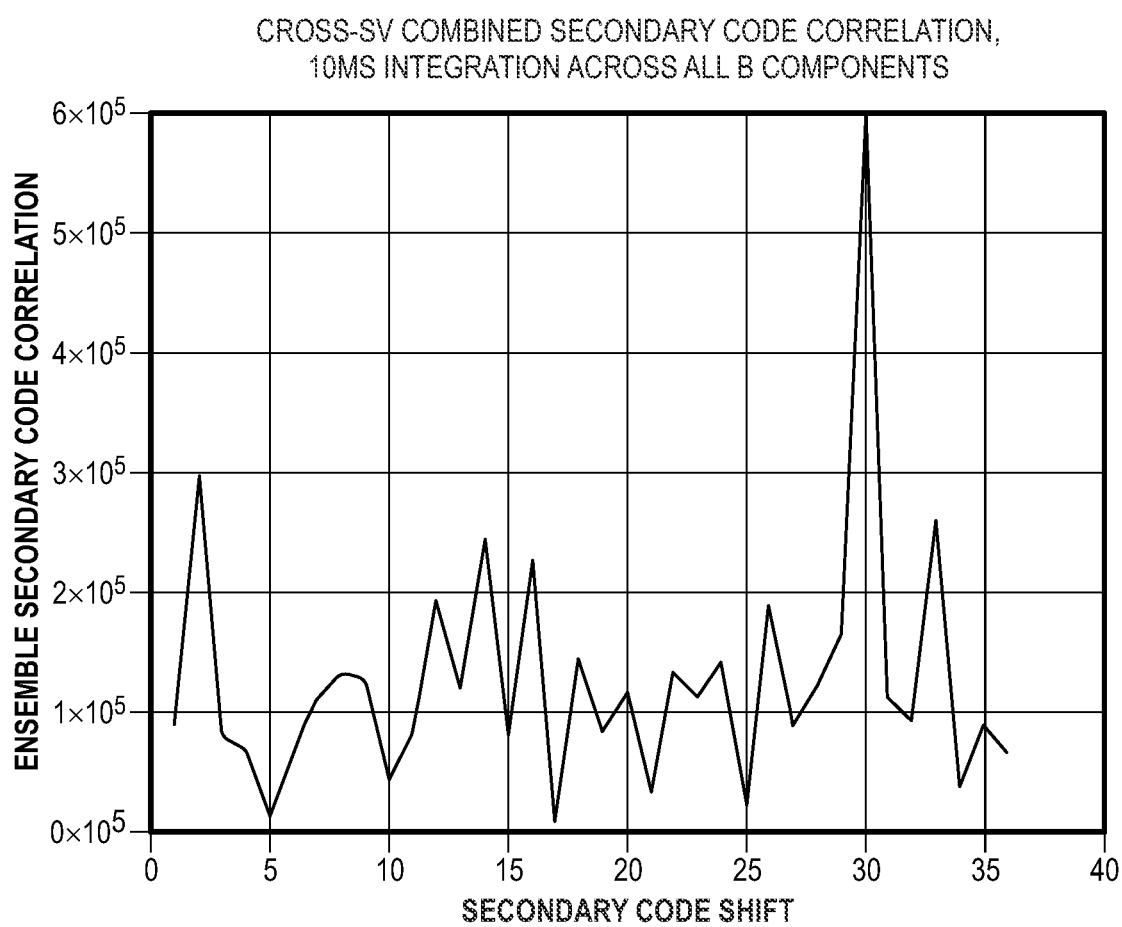
Figure 8A:
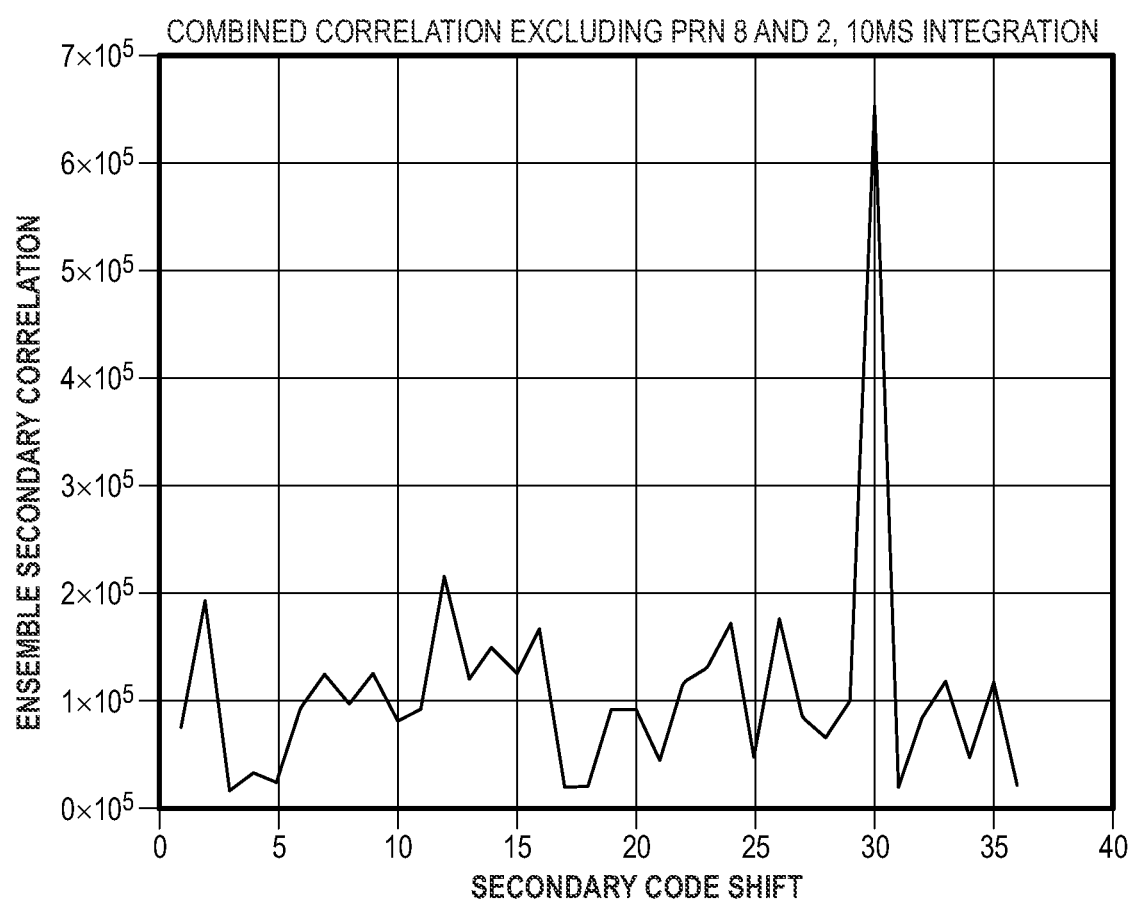
Figure 8B:
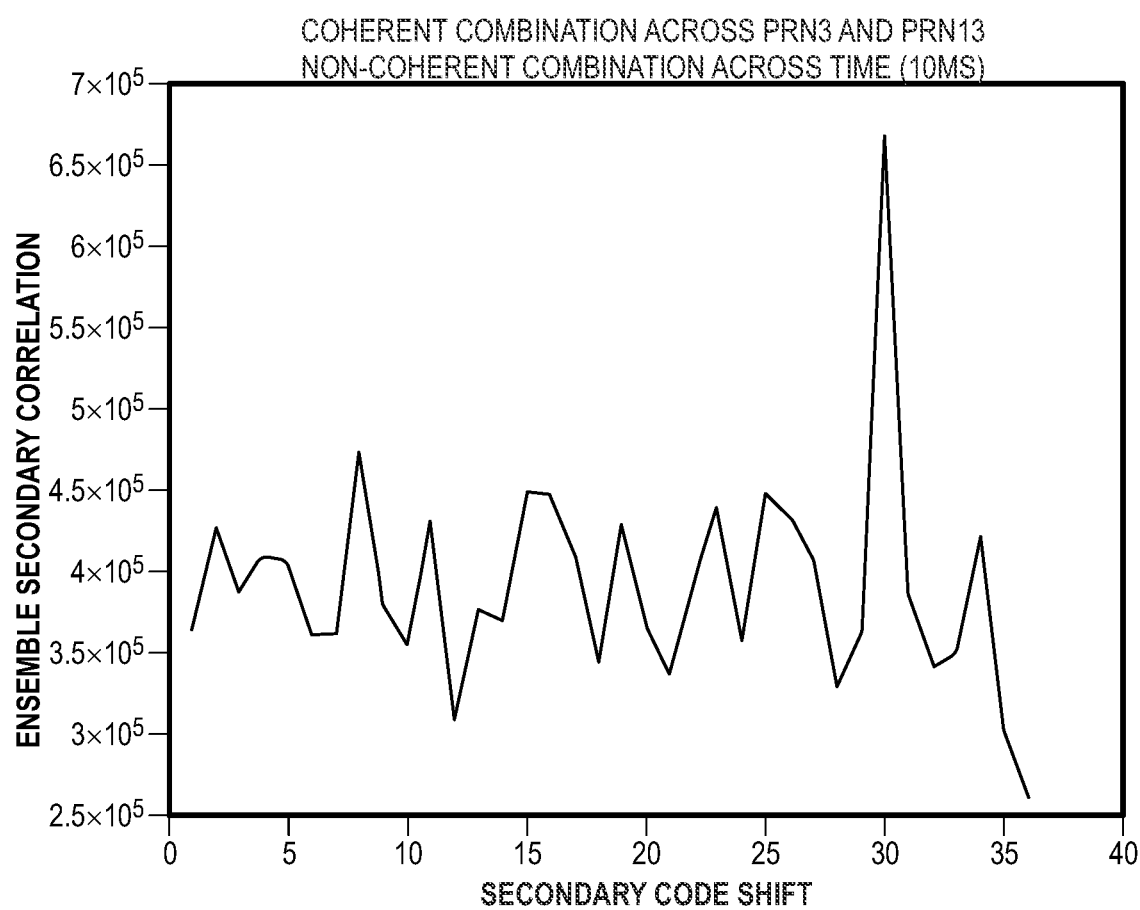
Figure 8C:
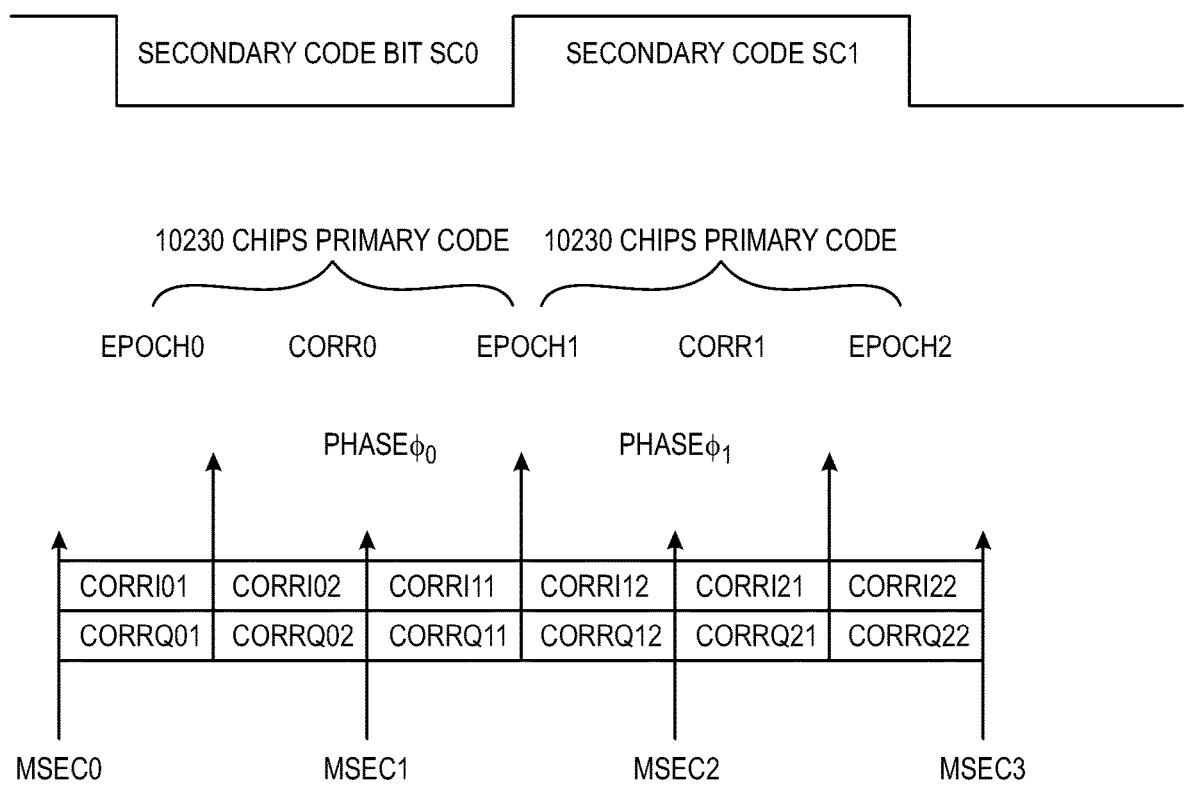
Figure 8D:
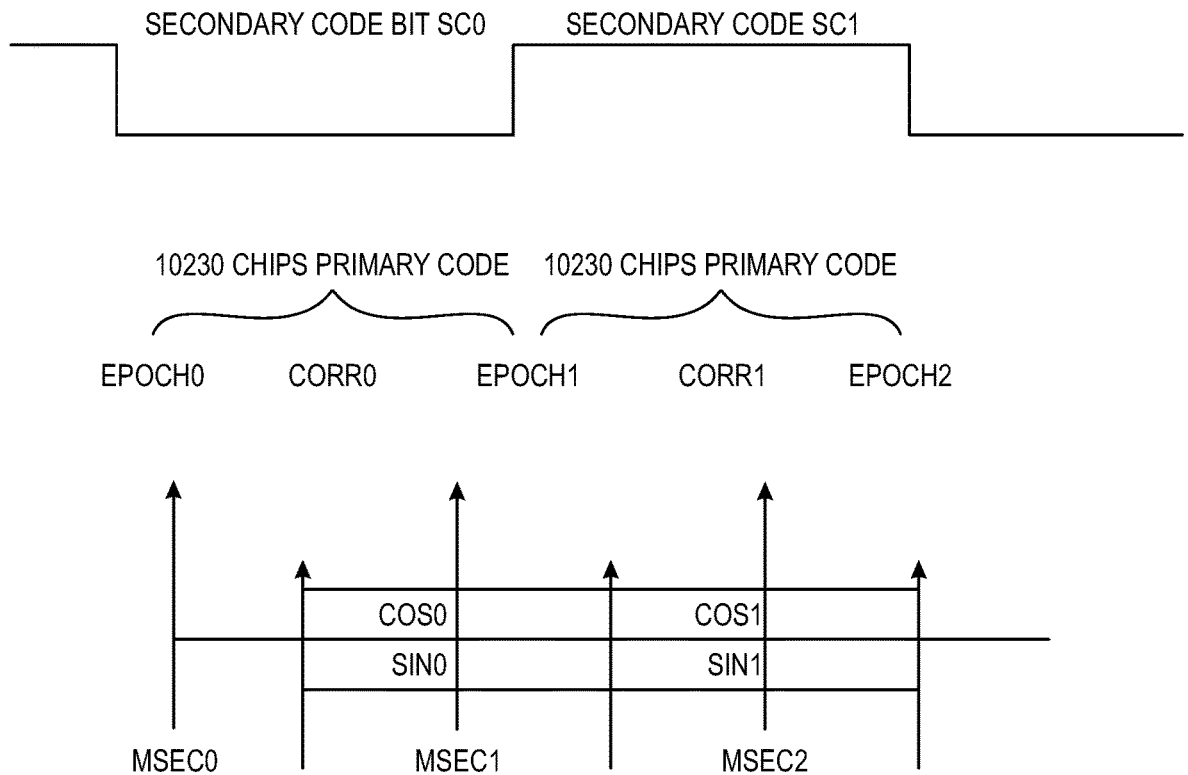
Figure 8E:
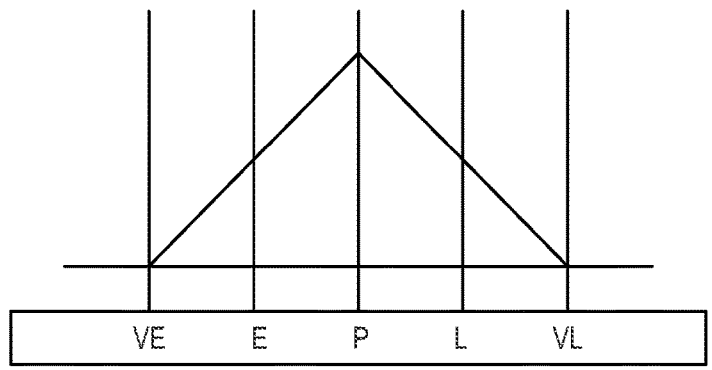
Figure 8F:
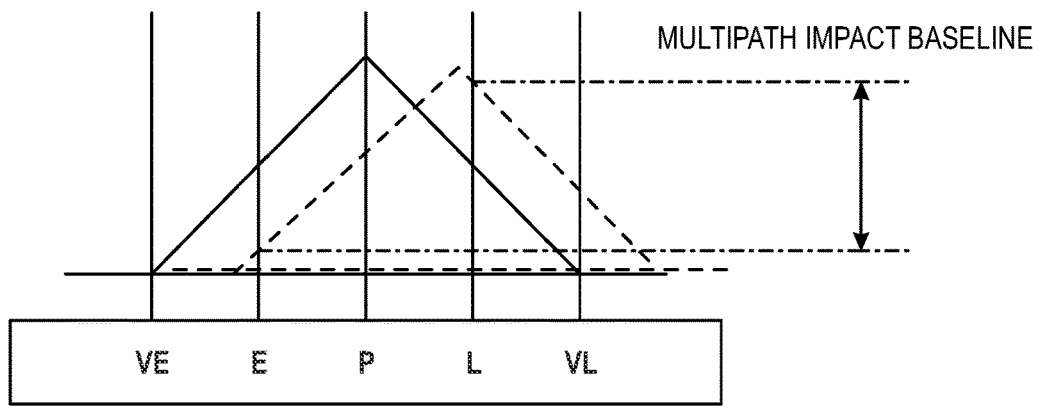
Figure 8G:
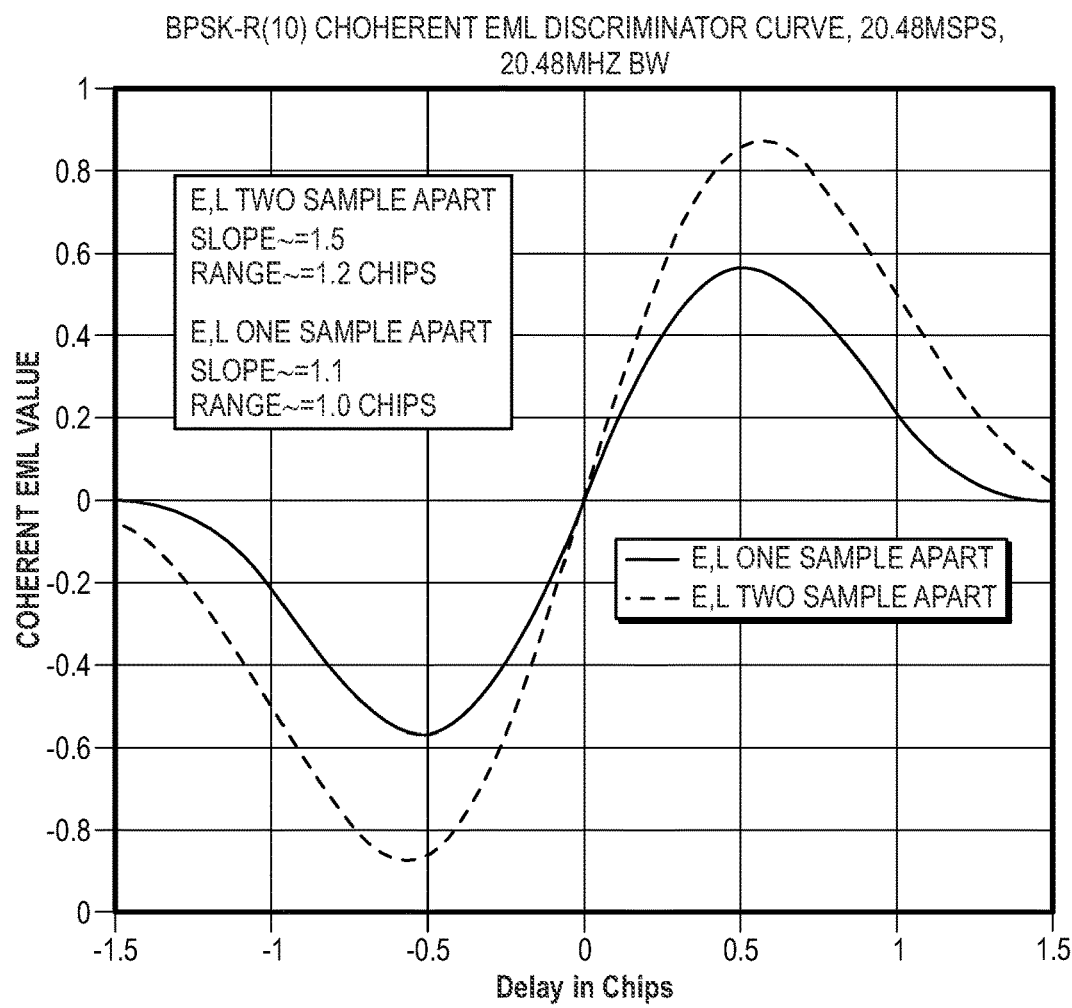
Figure 8H:
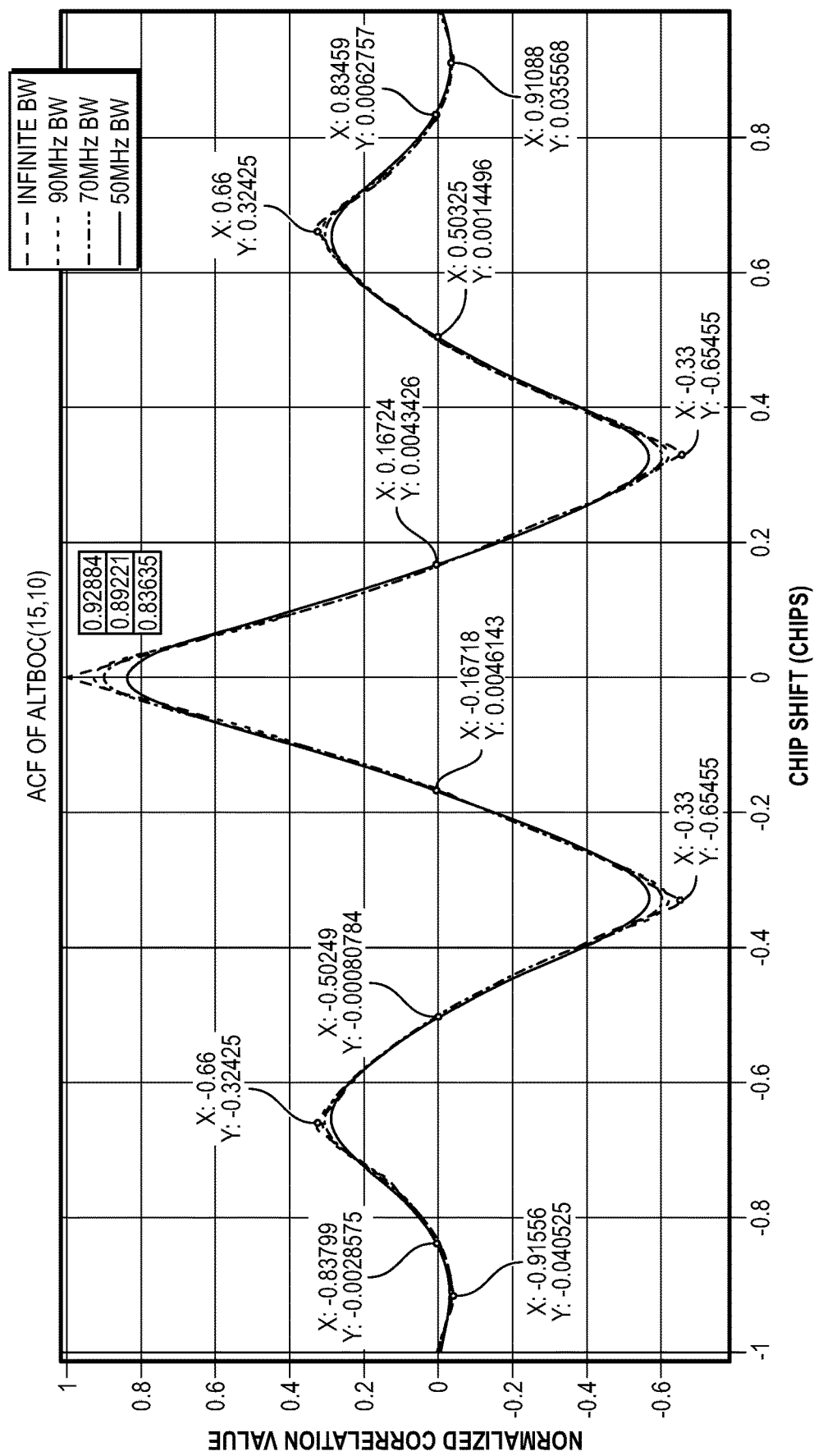
Figure 8I:
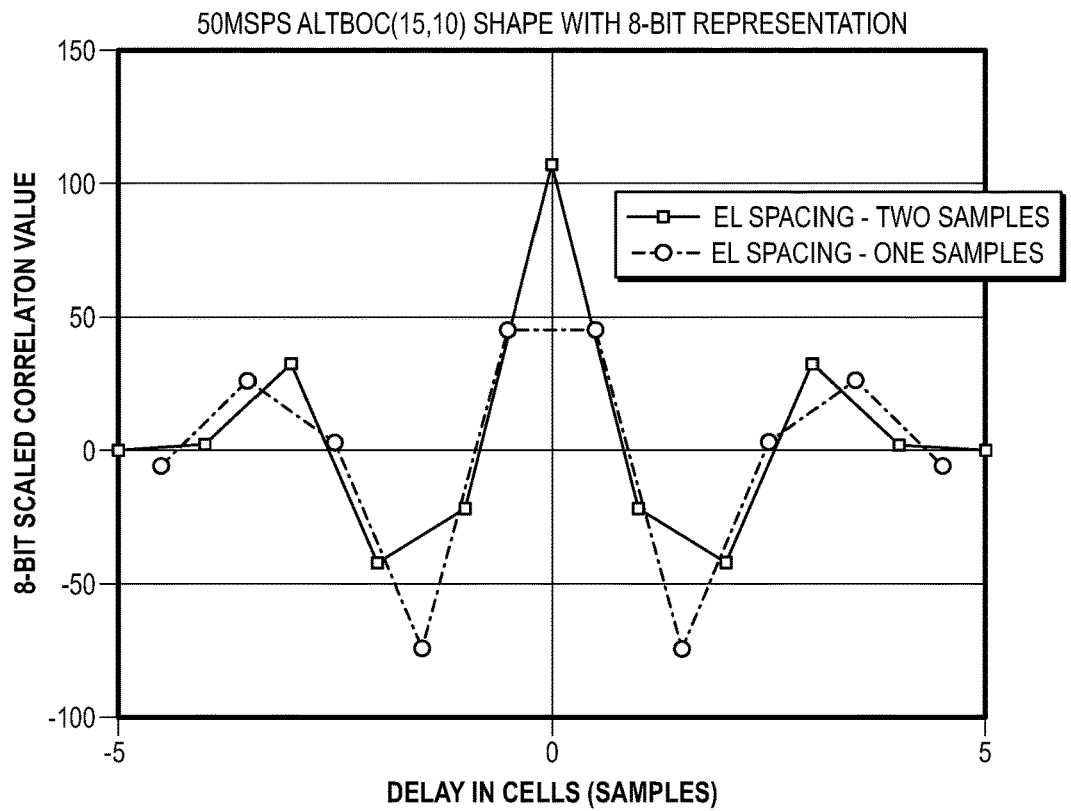
Figure 8J:
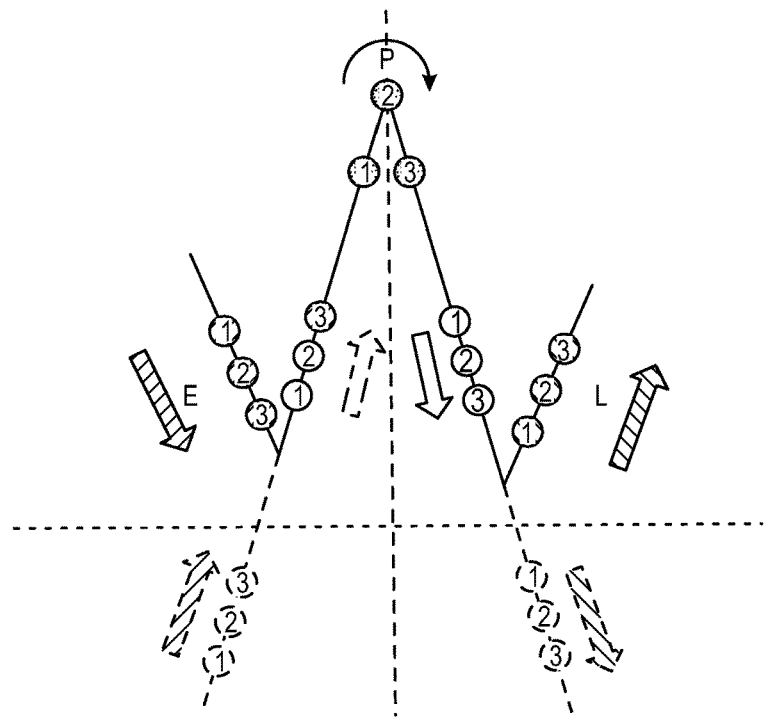
Figure 8K:
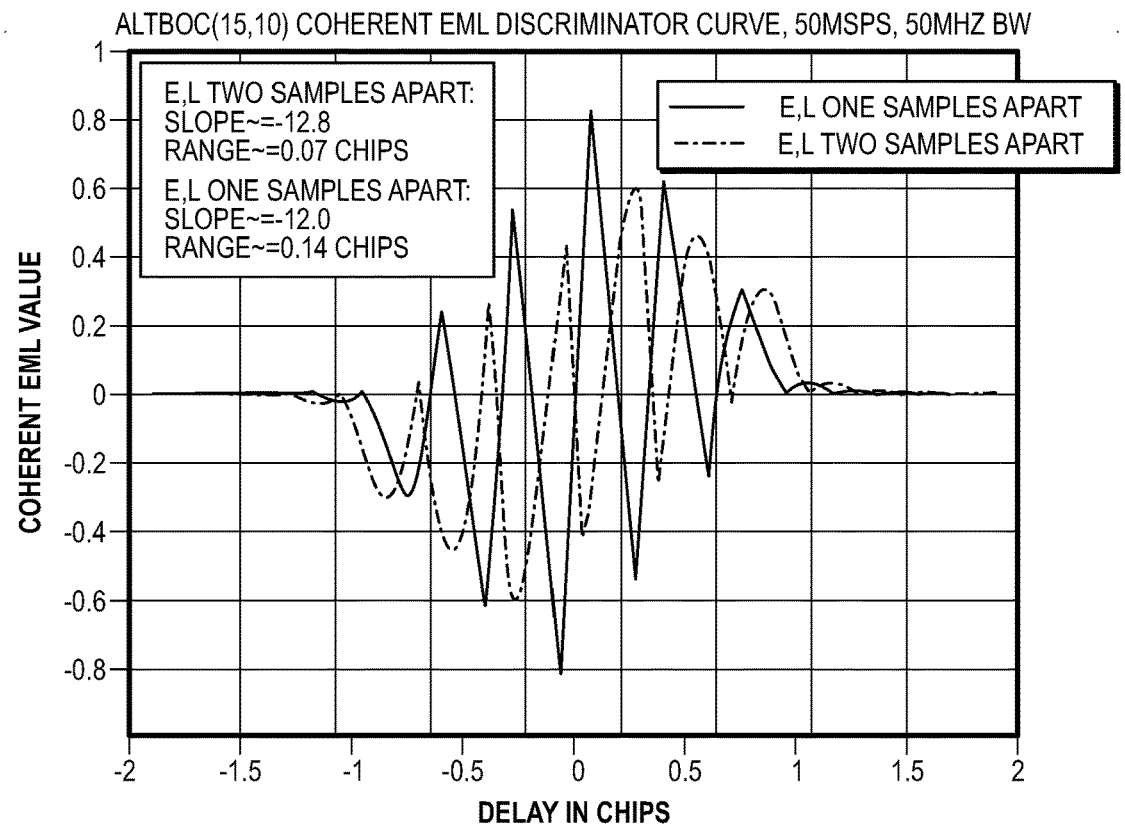
Figure 8L:
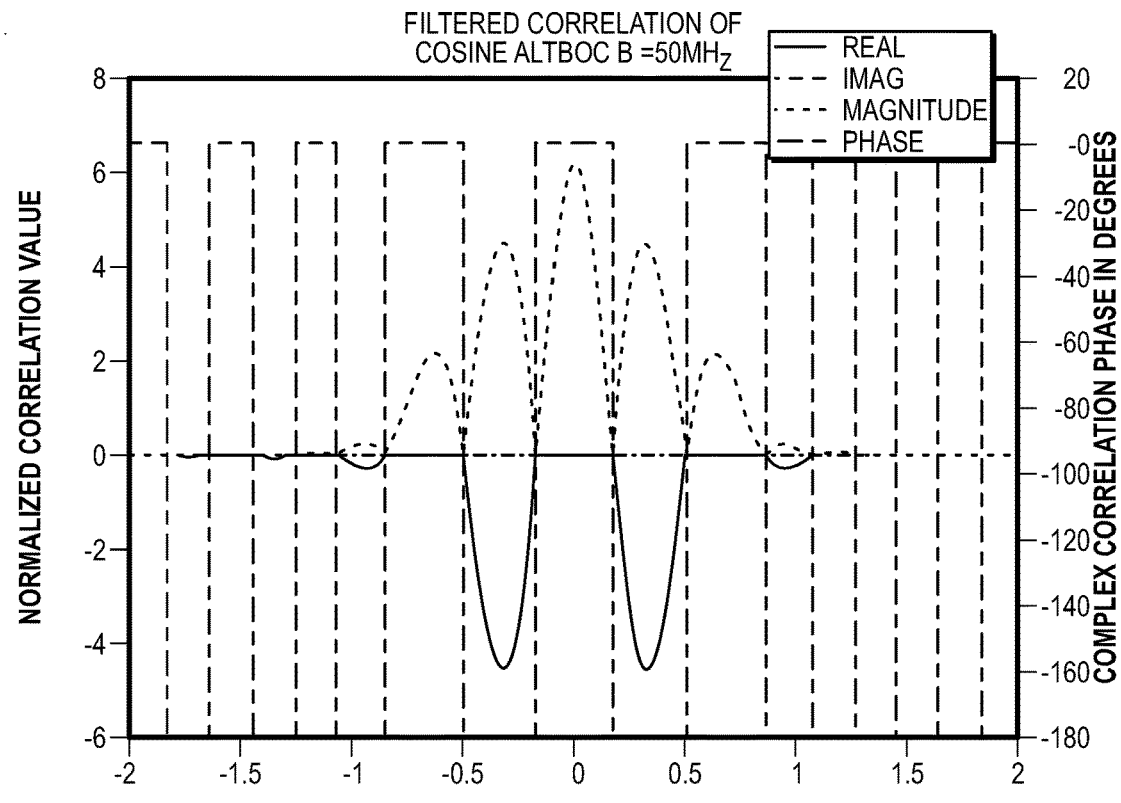
Figure 8M:
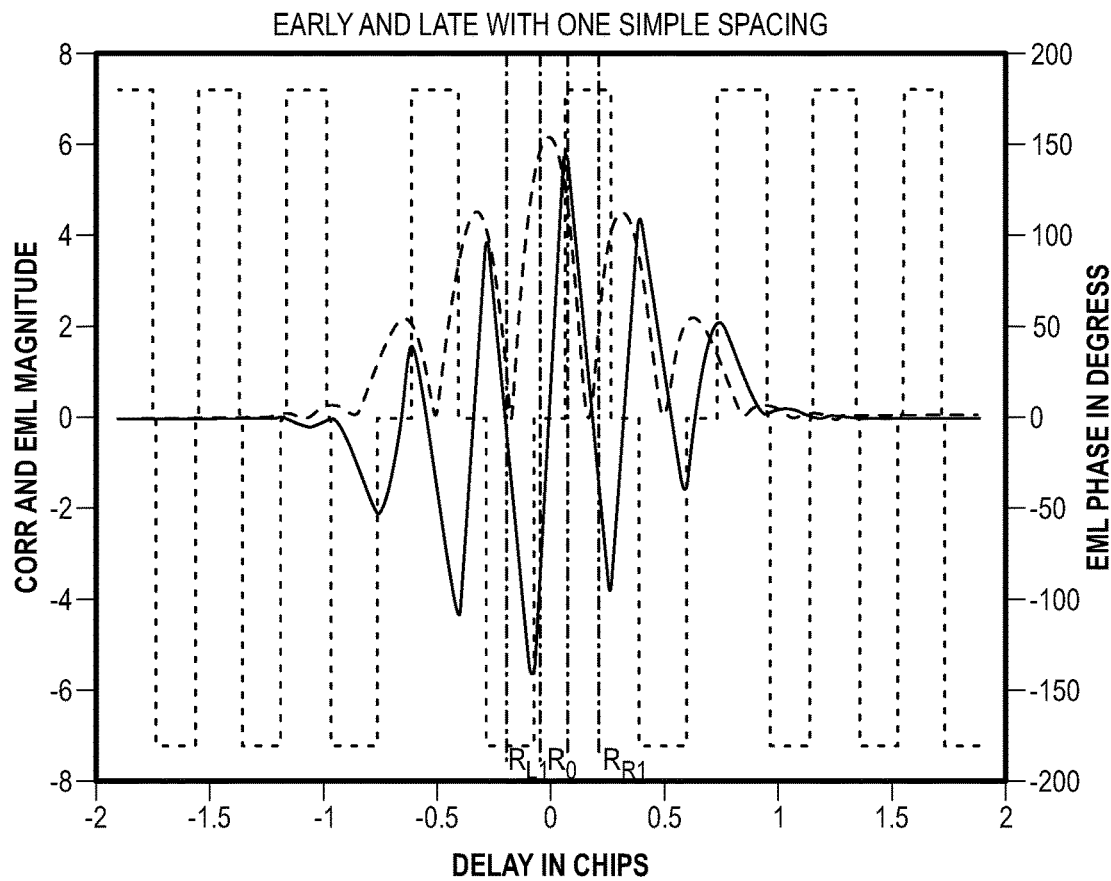
Figure 8N:
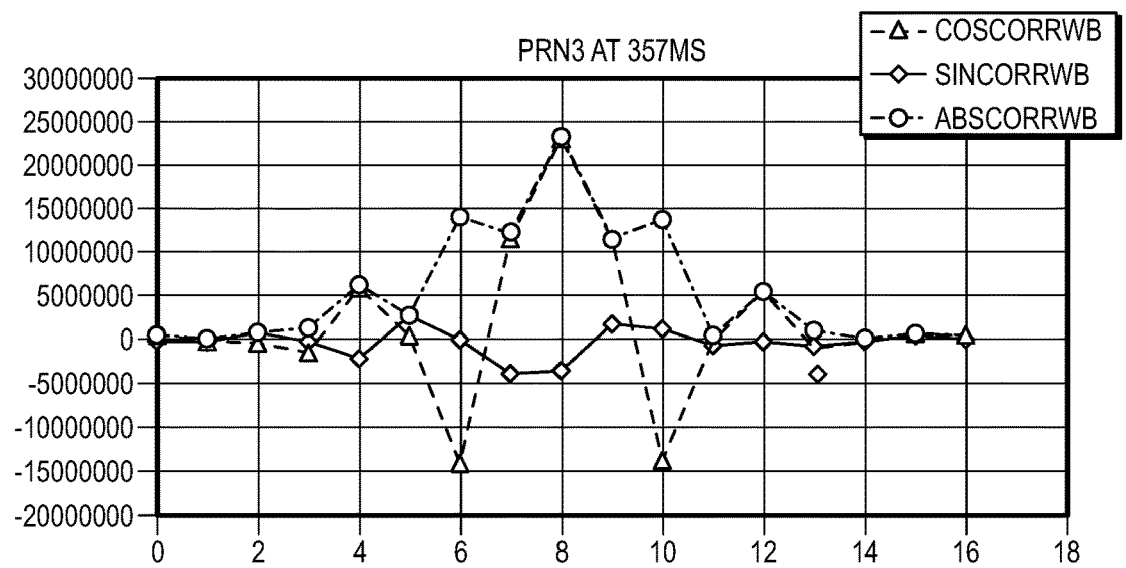
Figure 8O:
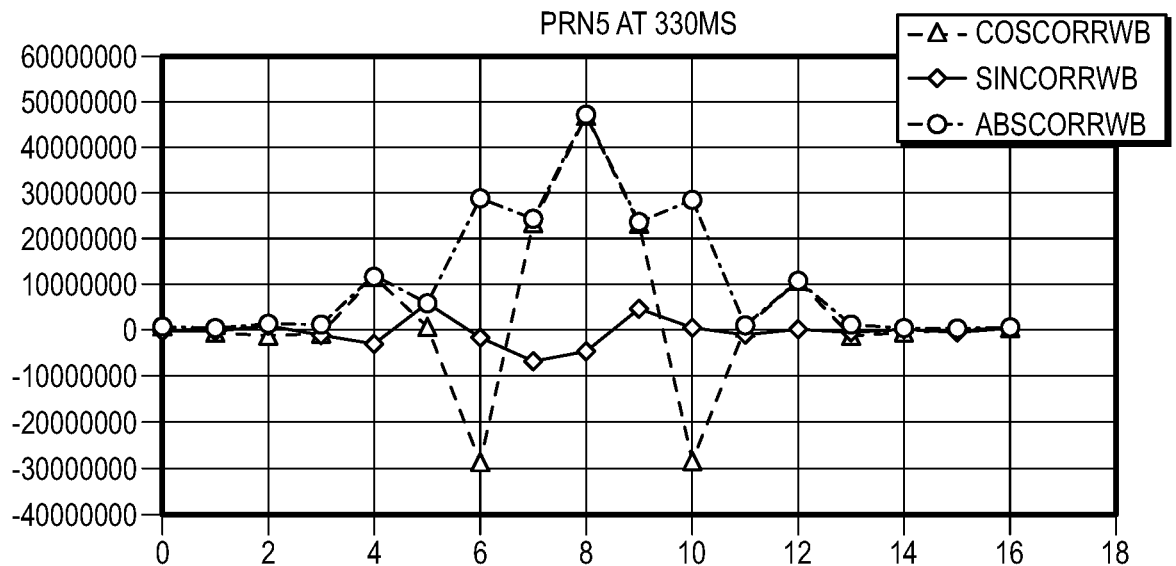
Figure 8P:
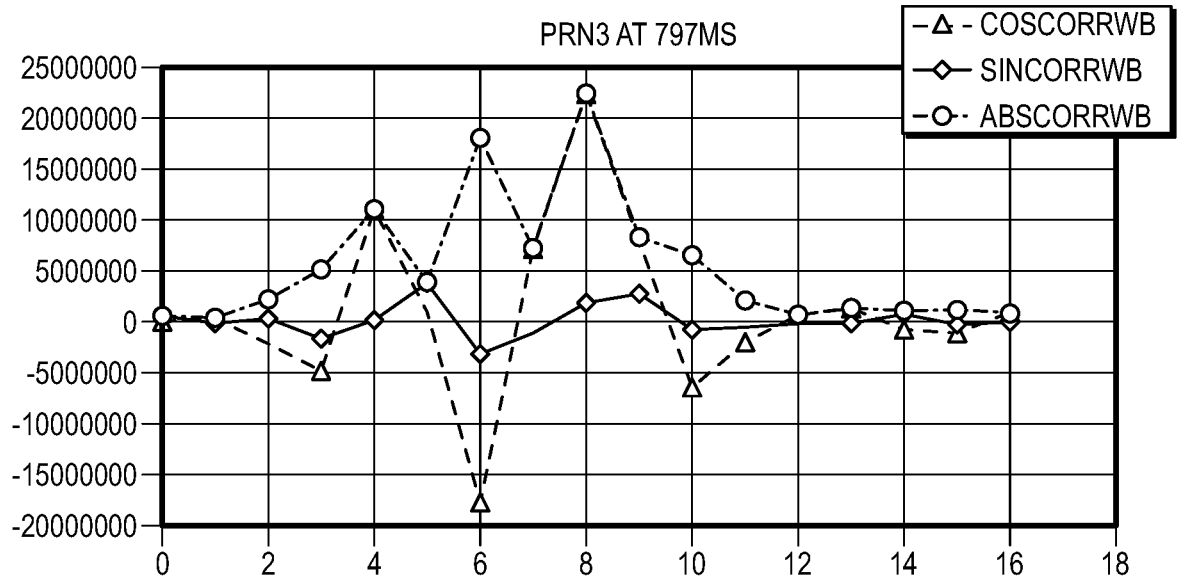
Figure 8Q:
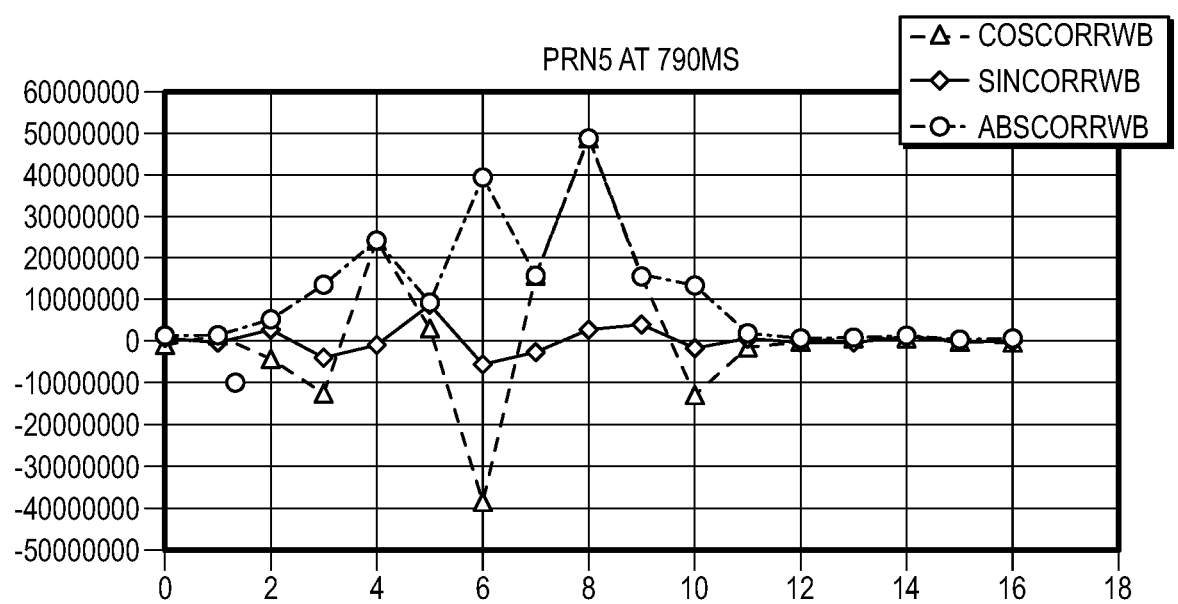
Figure 8S:
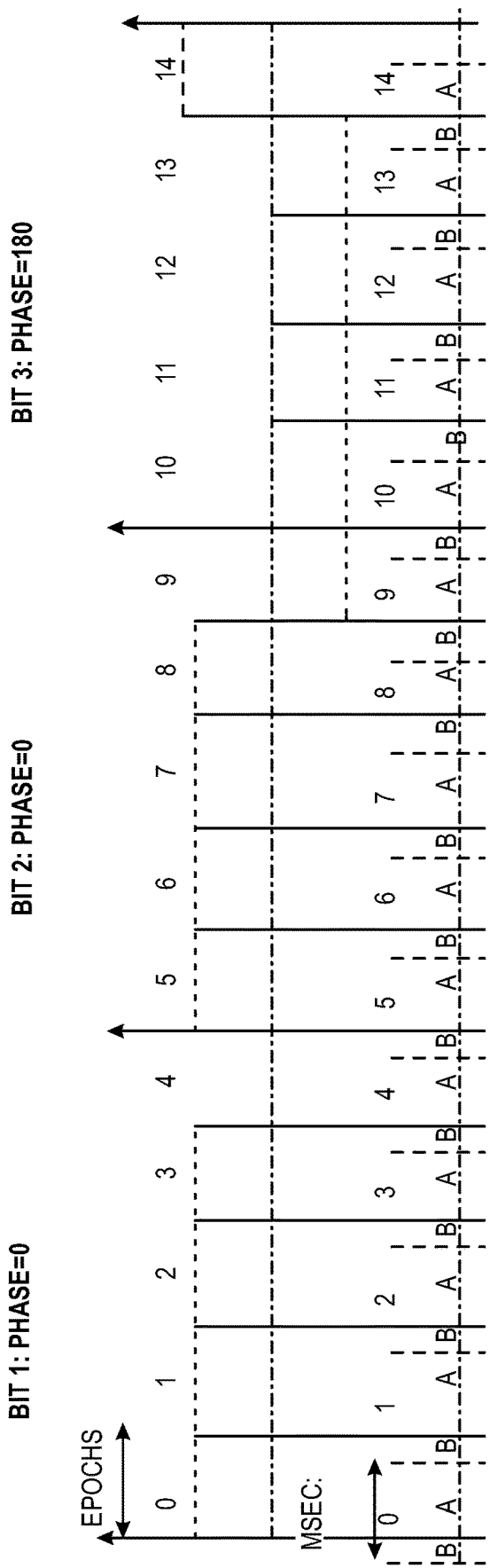
Figure 8T:
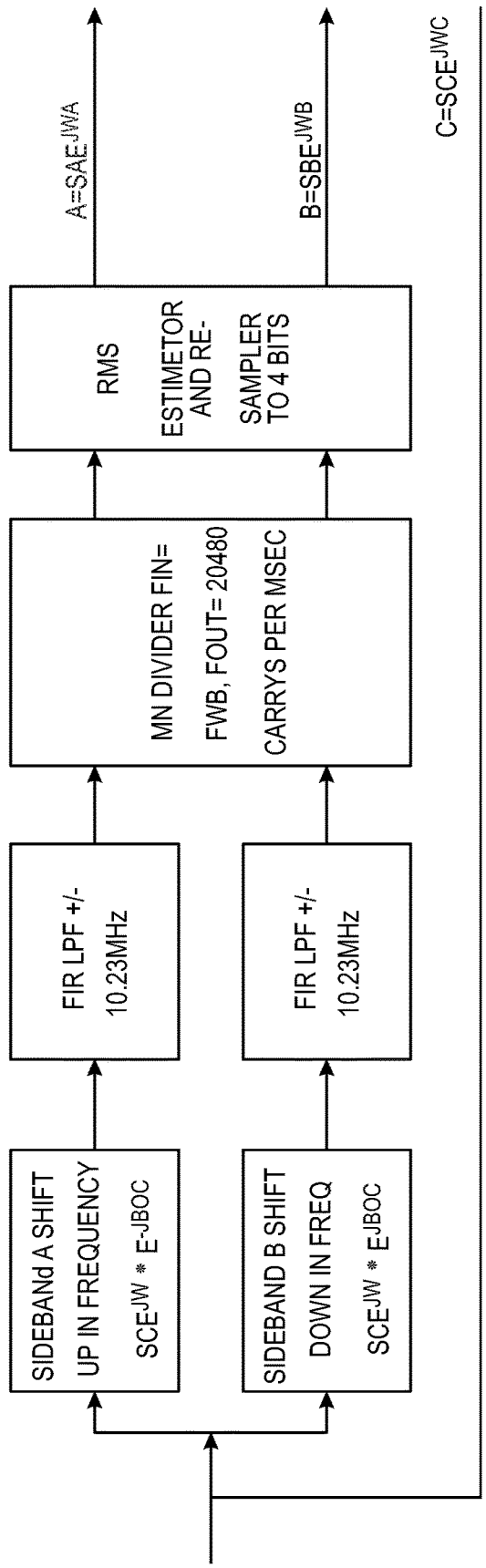
Figure 8U:
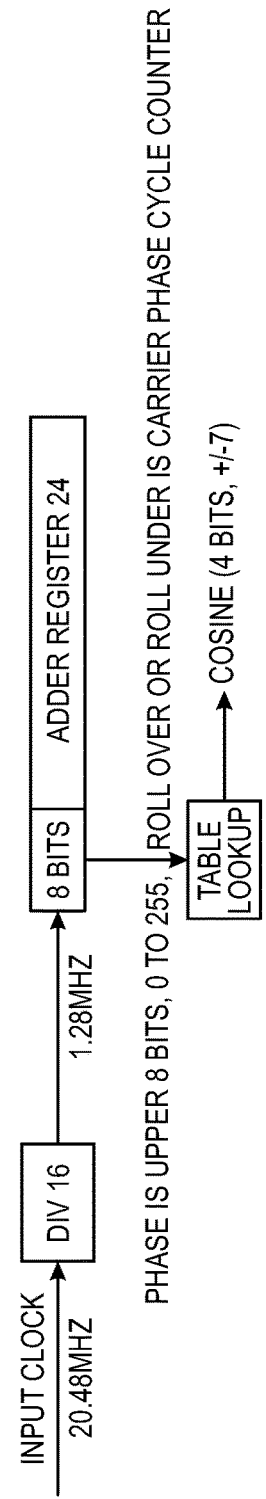
Figure 8V:
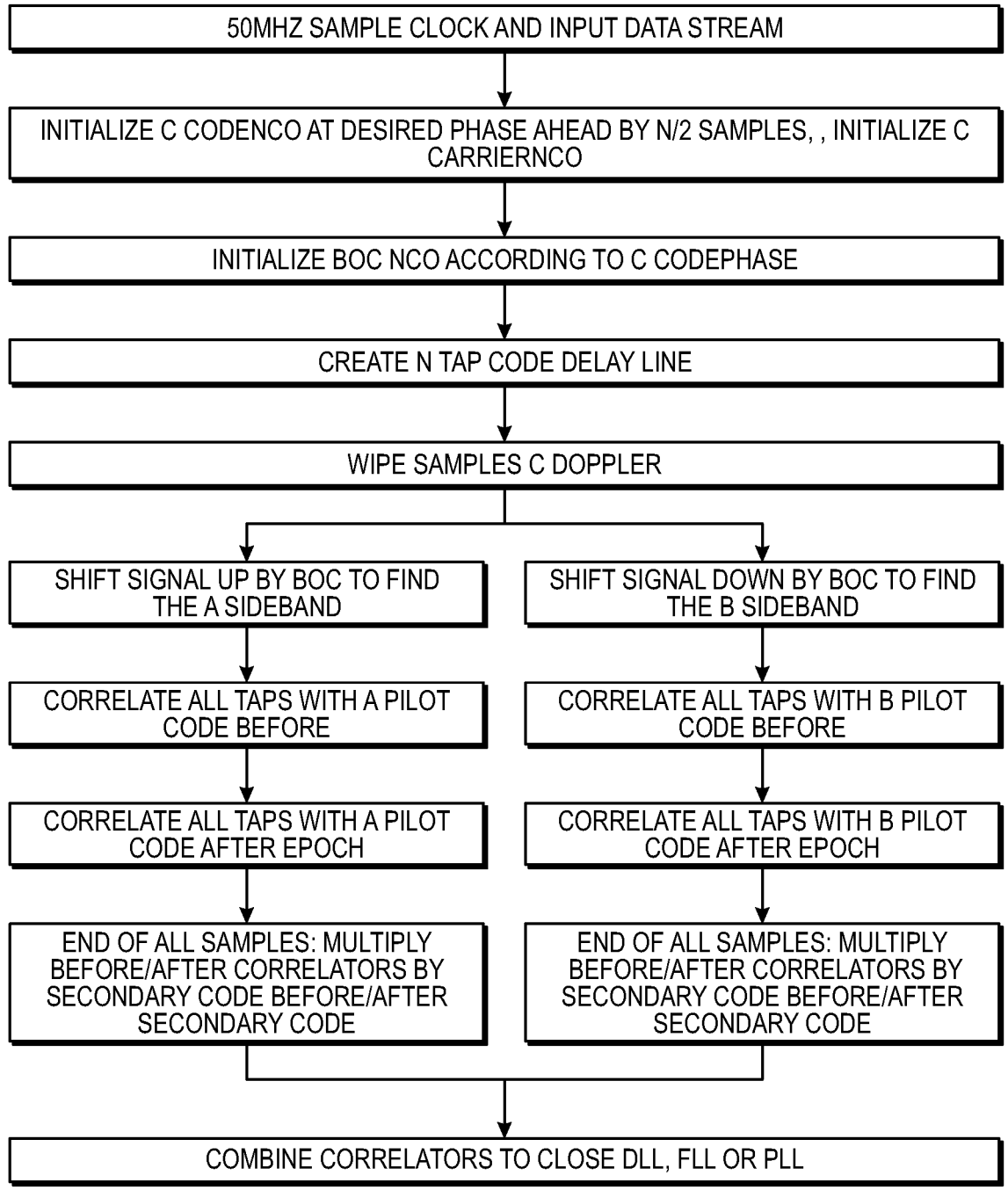
Figure 8V:
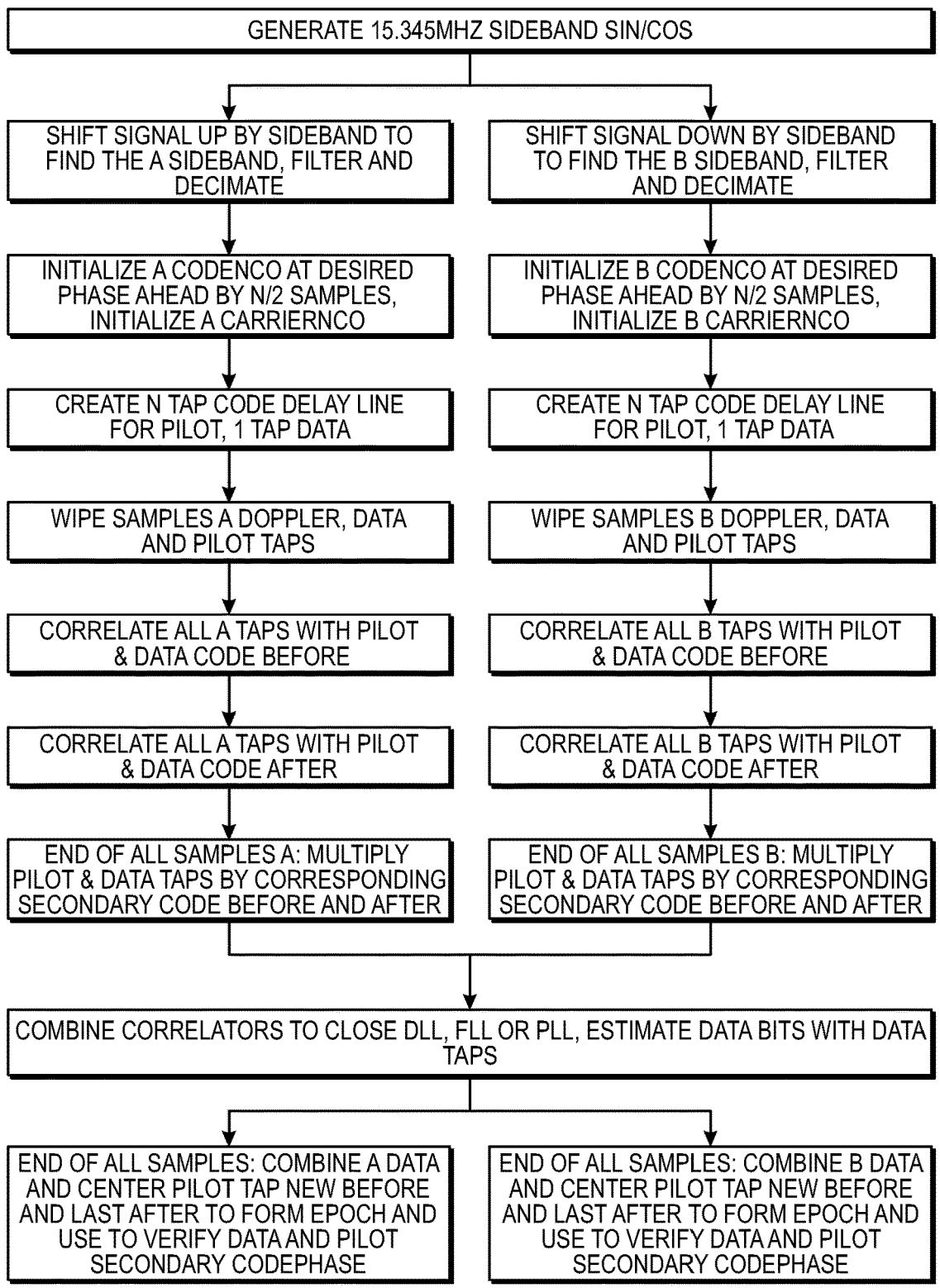
Figure 8X:
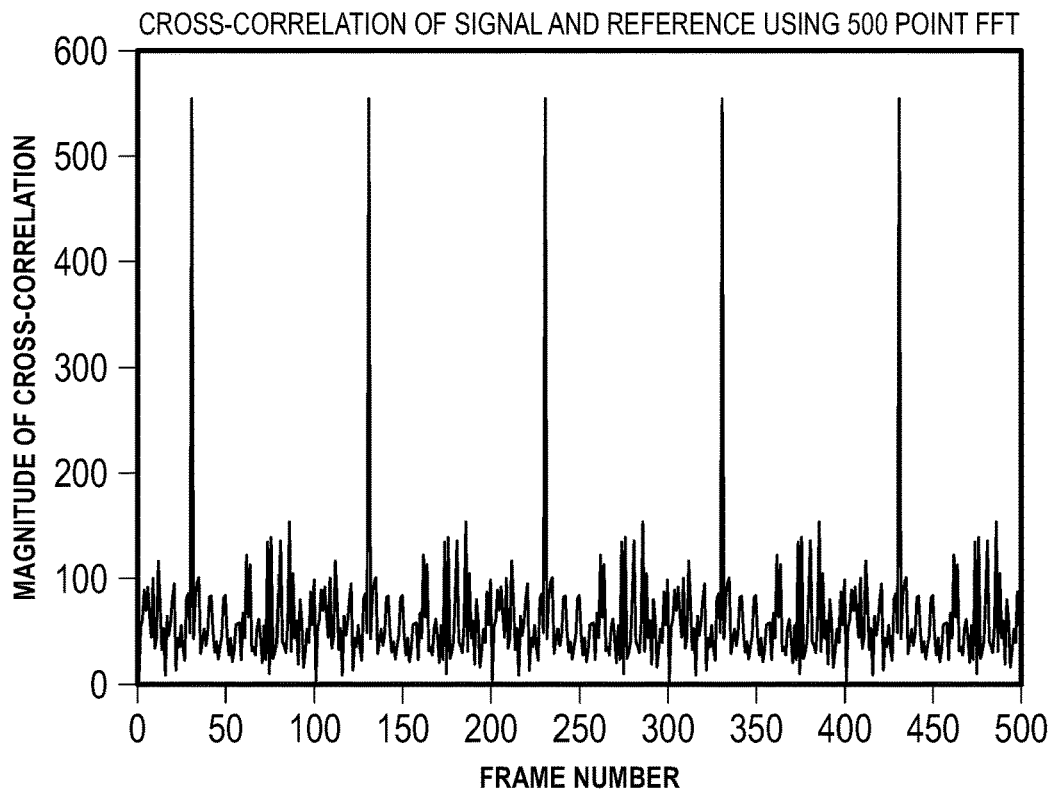
Figure 8Y:
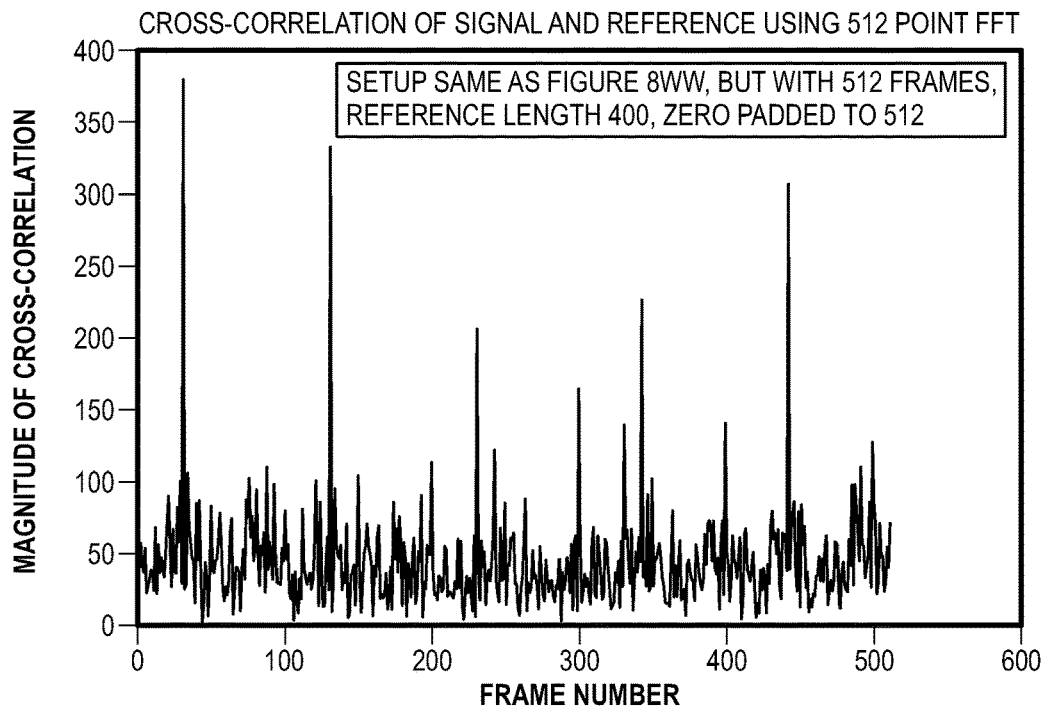

FIGS. 8AAA and 8BBB, for the Galileo SV code 1 example, show cross correlation functions that appear periodic every 100 code symbols. This is due to the repetition of the reference code five times, in this example. Hence, one need only to look at the first 100 outputs of such functions to determine the synchronization of the secondary code sequence. In practice (in this example) instead of performing a cross-correlation of the 5 frames against a repeated reference, one can do successive cross correlations of blocks of 100 differentially constructed data samples against a single period of the reference, and then add the results of these blocks coherently to gain the same result that of the first 100 outputs of the functions of FIGS. 8AAA and 8BBB. This minimizes calculations without incurring any losses. This simplification obviously applies to processing any number of blocks of samples.

For additional clarity we provide here a simple example of an exemplary processing procedure with the above method using a delay of 1 msec appropriate to an L5 secondary code signal. We also assume that the boundaries of the primary correlation output coincides with that of the secondary code (in practice it may be off by a fraction of a chip). Assume the primary code correlation output is denoted c(t), t=0, d, . . . , (N−1)×d where N is any number desired for sensitivity, and where d is 1 msec. Each output sample is phase inverted by the secondary code, say s(m−p), m=0, 1, 2, . . . where p represents an unknown timing of the secondary code to be determined. The differential correlation samples are then constructed as b(t)=c(t)×c*(t−1) where the asterisk means complex conjugate. This contains a modified secondary sequence, which we call the differential secondary code, s(m−p)×s(m−1−p) multiplied by a constant phase angle exp(j2π$f_e$d), where $f_e$ is a frequency error and d is 1 msec and where p represents the unknown code phase. This is at baseband with no additional carrier. The procedure is then to construct a cross-correlation function, or more precisely circularly cross-correlation function, from the differential correlation samples b and differential secondary code c(t)×c(t−1). This is best done if the length of data N is chosen to be equal to or a multiple of the sequence length c. This cross-correlation at all offsets can be done most expeditiously, and nearly instantaneously, using an FFT (Fast Fourier Transform). A peak found in the correlation process is indicative of the phasing of the secondary code within the primary code. As discussed above, the delay d can be chosen to be different values, e.g., 1, 2, 3, 4, . . . , thus producing different, nearly independent, output sequences, which may be combined in a variety of ways for sensitivity improvement (e.g., coherently, incoherently, false alarm checking, etc.). By combining a multiplicity of such output sequences with different delays such sensitivity improvement may overcome signal-to-noise ratio losses associated with the nonlinear construction of the differential correlation samples. It should be noted that differential correlation samples are at baseband without a carrier presence and hence this approach obviates the need to first determine carrier frequency, a difficult process if large carrier frequency uncertainty is present and high sensitivity is desired.

Figure 7:
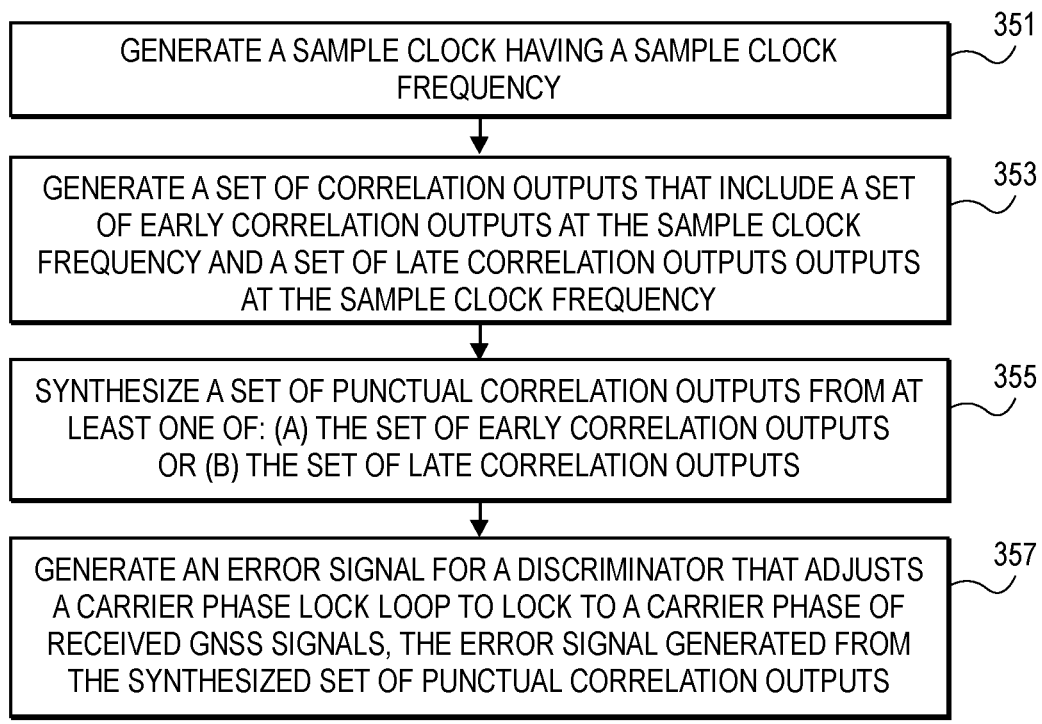
FIG. 7 is flowchart that shows a method, according to one embodiment, for synthesizing a set of punctual correlation outputs in a GNSS receiver (e.g., during tracking mode).

Another aspect of this disclosure involves the generation of synthetic punctual correlation outputs which can be used to generate an error signal for a discriminator in a phase lock loop used in the GNSS receiver to track and lock to a carrier phase of GNSS signals received at the receiver. In one embodiment, no local punctual code is generated for a correlation in the GNSS receiver during the tracking mode and no set of punctual correlation outputs is created or used in a correlator in the GNSS receiver; rather, according to this aspect, the GNSS receiver synthesizes the synthetic punctual correlation outputs from early or late (or early and late) correlation outputs from hardware correlators or discrete Fourier transforms. FIG. 7 shows an example of a method according to this embodiment, and the appendix (e.g., in the section with the heading "Tracking") also provides examples of this aspect. In operation 351 in FIG. 7, a GNSS receiver generates a sample clock that has a sample clock frequency. In operation 353, the GNSS receiver generates a set of correlation outputs that include a set of early correlation outputs at the sample clock frequency and/or a set of late correlation outputs at the sample clock frequency. Then, in operation 355, the GNSS receiver can synthesize a set of punctual correlation outputs from at least one of: (a) the set of early correlation outputs or (b) the set of late correlation outputs. The synthesized set of punctual correlation outputs can then be used, during tracking mode in the GNSS receiver, to control or adjust control loops in the GNSS receiver, such as a phase lock loop that attempts to lock to the carrier phase of a GNSS signal. For example, as shown in operation 357, the synthesized punctual correlation outputs can be used to generate an error signal for a discriminator to adjust a carrier phase lock loop to lock to a carrier phase of a GNSS signal. The discriminator, as is known in the art, is a component in the phase lock loop (PLL) that adjusts the output of the PLL so that it stays locked to a determined phase of a received signal, and the discriminator uses an error signal to make the adjustments of the output of the PLL.

In one embodiment, the synthesized set of punctual correlation outputs can be used to estimate signal power to normalize a discriminator of a delay lock loop. In one embodiment, a spacing in time between samples for successive early and late correlation outputs for a GNSS signal is a single sample clock separation that is less than a chip in the GNSS signal, and the sample clock frequency can be less than a factor of 3 times an L5 chipping rate of 10.23 MHz. In one embodiment, the spacing is a narrowed code delay that reduces multipath error while maintaining the sample frequency clock frequency at less than a factor of 4 times an L5 chipping rate of 10.23 MHz. In one embodiment, the set of early correlation outputs are a set of very early correlation outputs, and wherein, if a GNSS signal is strong, the synthesized set of punctual correlation outputs is synthesized by multiplying the set of very early correlation outputs by a factor greater than 1. In one embodiment, the synthesizing comprises computing a product of a scale factor and a sum of early and late correlation outputs; the scale factor can be computed to produce, for each synthesized punctual correlation output, a synthesized punctual correlation output that has the same amplitude as a true punctual correlation output when early and late correlation outputs are balanced. In one embodiment, the set of early correlation outputs comprises a set of very early correlation outputs and early correlation outputs, and the set of late correlation outputs comprises a set of very late correlation outputs and late correlation outputs, and wherein the synthesizing comprises averaging, for each synthesized punctual correlation output, a very early correlation output, an early correlation output, a late correlation output, and a very late correlation output. In one embodiment, the set of early correlation outputs comprises a set of very early correlation outputs and early correlation outputs, and the synthesizing comprises averaging, for each synthesized punctual correlation output, a very early correlation output and an early correlation output.

In one embodiment, the set of punctual correlation outputs is synthesized for an Altboc format in a C channel of GNSS signals, and the set of punctual correlation outputs uses known predetermined phase offsets between correlations that are beyond a main peak of an Altoboc correlation. There can be one or more secondary peaks beyond the main peak that have a different phase than the main peak.

In one embodiment, the synthesized set of punctual correlation outputs can be used to adjust a carrier phase lock loop, and a carrier phase for the carrier phase lock loop is generated with an error signal from a synthesized punctual correlation that averages multiple correlations so as to produce a carrier phase estimate with reduced carrier multipath than the multipath at a correlator between the early and late correlators. This averaging tends to favor the earlier correlations so as to produce a carrier phase estimate with reduced carrier multipath than the multipath at a correlator between the early and late correlators.

Further Aspects of Secondary Codephase Determination

As noted above, the different methods of secondary code phase determination can be used concurrently or in a sequence. This aspect will now be further described.

Two groups of methods of secondary codephase determination have been presented. The first group, called the single SV methods are the histogram method (see, e.g., FIG. 2) and the coherent FFT method (see, e.g., FIG. 3) and the differential coherent method (see, e.g., FIG. 6). Each SV is processed independently in the methods of the first group. The coherent FFT can be generalized as offset N with N=0, 1, 2, 3, 4 up to M−1 where M is the number of points in the secondary code sequence. The second group of methods are the transfer method (see, e.g., FIG. 5) and cross SV method (see, e.g., FIG. 4). These methods mix information across satellites (use multiple SVs are used) as well rely, in one embodiment, on additional information relating to receiver position and time. The labels for these methods (e.g., "histogram" for the method in FIG. 2) are used as a shorthand way of referring to a method described herein and are not intended to limit how the method is used or how claims are interpreted (e.g., a claim directed to the method of FIG. 2 does not require a histogram unless the claim explicitly includes the word "histogram").

The advantage of the first group is that the secondary codephase of each satellite is obtained independently from the other satellites, based solely on its input correlation sequence. The resulting atomic combination of the codephase, Doppler, secondary code and time tag provides fine-time information so that the secondary codephase can be propagated forward in time according to the expected change in codephase based on the carrier Doppler, which provides a codephase slope through the scale factor that relates carrier cycles to chips. This propagation can be used in embodiments in which secondary code phase measurements are discontinued after an initial secondary code phase acquisition. This measurement can be propagated forward in time until the uncertainty of the propagated codephase grows to more than 12 a millisecond, the length of one epoch in the secondary code sequence. Also, tracking of the satellite means the secondary code can be continuously re-anchored, even as the codephase wraps through the millisecond boundary, and either one millisecond higher or lower, depending on the direction of codephase. A decreasing codephase through 0 means the secondary codephase decreased by one, an increasing codephase through the end of the millisecond means the secondary codephase increased by one.

The single SV determined secondary codephase data (e.g., from one of the methods in FIG. 2, 3, or 6) also provides sub and super-millisecond timing information: the codephase provides fine time information less than a millisecond, and the secondary codephase provides course time information of more than millisecond up to the length of the pilot secondary sequence length.

The multiple SV group of secondary codephase determination methods are the cross-SV method (see, e.g., FIG. 4) and the transfer method (see, e.g., FIG. 5). These methods combine the correlation time series information of multiple satellites and they also rely on additional information: the receiver position and time estimates as well as satellite locations estimates at the estimated receiver time. The transfer method uses the single SV determined secondary codephase from one or more satellites through the receiver position and time estimates to the predict the secondary codephase for satellites who's timing information has not yet been determined. It can do this even when the receiver time uncertainty is much larger than the time information gained from the single SV methods. This is because it only needs to identify the modulo pilot length portion of the receiver time error. The time error larger that the pilot length has only a second order impact on the predicted secondary codephase.

The cross-SV method starts with the same position and timing information similar to the transfer method but without requiring a first single SV estimate. The purpose of the cross-SV method is to combine the correlation time series of multiple satellites to improve the overall detection probability with respect to the single SV probability. It does this by correlating the expected secondary codephase of a group of satellites based on a receiver time and position estimate against the correlation time series in a way that produces a higher SNR than would be achieved with a single SV.

The predicted secondary codephase (scStart) for each satellite based on a given receiver time of week (tow) and position is the integer portion of the remainder of the satellite time of week at transmission time in milliseconds divided by the length of the pilot secondary code sequence ("length" in the equations below). The formula is summarized below:

Note: based on the duality of solving at transmit or receive time, the problem could also be posed equivalently at receive time. Here, we choose transmission time.

The time of week at transmission (towT) is the receiver time of week minus the propagation from the satellite to the receiver:

towT(seconds)=receiver time of week at reception−
  pseudorange in seconds where pseudorange in seconds=pseudorange in meters/speed of light The satellite time of week in milliseconds is:

scTInt=integer(towT*1000)

The predicted secondary code phase is remainder of the division by the pilot length:

scPhase=remainder(towTInt/pilot secondary code length)

This represents the phase of the secondary code at the receiver time of week at reception. The phase at the next epoch will increment by one secondary code chip. The next start of when the sequence occurs, scStart, occurs in modulo time as:

scStart=length−(scPhase+1)

Define towTRemainder as sub-millisecond part of the millisecond time of week at transmission (towT):

towTRemainder=(towT*1000)−towTInt where towTRemainder is a fraction of msec from 0 to 1 msec The pseudorange in meters based on receiver time and position is:

pseudorange=geometric range+satellite clock bias−receiver clock bias+errors in space Define the pseudorange estimate with a receiver clock bias of zero as:

pseudorange0=geometric range+satellite clock bias+errors in space

When performing the transfer method, all the satellites that have a single SV secondary codephase estimate also have a primary codephase estimate. Assuming that receiver position error is less than +/−½ of a millisecond, or about 150 km, the receiver clock can be estimated as the residual of the measured codephase minus the sub-millisecond portion of the pseudorange where the receiver clock is zero.

Receiver clock bias($i$)=measured codephase($i$)−remainder(pseudorange0($i$)/299792.458 m)

Each bias(i) estimate is wrapped to be within +/−0.5*speed of light*0.001 meters.

If more than one satellite is available, then the bias is the average of all the biases.

Now that the receiver bias estimate is available, the measured and predicted secondary codephases can be compared to learn the receiver millisecond time error. Define offset(i) as the portion of the receiver time error that is modulo of the pilot secondary code sequence length.

Offset($i$)=measured secondary codephase($i$)−scStart($i$)

The best offset(i) is identified from the largest group of satellites that have most consistent offset(i)

The corrected scStart without time error is found by correcting the predicted scStart with the offset.

scStartCorr($i$)=scStart($i$)−offset($i$)

Note that if single SV secondary codephase estimates are only available from GPS satellites, which have a 20 msec pilot, then the secondary codephase scStart(i) can only be predicted for GPS satellites and not for the Galileo and BDS satellites that have longer pilot sequences.

The remainder term (towTRemainder) must be considered when assigning a confidence to the predicted secondary codephase scStart(i). If the remainder is very close to zero or very close to one, then the confidence is lower. The error of the position estimate impacts the accuracy of the scStart: as the position error grows, then the error of the predicted pseudorange grows, which impacts the time of transmission estimate, which impacts the predicted secondary codephase estimate.

The position uncertainty, also referred to as the position error standard deviation, or position sigma (sigmaPos), is translated into a millisecond time uncertainty threshold by converting from meters to milliseconds as follows:

sigmaMsec=sigmaPos/speed of light/1000

The confidence of the scStart is then assigned as follows;

--- if (towTRemainder < sigmaMsec)
    secondary code scStart is low confidence.
    Form two estimates: scStart0 and scStart1 = scStart1 + 1
Else if (towTRemainder > (1−sigmaMsec))
    secondary code scStart is low confidence.
    Form two estimates: scStart0 and scStart1 = scStart0 − 1
Else
    Secondary code scStart is high confidence

---

Maintaining the Predicted Secondary Code Phase (scStart) to Enable Continuous Transfer Method The transfer method (see, e.g., FIG. 5 and the description associated with FIG. 5) takes the measured scStart from one or more satellites and predicts the scStart for the remaining satellites. It is applicable at the time of measured secondary codephase. These measurements can also be propagated forward in time as long as the satellites are tracked periodically. A codephase, doppler and time tag are associated with the measured secondary codephase. The codephase is propagated forward in time according to the standard formula Codephase($t_1$)=codephase($t0$)+Doppler*(−1/wavelength)*($t_2-t_1$)

If the propagated codephase becomes larger than 1 msec of range, then this is a roll-over case and the scStart is incremented by 1 msec and 1 msec of range is removed from the codephase. Conversely, if the propagated codephase becomes less than zero, then this is a roll-under case and the scStart is decremented by 1 msec., and 1 msec of range is added to the codephase. In this way, the codephase can be maintained recursively where the new time $t_1$ becomes the previous time to.

Propagating the secondary codephase is a way to reduce power consumption, as generally once the secondary codephase is achieved, the predicted secondary code bits are applied to the correlation process and the correlation stream that still contains the secondary code modulation is not observable. Thus, continuing to measure secondary codephase requires an additional set of correlators, or maintaining partial sums of correlations before and after the primary epoch where the secondary code bits are changes, that additional registers to save the partial sums. Thus, the propagation enables an alternative method to maintain the secondary codephase without remeasuring (and hence the additional set of correlators may not be needed for secondary code phase measurements).

Note that these propagated secondary codephase measurements can be used even after fixing to predict the remaining satellite's secondary codephase.

Transfer Method when Fine Time is Available

Once tracking is started, it is possible to decode the navigation data stream on the data channel that is in phase quadrature with the pilot channel. The data channel symbols are synchronous with the pilot channel secondary codephase sequence. The data channel also has its own secondary codephase sequency inside each data symbol. This sequence must be removed to produce the data symbol. Fortunately, the data channel secondary code sequence start can be easily determined from the pilot secondary code sequence. A block phase estimator time aligned to the data symbol is employed to estimate the pilot carrier phase, which is removed from the data channel carrier phase to produce a data symbol. These decoded data symbols are processed according to the interface control documents to produce the navigation message with include a time stamp at transmission time of the first bit of a data frame. The time of reception is obtained by propagating the time stamp by the time of transmission which can be associated with the receiver time at which the first bit was received. This process is well known. Such a process allows the super-millisecond time error in the receiver to be estimated and corrected. At this point, the transfer method is no longer needed as the estimated scPhase and scStart can be directly estimated without the need to be corrected with the measured secondary codephase. However, even with nearly perfect time and position estimates, there can still be an ambiguity in the predicted secondary codephase. The occurrence of the ambiguity is rare as the position and timer error is reduced. The occurrence increases as the position and time error increases.

Note that when the super millisecond time error is reduced to zero, that is, when fine time is achieved, the offset computed using the transfer method should be zero, providing confidence that the time has been set properly.

Observation about an Ambiguity

An ambiguity (in predicted secondary code phase) has been observed to occur when the remainder term is close to zero or to one. In general, this occurs when the predicted pseudorange is close to being an integer number of milliseconds.

Here is an example of a set of satellites where the system time error is one msec. Three GNSS systems are shown. The predicted scStart is shown in column scStart0. The measured is in column "meas". The offset is one for all SVs except BDS 29 which is off by 2 due to the ambiguity near zero. The receiver position error is small. Analysis showed that the ambiguity was due to the nearly identical clock bias between the satellite and receiver for this satellite.

| system | prn | scStart0 | meas | offset | towTRemainder | svClockBias | RcvrClockBias | diffMeters | diffMsec |
|---|---|---|---|---|---|---|---|---|---|
| GPS | 1 | 5 | 6 | 1 | 0.12051 | −7911.5 | 19076.5 | −26988.0 | −0.09002 |
| GPS | 8 | 14 | 15 | 1 | 0.53729 | −43514.4 | 19076.5 | −62590.9 | −0.20878 |
| GPS | 10 | 14 | 15 | 1 | 0.47645 | 10234.4 | 19076.5 | −8842.1 | −0.02949 |
| GPS | 14 | 9 | 10 | 1 | 0.82025 | −23589.6 | 19076.5 | −42666.1 | −0.14232 |
| GPS | 18 | 18 | 19 | 1 | 0.76160 | 17063.0 | 19075.5 | −2013.4 | −0.00672 |
| GPS | 27 | 13 | 14 | 1 | 0.79253 | −42709.9 | 19076.5 | −61786.4 | −0.20610 |
| GPS | 30 | 10 | 11 | 1 | 0.36989 | −33745.0 | 19076.5 | −52821.5 | −0.17619 |
| GPS | 32 | 5 | 6 | 1 | 0.50492 | −20732.4 | 19076.5 | −39808.8 | −0.13279 |
| GAL | 30 | 9 | 10 | 1 | 0.42385 | 1450397.3 | 19076.5 | 1431320.8 | 4.77437 |
| GAL | 9 | 5 | 6 | 1 | 0.49516 | 1926715.5 | 19076.5 | 1507639.1 | 6.36320 |
| GAL | 3 | 15 | 16 | 1 | 0.04804 | −51194.1 | 19076.5 | −70270.5 | −0.23440 |
| GAL | 5 | 8 | 9 | 1 | 0.08123 | −143984.2 | 19076.5 | −163060.7 | −0.54391 |
| GAL | 21 | 18 | 19 | 1 | 0.52626 | −160710.5 | 19076.5 | −179787.0 | −0.59970 |
| GAL | 27 | 11 | 12 | 1 | 0.59567 | 138306.2 | 19076.5 | 119229.7 | 0.39771 |
| GAL | 36 | 11 | 12 | 1 | 0.16569 | 211964.4 | 19076.5 | 192887.9 | 0.64340 |
| GAL | 15 | 7 | 8 | 1 | 0.61541 | 272500.4 | 19076.5 | 253423.9 | 0.84533 |
| BDS | 16 | 55 | 56 | 1 | 0.39870 | −251372.8 | 19076.5 | −270449.3 | −0.90212 |
| BDS | 35 | 14 | 15 | 1 | 0.30654 | 15479.3 | 19076.5 | −3597.2 | −0.01200 |
| BDS | 20 | 3 | 4 | 1 | 0.36043 | 61631.4 | 19076.5 | 42554.9 | 0.14195 |
| BDS | 27 | 10 | 11 | 1 | 0.94506 | 37314.3 | 19076.5 | 18237.8 | 0.06083 |
| BDS | 29 | 99 | 1 | 2 | 0.00579 | 20813.6 | 19076.5 | 1737.2 | 0.00579 |
| BDS | 30 | 97 | 98 | 1 | 0.15896 | 39138.6 | 19076.5 | 20062.2 | 0.06692 |
| BOS | 32 | 0 | 1 | 1 | 0.02810 | −272294.8 | 19076.5 | −291371.3 | −0.97191 |
| BDS | 26 | 12 | 13 | 1 | 0.33474 | 76990.9 | 19076.5 | 57914.4 | 0.19318 |

The first outcome of the confidence is that a measured single SV with low confidence cannot be used as a measurement for the offset determination unless it is corroborated by another higher confidence measurements. The second outcome is that the scStart has an ambiguity and the satellite is forced to either determine the secondary codephase with one of the single SV methods, or to use the estimate but with an additional two stage initialization. The baseline estimate is labelled as scStart0 and a second estimate, scStart1, is formed based on the remainder. If the remainder is close to zero, then the second secondary codephase estimate is taken as the scStart0 minus 1 (and is wrapped to N-one, where N is the secondary code length if the computed estimate is zero). If the remainder is close to one, then the second secondary codephase estimate is taken as the scStart0 plus one (and is wrapped to 0 is the estimated secondary codephase is N−1, where N is the secondary code length).

The two candidates can be tested on a time series of correlations of between 20 and 100 msec. The correct one should have significantly higher coherent integration than the incorrect one.

As another information gain from the single SV method, if the single SV method passed using the DFT methods and produced a confident frequency error estimate, then the clock drift can be estimated with the corrected Doppler candidates from the primary code determination. Define drift as the time rate of change of the receiver clock bias in meters per second.

Range Rate=$d/dt$ geometric range+satellite drift−receiver drift

Predicted range rate0=$d/dt$ geometric range+satellite drift

DriftEstimate($i$)=measured Doppler($i$) in Hz*(−wavelength(m))−Predicted range rate0

If more than one satellite is available, then the drift is the average of all DriftEstimate(i) into a final global drift estimate driftEstimate:

Doppler($i$)=$d/dt$ geometric range+satellite drift+driftEstimate

This predicted Doppler is adopted immediately for satellites that are in the secondary code determination state, that is, satellites that did not complete the single SV methods, generally because they have a weak signal strength. The search candidate Doppler is overtaken by the estimated Doppler(i) and the satellite moves the to tracking state.

Irrespective of how the Doppler candidate was corrected by the single SV frequency error estimate, the steady state tracking methods will remove the secondary codephase by applying the estimated secondary code sequency to the correlation time series. Before commencing conventional closed or open loop tracking, a conventional DFT methods can be applied to the correlation time series with the secondary codephase removed to remove any remaining Doppler error in the estimated Doppler. For example, a DFT can be applied to a sequence of 20 one-millisecond correlations to perform a frequency error estimate with a range of +/−500 hz. The resolution will be 1000 Hz/20=50 Hz, with a max of 25 hz. Interpolation can reduce the frequency error below 25 Hz which is required for initializing a 50-Hz PLL or AFC carrier tracking loop. Alternatively, zero-padding a 64 point FFT can reduce the frequency resolution to 1000/64=28 Hz and a max error of 14 Hz.

Example of Combined Secondary Code Methods

Figure 10A:
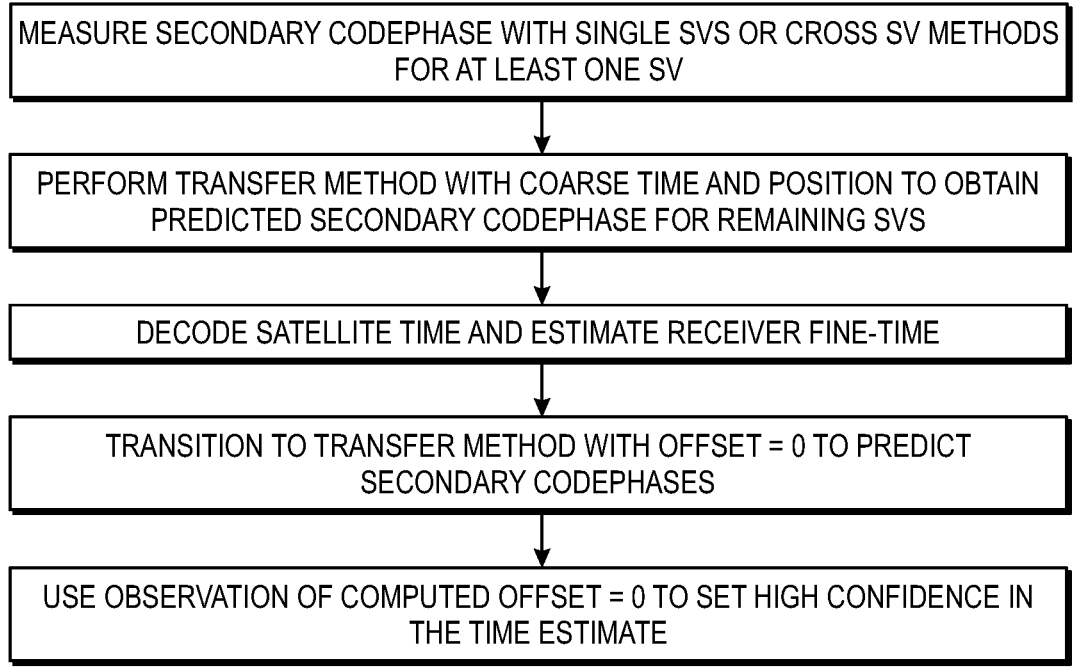
FIG. 10A is a flowchart that shows a general example of a method to acquire secondary code phases using a combination of the methods described herein.
Figure 10B:
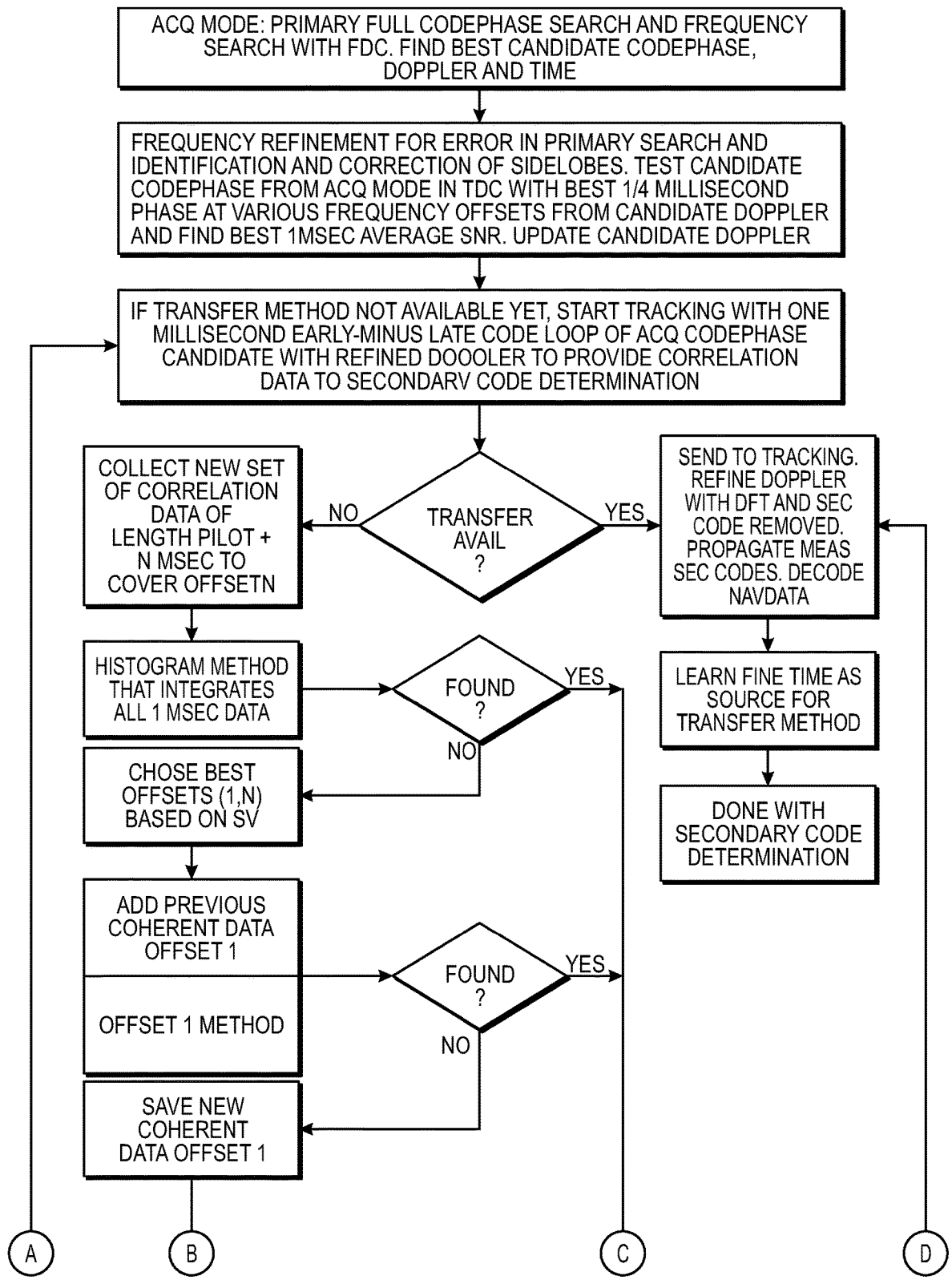
FIG. 10B is a flowchart that shows a more detailed method to acquire secondary code phases using a combination of the methods described herein.
Figure 10B:
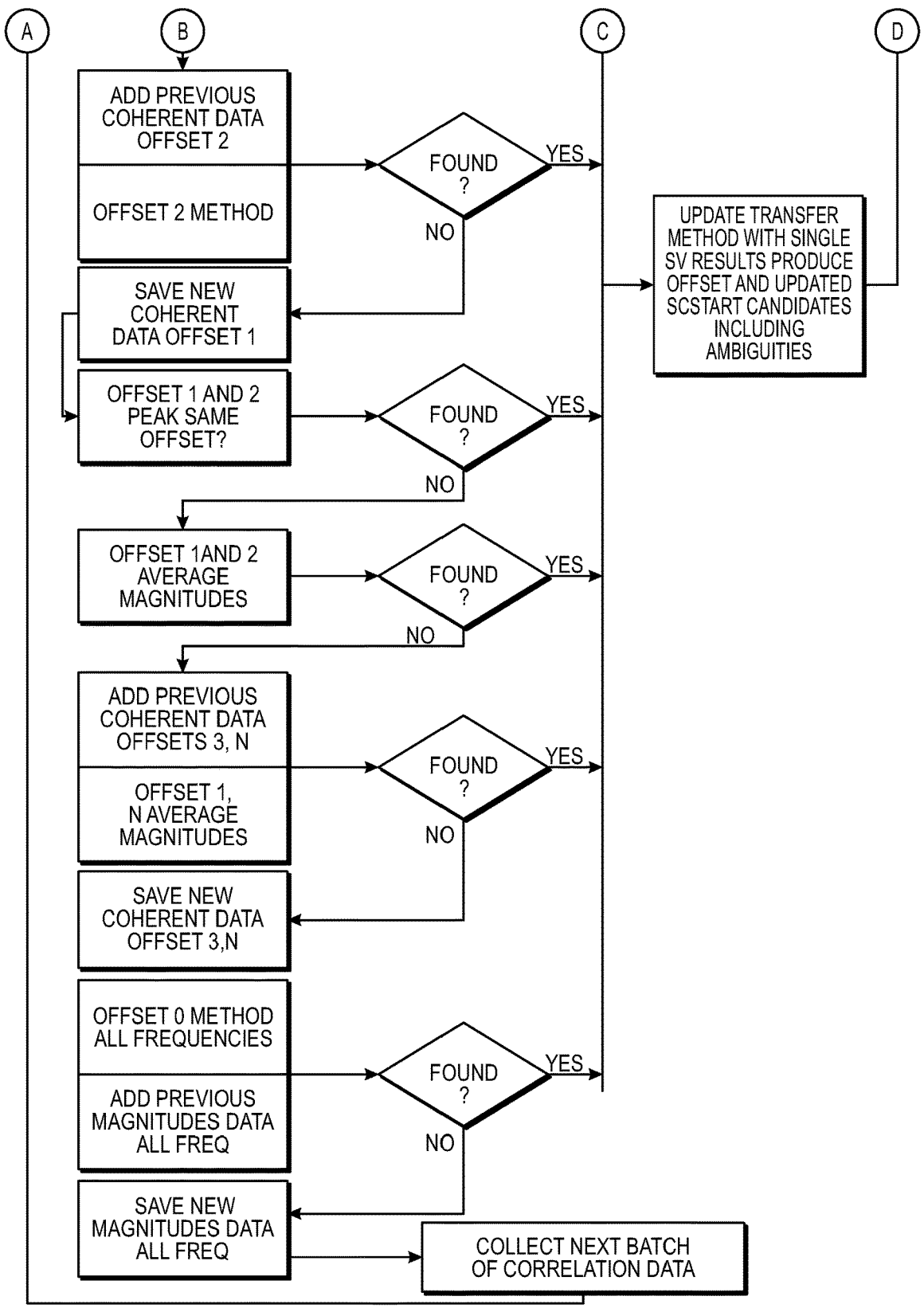

FIG. 10A shows an example of a general method that uses a combination of the secondary code phase determination methods described herein (e.g., a combination of two or more of the methods shown in FIGS. 2, 3, 4, 5 and 6). The method in FIG. 10A can use a specific, predetermined sequence of such methods (e.g., a method according to FIG. 2 or FIG. 6 followed by a method according to FIG. 5 followed by another method according to FIG. 5 based upon decoded time from a GNSS SV's signal(s)). In an initial operation in FIG. 10A, a GNSS receiver can measure secondary code phase with a single SV (e.g., using a method based upon one of the methods shown in FIG. 2, 3 or 6) or multiple SVs (e.g., using a method based upon one of the methods shown in FIG. 4 or 5). Next in the method shown in FIG. 10A, the GNSS receiver can use a method based on FIG. 5 using the available coarse time and estimated position of the GNSS receiver to obtain predicted secondary code phase for a set of remaining SVs (for which secondary code phase has not yet been acquired). Next in the method in FIG. 10A, the GNSS receiver can decode a satellite time message (indicating satellite time) that is received from an GNSS SV and then estimate fine time at the GNSS receiver (using techniques known in the art); the fine time has a desired uncertainty in one embodiment of less than 0.5 msec. At this point, with an estimated fine time, the GNSS receiver can transition to a transfer method based upon a method in FIG. 5 with an offset=0 to predict secondary code phases for satellites for which secondary code phases have not been successfully acquired. The transition to an offset=0 can allow the GNSS receiver to set its time estimate to a high confidence level and tracking can begin using all primary codes that have had their secondary code phases successfully acquired.

Acquisition (ACQ)

The following description includes a method that is performed by a GNSS receiver and shown in FIG. 10B. The method shown in FIG. 10B can use a single SV method (e.g., a histogram method or a differential coherent method shown in FIG. 6) in conjunction with a transfer method (see, e.g., FIG. 5). For example, the single SV method can use a method based on FIG. 6 followed by a transfer method, and the differential coherent method can be repeated over time with different offsets before using the transfer method to complete the acquisition of secondary code phases. In another embodiment, the method can begin with a histogram method followed by a method based on FIG. 6 (and the method based on FIG. 6 can be repeated with different delays, such as an offset of 1 delay followed by an offset of 2 delays) and then a histogram method can be used to finish the secondary phase acquisition process for any SVs that do not have acquired secondary code phases from the prior methods.

Acquisition starts with the primary code search using frequency domain correlation (FDC). This method searches the full PN code range (1 msec) efficiently with frequency steps as large as, in one embodiment, 500 Hz for short non-coherent integrations such as 20 msec, and frequency step sizes down to 200 Hz for longer non-coherent integrations such as 1 second. Typically, a range of +/−1 PPM is searched. At L5, 1 PPM is about 1192 Hz, so the number of search bins is reasonable for each SV: 5 for the 500 Hz steps, and 13 for the 200 Hz steps. The complete range of the frequency uncertainty is searched quickly with a short integration time to identify the main lobe of the sin X/X frequency response for strong signals. The non-coherent amplitude sum with the best SNR=10*log 10((peakAmplitude$^2$−noiseAmplitudeAvg$^2$)/noiseAmplitudeVariance)

across all codes and frequencies search is compared to the detection threshold of 16 dB to test for signal found. If the signal is not found, then the integration time is increased to improve sensitivity.

A detection yields a primary code phase and a Doppler candidate referenced to the start of the search that is propagated coherently during the acquisition. With enough HW search capability, the short searches can be operated in parallel with the longer searches to avoid cases where the more sensitive longer integration finds declare signal found on a sidelobe of the sin X/X frequency response. The sidelobes are at least 13 dB higher and should be found quickly with the faster search. In cases when the true signal is blocked, and when the frequency search is larger than coherent search bandwidth it is possible that even with full frequency scans, the strongest observed signal candidate can be off the main lobe of the sin X/X frequency response. The sidelobes of the sin X/X function for the 1 msec coherent integration time of the FDC are at +/−N kHz, where N=1, 2,3. Thus, if the frequency search is larger than 1 kHz or if the center of the frequency window is in error by more than 1 kHz, the frequency search will contain sidelobes.

The observed peak of the frequency search may not occur at the true frequency due to the interaction of the two conditions: first that the secondary code bi-phase modulation can occur at each epoch of the primary code and second that the primary codephase for all SVs is uniformly distributed across the range of millisecond sample data used in the FDC. For a codephase epoch at ¼ offset from the start of the millisecond, half the power is lost at the secondary code transition leading a modulation in correlation amplitude. But a frequency error provides a degree of freedom to change the sign of the correlation over the millisecond correlation, effectively un-flipping the rotation caused by the secondary code change so that the resulting correlation energy is higher with a frequency error. Frequency offsets of +/−250 Hz, and +/−500 Hz are common depending on the distance of the primary code epoch and millisecond, depending on the number of components used in the FDC and how often there are transitions.

Frequency Refinement

These frequency offsets complicate the secondary codephase acquisition. Better alignment of the codephase and the millisecond will reduce the energy lost at the secondary code change. Thus, the time domain correlation method (TDC) has the ability to select a from one of four millisecond sample stream, each one at an increasing offset, quantized in quarters, from the start of the millisecond time base used in the FDC. The system firmware of a GNSS receiver in one embodiment can select the offset to minimize the time offset between primary codephase epoch and ends of the chosen millisecond. Using this improved phasing, a secondary frequency is performed using a small set of TDC correlators centered around the codephase and Doppler candidate from the primary code search. The time domain correlation method (TDC) is well suited for this purpose: a bank of 20 codephases separated by ½ chip is used to integrate a period similar to the integration used to obtain the candidate.

A similar non-coherent one millisecond amplitude sum is formed at each code tap. The frequency is searched around the candidate Doppler in steps of +/−250 Hz and +/−500 Hz. Such a frequency search will further reduce the frequency error associated with the Doppler candidate. Interpolation of the frequency information can also be used to further minimize the frequency error prior to starting the secondary codephase determination. This process reduces frequency error but does not eliminate the need for handling frequency error in the secondary codephase determination process. As a sidelobe search, which is a search for a signal at least 13 dB higher, then a similar method is used, for example searching+/−750 Hz, +/−1000 Hz but with an integration duration that smaller by the factor that would produce 13 dB of processing gain. If the signal was found at 200 msec of integration, then the side lobe search would be the integration time T that solves this equation, assuming worst case of 1.5 dB processing gain for each doubling of the integration time 13 dB=1.5 db*log 2(200 msec/T). T=200/2$^{(13/1.5)}$ (msec)=0.0049 msec. Even a 1 msec integration would be sufficient to find the main lobe for a 200 msec detected signal. For one second, less than 3 msec are required.

Secondary Code Acquisition State

Secondary codephase commences with a primary code phase and a Doppler candidate having been determined. For weaker signals, it is necessary, in one embodiment, to observe multiple repetitions of the pilot secondary code sequence. In this case, it is necessary to be able to track the codephase during this period to avoid losing the signal and provide the secondary codephase determination process with correlation data that contains the signal. Tracking is necessary to avoid propagation error associated with the Doppler error of the signal candidate. For example, with 500 Hz error, the code doppler will cause the signal candidate to move 1½ chip sample in a time found by solving (29.3/2 m=500 Hz/115 cycles/chip*29.3 m/chip*dt), dt=0.115 seconds. This means the signal will be lost propagating with the wrong doppler in about 100 msec. One solution is a delay lock loop formed using 2 or 3 correlators centered around the codephase estimate to track the signals. As the correlators are changing sign to the due to the secondary code with unknown phase, longer coherent correlations require more care and are problematic. A non-coherent sum of early minus late correlators with one chip separation allows acceptable tracking around punctual correlator used to provide the one millisecond correlations to the secondary codephase estimation. Another solution is a band of correlators. In bank of 20 codephase taps with 1%2 chip spacing, with the candidate codephase in the center, has a range of about 150 m and can contain the signal with propagation with a frequency error of 500 Hz for about 10 times higher than the single correlator case described above: 1.15 seconds. In this case, the strongest code tap must be identified and used to provide the one millisecond correlations to the secondary code determination.

Secondary Code Determination Methods

As a summary of secondary codephase determination, the methods presented fall into two groups: the first group contains the single SV methods, the second group contains the multiple SV methods. The single SV methods can be used jointly in a manner that is optimized to find the strongest signals with lower frequency error quickly with the least computation, while handling the weaker signals and the maximum possible frequency error.

Histogram

The histogram method (see, e.g., the method in FIG. 2) works quickly for shorter secondary code length, such as for GPS L5, with medium frequency error range of +/−250 Hz. This histogram method is implemented with mainly integer computation after forming the cosine of the phase change of a complex correlators (real,imag) from millisecond to millisecond as real(k)*real(k−1)+imag(k)*imag(k−1). The sensitivity of this histogram method is not as good as the DFT based method in FIG. 6, but has the advantage of allowing continuous integration into the histogram to improve sensitivity progressively at the expense of increasing the computation complexity or memory usage.

If this histogram method passes (successfully acquires secondary code phases), it is assumed that the frequency error is small enough to be determined in a step before starting to track with the secondary code removed. The secondary code phase acquisition process is then terminated.

Offset-1 Using Differential Coherent Method

The DFT based offset-1 method (using a differential coherent method such as a method based on FIG. 6) provides a sensitivity improvement for the longer codes and is insensitive to frequency error up to +/−500 Hz. It requires 3 DFTs, one for the input single-epoch correlation time-series, one for the secondary code sequence, and one inverse DFT (which is the circular correlation of the input and secondary code sequence) for the complex product of the two spectrums. Define the magnitude as the envelope of each term of the inverse DFT results, i.e., the square root of sum of squares of real and imaginary part at each point.

If this offset-1 method passes, meaning peak SNR passes a threshold, the estimated secondary codephase is applied to the input epoch correlation time series and the DFT with post detection interpolation is to identify the frequency error of the input series. The secondary code phase acquisition process is then terminated.

Offset-2

If the offset-1 method does not pass (e.g., the offset-1 method does not successfully acquire secondary code phases), then the DFT offset method (e.g., a method based on FIG. 6) is repeated with but with offset-2 as this has a different noise floor than offset-1. If this method passes, the estimated secondary codephase is applied to the input epoch correlation time series and the DFT with post detection interpolation is used to identify the frequency error of the input series. The process is then terminated.

Offset 1-2 Same Peak

If both offset-1 and offset-2 methods fail, but if the strongest candidate of both methods is the same, and the sum of their SNRs is above a threshold, then this is declared a pass, the estimated secondary codephase is applied to the input epoch correlation time series and the DFT with post detection interpolation is used to identify the frequency error of the input series. The secondary code phase acquisition process is then terminated.

Offset 1-2 Magnitude Sum

If the offset1- and offset-2 methods fail, then their inverse DFT magnitudes are averaged, and the peak SNR is compared to a threshold. This method takes advantage of the fact that the auto correlations are different and can yield a non-coherent processing gain. If this method passes, meaning peak SNR passes a threshold, the estimated secondary codephase is applied to the input epoch correlation time series and the DFT with post detection interpolation is used to identify the frequency error of the input series. The secondary code phase acquisition process is then terminated.

Offset 1-N, Magnitude Sum

If the average of the offset-1 and offset-2 inverse DFT magnitudes fails, the more offsets, such as offset-3 and offset-4 can be computed and the inverse DFT magnitudes are averaged with the previous average of the offset-1 and offset-2. If this method passes, meaning peak SNR passes a threshold, the estimated secondary codephase is applied to the input epoch correlation time series and the DFT with post detection interpolation is used to identify the frequency error of the input series. The process is then terminated.

Offset 0, all Frequencies

If the average for the four offsets fails, then final the offset 0 method is performed over all frequencies covered by the DFT. Note that the frequencies are obtained as shift of the DFT of secondary code spectrum followed by a complex product of the input spectrum and the shifted secondary code spectrum. In this way, each frequency requires only one additional DFT. The frequency step is the sample frequency of the input sequency divided by the number of bins of the DFT=1000 Hz/100=10 Hz, so the range of frequency is +/−500 Hz in 10 Hz steps. Interpolation or a zero padded FFT with more bins yields a finder step. If this method passes, meaning peak SNR passes a threshold, then the frequency is with the interpolated with the adjacent frequencies at best secondary code phase. The process is then terminated.

All Fail, Save Memory for Next Batch

If the offset 0 method fails, then memory is saved until a new set of input complex correlation for the pilot range are available. For the offset methods (1,2,3,4) the memories saved are the complex delay multiply sequences as these represent cosine and the sine of the phase change across the millisecond. This allows coherent averaging prior to forming the input sequency spectrum that provides the best processing gain. For the offset-0 frequencies, the inverse DFT magnitudes are saved and provide a non-coherent processing gain. For the offset-1,2,3,4 magnitude sums, the memories saved are the magnitudes sums, and are included in the subsequent magnitude averages, yielding a non-coherent processing gain.

Special Case with GPS

Note that offsets greater than 0 can have a higher noise floor than offset 0. For the longer pilot codes of GAL and BDS, the resulting noise floor is improved with respect to the offset 0 case by averaging magnitudes of enough offsets >0 since the auto-correlation sequence at each phase away from the peak is different for each offset, enabling averaging. For the short pilot codes like GPS, there is one peak offset at half the length that is common to all offset that is not reduced by averaging. The result is a higher noise floor than the offset-0 noise floor. While this cannot be minimized, it was found that judicious selection of offsets can lead to reduction of the noise floor at all offsets except the half length offset. In some cases, then the $2^{nd}$ peak is detected at exactly half the length from the peak, it may be possible to lower the noise floor by removing this peak when the $1^{st}$ peak and $2^{nd}$ have the expected ratio, effectively allowing a lower SNR to pass. Another solution is simple declare that there is an ambiguity and require the tracking to test both candidates and detect which has the best coherent SNR when applying the secondary codephase.

Generalizing the Offsets

Some offset combinations are better than others. Thus, the best offset combinations can be precomputed and stored in a table for each secondary code for each system.

While this description has focused on GNSS SVs and GNSS signals from GNSS SVs, the embodiments described herein can also be used with GNSS-like signals from terrestrial (e.g., ground based) transmitters of GNSS-like signals, such as pseudolites ("pseudo-satellite"). Thus, the embodiments described herein can be used in systems that use such terrestrial transmitters and receivers designed to receive and process GNSS-like signals from such terrestrial transmitters. The phrase "GNSS signals" will be understood to include such GNSS-like signals, and the phrase "GNSS SVs" will be understood to include such terrestrial transmitters.

EXEMPLARY EMBODIMENTS

The following text presents numbered embodiments in claim like format, and it will be understood that these embodiments may be presented as claims in one or more future filings, such as one or more continuation or divisional applications. Although separate embodiments are described in detail below, however, it is appreciated that these embodiments may be combined or modified, in part or in whole. At least some of these numbered embodiments were presented as claims in a prior provisional application. For some of the embodiments listed below, only method embodiments/claims are presented below, but it will be understood that these embodiments/claims can also be in the form of apparatuses such as GNSS receivers, components of GNSS receivers, and non-transitory machine readable media that store executable program instructions which when executed by one or more processing systems cause the one or more processing systems to perform one or more of these methods presented in this list of embodiments and elsewhere in this disclosure.

Embodiment 1. A system for processing L5 wideband frequency GNSS signals, the system comprising:
an analog to digital converter (ADC) to generate a digital representation of received GNSS signals in an L5 wideband GNSS frequency band;
a baseband sample memory to store the digital representation of the received GNSS signals, the baseband sample memory coupled to the ADC;
a GNSS processing system coupled to the baseband sample memory to process the digital representation of the received GNSS signals, the GNSS processing system configured to acquire code phases of one or more secondary codes of one or more GNSS signal components of L5 wideband GNSS signals without using L1 GNSS signals to acquire the code phases of one or more secondary codes of one or more GNSS signal components of L5 wideband GNSS signals.

Embodiment 2. The system as in embodiment 1, wherein the system includes only a single GNSS antenna tuned to a frequency in the L5 wideband frequency band and wherein the system does not receive and does not acquire L1 GNSS signals.

Embodiment 3. The system as in embodiment 1, wherein the GNSS processing system acquires the code phases of the one or more secondary codes after acquiring one or more primary codes of the GNSS signal components but before narrowband tracking of the GNSS signal components.

Embodiment 4. The system as in embodiment 3, wherein the GNSS processing system acquires the code phases of the one or more secondary codes while a time uncertainty exceeds 0.5 milliseconds.

Embodiment 5. The system as in embodiment 4, wherein an estimated error for current time exceeds 1 millisecond prior to acquiring the code phases of the one or more secondary codes.

Embodiment 6. The system as in embodiment 3, wherein a code phase of a first secondary code in the one or more secondary codes is acquired by using multiple GNSS signal components in L5 wideband GNSS signals from a single GNSS satellite.

Embodiment 7. The system as in embodiment 6, wherein the multiple GNSS signal components comprise a GNSS sideband A signal and a GNSS sideband B signal.

Embodiment 8. The system as in embodiment 3, wherein a code phase of a first secondary code in the one or more secondary codes is acquired by using multiple GNSS signals from multiple GNSS satellites.

Embodiment 9. The system as in embodiment 8, wherein the multiple GNSS satellites comprise at least two satellites from at least one of: a Galileo E5 constellation of GNSS satellites; or an L5 GPS constellation of GNSS satellites; or a Glonass K2 constellation of GNSS satellites; or a QZSS constellation of GNSS satellites; or a Beidou B2 constellation of GNSS satellites.

Embodiment 10. The system as in embodiment 4, the system further comprising:
a radio frequency (RF) receiver that comprises at least a first RF filter that is tuned to only a frequency in the L5 wideband frequency band to receive L5 wideband GNSS signals, and the first RF filter is coupled to the single GNSS antenna, and wherein the system does not use L1 GNSS signals to determine time information or frequency information and wherein the system does not track L1 GNSS signals.

Embodiment 11. The system as in embodiment 1, wherein the GNSS processing system detects angular phase changes between successive primary code epochs, the GNSS processing system comprising a frequency lock loop (FLL), the phase changes detected from in-phase and quadrature results of correlation outputs in the GNSS processing system; and wherein the GNSS processing system averages the phase changes detected from the in-phase and quadrature results of correlation outputs to produce an estimated frequency error; and wherein the GNSS processing system provides a compensated frequency, based on the estimated frequency error, to one or more discriminators of the FLL, the FLL configured to reduce error in estimations of frequency of received L5 GNSS signals based on the estimated frequency error.

Embodiment 12. The system as in embodiment 11 wherein the FLL comprises a first discriminator for a first sideband of L5 GNSS signals and a second discriminator for a second sideband of L5 GNSS signals, and wherein the estimated frequency error is a filtered estimate based on the averages of the phase changes detected from the in-phase and quadrature results of correlation outputs.

Embodiment 13. The system as in embodiment 12 the averaging comprises averaging phase changes detected over two, three, or four GNSS signal components from a single GNSS satellite.

Embodiment 14. The system as in embodiment 13 wherein the FLL detects the phase changes between successive primary code epochs.

Embodiment 15. A method of operating a GNSS receiver, the method comprising:
acquiring one or more primary codes of received L5 GNSS signals;
determining, for each transition between received primary code epochs in each of the one or more primary codes of the received L5 GNSS signals, a phase change value for each L5 GNSS signal, wherein a set of phase change values in a sequence over time is determined;
storing the set of phase change values in a data structure;
comparing the set of phase change values in the data structure to a set of expected phase change values derived from one or more secondary codes associated with the one or more primary codes from one or more GNSS satellites, wherein these primary and secondary codes are further associated with a uniquely identified GNSS satellite and its signal transmissions;
determining, from the comparison, one or more code phases of the one or more secondary codes.

Embodiment 16. The method as in embodiment 15, wherein the method further comprises:
performing, after a primary code phase and an associated secondary code phase have been determined for components of one of the received L5 GNSS signals, narrowband tracking operations on at least one of the components of the received L5 GNSS signals;
determining, based on one or more outputs from the tracking operations, one or more position solutions.

Embodiment 17. The method as in embodiment 16, wherein each phase change value represents an indication of a change in phase of the secondary code associated with the primary code from the GNSS satellite that transmitted the primary code, and wherein the acquisition of the primary code comprises determining a code phase of the primary code.

Embodiment 18. The method as in embodiment 17 wherein the method further comprises:
cross checking determined secondary code phases from different channels of L5 GNSS signals from the same GNSS satellite.

Embodiment 19. The method as in embodiment 17, wherein the stored set of phase change values comprise phase change values for different primary codes from different channels of L5 GNSS signals from the same GNSS satellite, and wherein the different channels comprise an A channel on an A sideband and a B channel on a B sideband and wherein the comparing uses the phase change values from the different channels to derive a comparison output that is used to determine one or more secondary code phases.

Embodiment 20. The method as in embodiment 17, wherein the set of expected phase change values are derived from a secondary code by transforming the secondary code into a sequence of phase change values, across epochs in the secondary code, over a set of index values in the data structure.

Embodiment 21. The method as in embodiment 17, wherein the determining of the phase change values comprises computing a cosine of a value at each transition between two consecutive primary code epochs.

Embodiment 22. The method as in embodiment 17, wherein the method further comprises:
estimating one or more frequencies of the one or more primary codes of the received L5 GNSS signals.

Embodiment 23. The method as in embodiment 22, wherein the method further comprises detecting a frequency error across a bank of correlators using a code phase trajectory across the bank of correlators, and resetting data in the data structure.

Embodiment 24. The method as in embodiment 22, wherein the method further comprises:
predicting code Doppler slope from a discriminator trajectory over time, the discriminatory trajectory being an output from a discriminator in a code tracking loop;
estimating a frequency error based on the predicted code Doppler slope;
detecting secondary code phase from phase change values associated with primary codes at a frequency offset determined by the estimated frequency error.

Embodiment 25. The method as in embodiment 22, wherein the method further comprises:
performing a first set of correlation operations on primary codes at a first frequency offset from a center frequency to determine phase change values at the first frequency offset;
performing a second set of correlation operations on primary codes at a secondary frequency offset from the center frequency to determine phase change values at the second frequency offset.

Embodiment 26. The method as in embodiment 17, wherein the method further comprises:
determining a time uncertainty value, wherein if the time uncertainty value is less than 0.5 milliseconds, then ending the method.

Embodiment 27. The method as in embodiment 17, wherein the method further comprises:
determining if the phase change values are faulty due to frequency error and resetting the data structure if the phase change values are faulty.

Embodiment 28. The method as in embodiment 17, wherein the method further comprises:
determining, for each phase change value in at least a subset of the phase change values in the data structure, a confidence value based on a signal to noise ratio associated with each phase change value and storing the confidence values in the data structure.

Embodiment 29. The method as in embodiment 17, wherein the data structure is a set of histograms, with at least one histogram per channel of L5 GNSS signals from a particular GNSS satellite, wherein the stored set of phase change values comprise phase change values for the two orthogonal data and pilot signal components on the same band of the same satellite and wherein the comparing uses the phase change values from these data and pilot components to derive a comparison output that is used to determine one or more secondary code phases.

Embodiment 30. A method of operating a GNSS receiver, the method comprising:
receiving GNSS signals from a GNSS satellite containing a first set of secondary codes and a first set of primary codes, the first set of secondary codes including at least a first secondary code having a first length in bits and a second secondary code having a second length in bits, the first length being greater than the second length;
correlating coherently, in a first correlation operation, a first set of the received GNSS signals with locally generated secondary codes corresponding to the first set of secondary codes, the first correlation operation extending over the first length of the first set of received GNSS signals, and the first correlation operation correlating coherently over a set of possible code phase hypotheses and over a set of frequencies;
correlating coherently, in a second correlation operation, a second set of the received GNSS signals with the locally generated secondary codes corresponding to the first set of secondary codes, the second correlation operation extending over the first length of the second set of received GNSS signals, and the second correlation operation correlating coherently over the set of possible code phase hypotheses and over the set of frequencies;
combining results from the first correlation operation with results from the second correlation operation;

determining from the combined results one or more secondary code phases for the first set of secondary codes.

Embodiment 31. The method as in embodiment 30, wherein the first correlation operation and the second correlation operation are performed using discrete Fourier transforms.

Embodiment 32. The method as in embodiment 30 wherein the first correlation operation and the second correlation operation are performed using hardware correlators.

Embodiment 33. The method as in embodiment 30 wherein the first set of secondary codes comprise four secondary codes for four components of GNSS signals from the GNSS satellite.

Embodiment 34. The method as in embodiment 30 wherein the first correlation operation is coherent over the first length for the first set of secondary codes and wherein the second correlation operation is coherent over the first length for the second set of the received GNSS signals which are received from the GNSS satellite after receiving the first set of received GNSS signals from the GNSS satellite.

Embodiment 35. The method as in embodiment 30 wherein the combining integrates non-coherently the results from the first correlation operation with results from the second correlation operation.

Embodiment 36. The method as in embodiment 31, wherein the method further comprises:
sorting integrated results within each frequency to select highest magnitude value in the results.

Embodiment 37. The method as in embodiment 30, wherein the first correlation operation includes correlating the first set of the received GNSS signals with locally generated primary codes corresponding to the first set of secondary codes, and wherein the second correlation operation includes correlating the second set of the received GNSS signals with the locally generated primary codes corresponding to the first set of secondary codes.

Embodiment 38. The method as in embodiment 35, wherein the combining integrates the magnitude of the results and wherein the code phase of the longest secondary code is determined from the integrated results.

Embodiment 39. The method as in embodiment 30, wherein the set of frequencies are separated by a minimum step size and wherein an improved frequency estimate for one or more channels is further determined.

Embodiment 40. A method of operating a GNSS receiver, the method comprising:
acquiring, over multiple primary code epochs, primary code phases of a plurality of GNSS signals from a plurality of GNSS satellites of at least one GNSS constellation, the acquisition producing a set of correlation values over a set of time intervals of the multiple primary code epochs for the plurality of GNSS satellites, such that for each time interval there are a plurality of correlation values specifying the acquired primary code phases from the plurality of GNSS satellites;
evaluating, within each time interval in the set of time intervals, the plurality of correlation values in one of the time intervals to determine a pattern of values, derived from the plurality of correlation values in the time interval, that maximizes a sum of the plurality of correlation values;
determining, based on the plurality of GNSS satellites for which primary code phases have been acquired, an expected sequence of phase reversals for secondary codes associated with the primary code phases that have been acquired, the expected sequence determined over the set of time intervals;
comparing each determined pattern of values for one of the time intervals with the expected sequence of phase reversals for the secondary codes;
determining, from the comparison, one or more code phases for the secondary codes.

Embodiment 41. The method as in embodiment 40, wherein a set of discrete Fourier transforms are used to acquire the primary code phases.

Embodiment 42. The method as in embodiment 40, wherein the plurality of GNSS satellites are from only one GNSS constellation.

Embodiment 43. The method as in embodiment 40, wherein the plurality of GNSS satellites are from a plurality of GNSS constellations.

Embodiment 44. The method as in embodiment 40, wherein the comparison determines a plurality of code phases for the secondary codes by considering relative delay information across the received GNSS signals from different GNSS satellites and wherein the comparison concurrently determines, at once for all of the different GNSS satellites, the plurality of code phases for the secondary codes.

Embodiment 45. The method as in embodiment 40, wherein the method further comprises:
determining whether the set of intervals is sufficiently large to provide reliable determination of the one or more code phases for the secondary codes.

Embodiment 46. The method as in embodiment 40, wherein the method further comprises:
verifying for a next interval after the set of intervals the one or more secondary codes.

Embodiment 47. The method as in embodiment 40, wherein the method further comprises:
performing, after a primary code phase and an associated secondary code phase have been determined for components of one of the received GNSS signals, tracking operations on at least one of the components of the received GNSS signals;
determining, based on one or more outputs from the tracking operations, one or more position solutions.

Embodiment 48. A method for operating a modernized GNSS receiver during a tracking mode of operation, the method comprising:
generating a sample clock having a sample clock frequency;
generating a set of correlation outputs that include a set of early correlation outputs at the sample clock frequency and a set of late correlation outputs at the sample clock frequency;
synthesizing a set of punctual correlation outputs from at least one of: (a) the set of early correlation outputs or (b) the set of late correlation outputs.

Embodiment 49. The method as in embodiment 48, wherein the set of punctual correlation outputs is synthesized during the tracking mode of operation.

Embodiment 50. The method as in embodiment 49, wherein the synthesized set of punctual correlation outputs is used as an error signal for a discriminator to adjust a carrier phase lock loop to lock to a carrier phase of a GNSS signal.

Embodiment 51. The method as in embodiment 49, wherein no local punctual code is generated in the GNSS receiver during the tracking mode and no set of punctual correlation outputs is created in a correlator in the GNSS receiver.

Embodiment 52. The method as in embodiment 49, wherein the synthesized set of punctual correlation outputs is used to estimate signal power to normalize a discriminator of a delay lock loop.

Embodiment 53. The method as in embodiment 49, wherein a spacing in time between samples for successive early and late correlation outputs for a GNSS signal is a single sample clock separation that is less than a chip in the GNSS signal.

Embodiment 54. The method as in embodiment 53, wherein the sample clock frequency is less than a factor of 3 times an L5 chipping rate of 10.23 MHz.

Embodiment 55. The method as in embodiment 53, wherein the spacing is a narrowed code delay that reduces multipath error while maintaining a frequency of the sample frequency clock at less than a factor of 4 times an L5 chipping rate of 10.23 MHz.

Embodiment 56. The method as in embodiment 49, wherein the set of early correlation outputs are a set of very early correlation outputs, and wherein, if a GNSS signal is strong, the synthesized set of punctual correlation outputs is synthesized by multiplying the set of very early correlation outputs by a factor greater than 1.

Embodiment 57. The method as in embodiment 49, wherein the synthesizing comprises computing a product of a scale factor and a sum of early and late correlation outputs.

Embodiment 58. The method as in embodiment 57, wherein the scale factor is computed to produce, for each synthesized punctual correlation output, a synthesized punctual correlation output that has the same amplitude as a true punctual correlation output when early and late correlation outputs are balanced.

Embodiment 59. The method as in embodiment 49, wherein the set of early correlation outputs comprises a set of very early correlation outputs and early correlation outputs, and the set of late correlation outputs comprises a set of very late correlation outputs and late correlation outputs, and wherein the synthesizing comprises averaging, for each synthesized punctual correlation output, a very early correlation output, an early correlation output, a late correlation output, and a very late correlation output.

Embodiment 60. The method as in embodiment 49, wherein the set of early correlation outputs comprises a set of very early correlation outputs and early correlation outputs, and wherein the synthesizing comprises averaging, for each synthesized punctual correlation output, a very early correlation output and an early correlation output.

Embodiment 61. The method as in embodiment 49, wherein the set of punctual correlation outputs is synthesized for an Altboc formatted signal in a C channel, of GNSS signals.

Embodiment 62. The method as in embodiment 61 wherein the set of punctual correlation outputs uses known predetermined phase offsets between correlators that are beyond a main peak of an Altboc correlation.

Embodiment 63. The method as in embodiment 62, wherein one or more secondary peaks beyond the main peak have a different phase than the main peak.

Embodiment 64. The method as in embodiment 49, wherein the synthesized set of punctual correlation outputs is used to adjust a carrier phase lock loop and a carrier phase for the carrier phase lock loop is generated with a synthesized punctual correlation that averages multiple correlators so as to produce a carrier phase estimate with reduced carrier multipath than the multipath at a correlator between the early and late correlators.

Embodiment 65. The method as in embodiment 49, wherein the synthesized set of punctual correlation outputs is used to adjust a carrier phase lock loop and a carrier phase for the carrier phase lock loop is generated with a synthesized punctual correlation that averages multiple correlators that favor the earlier correlators so as to produce a carrier phase estimate with reduced carrier multipath than the multipath at a correlator between the early and late correlators.

Embodiment 66. A method of operating a GNSS receiver, the method comprising:
determining a secondary code phase of a received GNSS signal from a first GNSS satellite;
determining a difference between the determined secondary code phase of the received GNSS signal from the first GNSS satellite and a predicted secondary code phase of a received GNSS signal from a second GNSS satellite which is different than the first GNSS satellite;
correcting the predicted secondary code phase based on the determined difference.

Embodiment 67. The method as in embodiment 66, wherein the method further comprises:
determining additional secondary code phases of other received GNSS signals from other GNSS satellites;
determining additional differences between the determined additional secondary code phases and the predicted secondary code phase; and
wherein the correcting is based on the determined difference and the additional differences.

Embodiment 68. The method as in embodiment 66, wherein the correcting comprises (1) comparing the determined difference to a fraction of a code length in time of an epoch of the secondary code and (2) (a) adding the code length in time to the determined difference if the determined difference is less than the fraction and wrapping a result of the addition within a range of possible values in milliseconds of the code length or (b) subtracting the code length in time from the determined difference if the determined difference is more than the fraction and wrapping a result of the subtraction within a range of possible values in milliseconds of the code length.

Embodiment 69. The method as in embodiment 67, wherein the correcting is based on the highest likelihood difference among the determined difference and the additional differences.

Embodiment 70. The method as in embodiment 66, wherein the method further comprises:
using the corrected secondary code phase for the second GNSS satellite to wipe the secondary code from the received GNSS signal from the second GNSS satellite to allow coherent integration of a primary code from the second GNSS satellite.

Embodiment 71. The method as in embodiment 66, wherein the method further comprises:

determining a position solution for the GNSS receiver from a plurality of GNSS satellites including the first GNSS satellite but not the second GNSS satellite prior to correcting the predicted secondary code phase.

Embodiment 72. A method of operating a GNSS receiver, the method comprising:
receiving GNSS signals containing one or more primary codes and one or more secondary codes from a GNSS satellite;
generating, from the received GNSS signals, a set of first correlation outputs from an acquisition correlation process that operates on the received GNSS signals, the first correlation outputs including secondary code correlation cycles, over time, of the one or more secondary codes;
locally generating a set of one or more expected secondary code sequences, over time, of the one or more secondary codes;
computing a differential secondary code sequence based on the locally generated set of one or more expected secondary code sequences;
computing a set of differential correlation samples based on the first correlation outputs and a complex conjugate of each of the first correlation outputs;
correlating the set of differential correlation samples against the differential secondary sequence code to provide a set of second correlation outputs;
determining, from the set of second correlation outputs one or more secondary code phases of the one or more secondary codes.

Embodiment 73. The method as in embodiment 72, wherein the differential secondary code sequence is computed based on a product of an expected secondary code sequence and a delayed version of the expected secondary code sequence and wherein the differential correlation samples are based on a product of the set of first correlation outputs and a delayed version of the first set of correlation outputs.

Embodiment 74. The method as in embodiment 73, wherein the delayed version is delayed by a fraction of one or more primary code epochs.

Embodiment 75. The method as in embodiment 73, wherein the delayed version is delayed by a nonzero integer multiple of one bit in the secondary code.

Embodiment 76. The method as in embodiment 73, wherein the first correlation outputs provide complex data that comprises real part data and imaginary part data, and the complex conjugation operates on the imaginary part data.

Embodiment 77. The method as in embodiment 73, wherein the correlating is performed over a plurality of secondary code epochs.

Embodiment 78. The method as in embodiment 73, wherein the set of second correlation outputs includes a value of a real part of a peak, and the secondary code phase is determined from one of an absolute value of the real part, a magnitude of the correlation output, and a squared-magnitude of the correlation output.

Embodiment 79. The method as in embodiment 73, wherein the correlating is performed with one or more discrete Fourier transforms.

Embodiment 80. The method as in embodiment 79, wherein the correlating comprises: circularly cross correlating the set of differential correlation samples against the differential secondary code sequence.

Embodiment 81. The method as in embodiment 79, wherein the correlating comprises:
computing a discrete Fourier transform of the set of differential correlation samples to produce a first set of results;
computing a discrete Fourier transform of the differential secondary code sequence to produce a second set of results;
multiplying the first set of results by a complex conjugate of the second set of results to produce a first product;
computing an inverse discrete Fourier transform of the first product.

Embodiment 82. The method as in embodiment 73, wherein the method further comprises:
correlating a set of differential correlation samples against a further delayed differential secondary code, based on the determined set of one or more expected secondary code sequences, to provide a set of third set of correlation outputs that is used to check the set of second correlation outputs.

Embodiment 83. The method as in embodiment 82 wherein the set of differential correlation samples used to construct the third set of correlation outputs uses a different delay than that used to construct the second set of correlation outputs.

Embodiment 84. The method as in embodiment 30 wherein the combining integrates coherently the results from the first correlation operation with results from the second correlation operation, wherein an optimal phase offset is determined and applied for the coherent duration before said coherent combining.

Embodiment 85. The method as in embodiment 82 in which the second set of correlation outputs and the third set of correlation outputs are combined to produce a correlation output with higher fidelity.

Embodiment 86. The method of embodiment 85 in which the combining is one of (A) coherent combining by addition or (B) incoherent combining by addition with the latter done by either adding the magnitudes or squared magnitudes of the second and third sets of correlation outputs.

Embodiment 87. The method of embodiment 86 in which additional sets of correlation outputs are formed in the same manner as that producing the second and third sets and in which the delays used in forming each of the sets are different from one another.

Embodiment 88. The method of embodiment 74 in which the differential secondary code and the differential correlation samples used the same delays in their construction.

Embodiment 89. The method of embodiment 72, wherein if the determining of the one or more secondary code phases is unsuccessful or otherwise inadequate, then:
computing at least one additional differential secondary code sequence based on the locally generated set of one or more expected secondary code sequences;
computing at least one additional set of differential correlation samples based on the first correlation outputs and a complex conjugate of each of the first correlation outputs;
correlating the at least one additional set of differential correlation samples against the at least one additional differential secondary sequence codes to provide additional sets of correlation outputs;
determining, from the set of second correlation outputs and the additional sets of correlation outputs one or more secondary code phases of the one or more secondary codes.

Embodiment 90. The method of embodiment 89, wherein the differential correlation samples and the differential secondary code sequences used to form different sets of correlation outputs, employ delays in their construction, and wherein the delays for the different sets of correlation outputs differ from one another.

Embodiment 91. The method of embodiment 90, wherein the second correlation outputs and additional sets of correlation outputs are combined by addition of one of their magnitudes and their squared magnitudes, and wherein the combination is examined to determine the secondary code phases.

Embodiment 92. The method of embodiment 89, wherein the differential correlation samples and the differential secondary code sequences are computed using a first delay, and the wherein the additional differential correlation samples and the additional differential secondary code sequences are computed using a second delay that is different than the first delay.

Embodiment 93. The method of embodiment 89, wherein the differential secondary code sequence is computed based on a product of an expected secondary code sequence and a first delayed version of the expected secondary code sequence and wherein the differential correlation samples are based on a product of the set of first correlation outputs and a first delayed version of the first set of correlation outputs, and the additional differential secondary code sequence is computed based on a product of an expected secondary code sequence and a second delayed version of the expected secondary code sequence and wherein the additional differential correlation samples are based on a product of the set of first correlation outputs and a second delayed version of the first set of correlation outputs, and the first delayed version has a first delay and the second delayed version has a second delay that is different than the first delay.

Embodiment 94. A method of operating a GNSS receiver, the method comprising:
receiving GNSS signals containing one or more primary codes and one or more secondary codes from a plurality of GNSS satellites;
acquiring one or more primary codes in the received GNSS signals to identify at least some of the plurality of GNSS satellites;
determining a secondary code phase of at least a first set of the received one or more secondary codes using a first method after acquiring the one or more primary codes;
determining a secondary code phase of at least a second set of the received one or more secondary codes using a second method after the first method is used to determine the secondary code phase of at least the first set, the second method being different than the first method.

Embodiment 95. The method as in embodiment 94, wherein the first method is a method according to embodiment 15 and the second method is a method according to one of: (a) a method according to embodiment 30 or (b) a method according to embodiment 66.

Embodiment 96. The method as in embodiment 94, wherein the method further comprises:
determining a secondary code phase of at least a third set of the received one or more secondary codes using a third method.

Embodiment 97. The method as in embodiment 96, wherein the first method is a method according to embodiment 15, and the second method is a method according to embodiment 30 or embodiment 72, and the third method is a method according to embodiment 66.

Embodiment 98. The method as in embodiment 94 wherein the first method operates on GNSS signals from a single GNSS satellite and the second method operates on GNSS signals from multiple GNSS satellites.

Embodiment 99. The method as in embodiment 98 wherein the first method is one of: (a) a method according to embodiment 15 or (b) a method according to embodiment 30 or (c) a method according to embodiment 72; and the second method is one of: (a) a method according to embodiment 66 or (b) a method according to embodiment 40.

Embodiment 100. The method as in embodiment 98, wherein the method further comprises:
propagating a determined secondary code phase from the first method for use after secondary code phase measurements are not available in the GNSS receiver for the first set.

Embodiment 101. The method as in embodiment 99, wherein the second method initially uses coarse time and position to predict secondary code phase; and after satellite time is decoded from a GNSS signal and the GNSS receiver generates a fine time estimate at the GNSS receiver the second method is used again to predict secondary code phase for one or more secondary codes that have not been acquired.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method of operating a Global Navigation Satellite System (GNSS) receiver, the method comprising:
receiving GNSS signals containing one or more primary codes and one or more secondary codes from a GNSS satellite;
generating, from the received GNSS signals, a set of first correlation outputs from an acquisition correlation process that operates on the received GNSS signals, the first correlation outputs including secondary code correlation cycles, over time, of the one or more secondary codes;
locally generating a set of one or more expected secondary code sequences, over time, of the one or more secondary codes;
computing a differential secondary code sequence based on the locally generated set of one or more expected secondary code sequences;
computing a set of differential correlation samples based on the first correlation outputs and a complex conjugate of each of the first correlation outputs;
correlating the set of differential correlation samples against the differential secondary sequence code to provide a set of second correlation outputs;
determining, from the set of second correlation outputs one or more secondary code phases of the one or more secondary codes.

2. The method as in claim 1, wherein the differential secondary code sequence is computed based on a product of an expected secondary code sequence and a delayed version of the expected secondary code sequence and wherein the differential correlation samples are based on a product of the set of first correlation outputs and a delayed version of the first set of correlation outputs.

3. The method as in claim 2, wherein the delayed version is delayed by a fraction of one or more primary code epochs.

4. The method as in claim 2, wherein the delayed version is delayed by a nonzero integer multiple of one bit in the secondary code.

5. The method as in claim 2, wherein the first correlation outputs provide complex data that comprises real part data and imaginary part data, and the complex conjugation operates on the imaginary part data.

6. The method as in claim 2, wherein the correlating is performed over a plurality of secondary code epochs.

7. The method as in claim 2, wherein the set of second correlation outputs includes a value of a real part of a peak, and the secondary code phase is determined from one of an absolute value of the real part, a magnitude of the correlation output, and a squared-magnitude of the correlation output.

8. The method as in claim 2, wherein the correlating is performed with one or more discrete Fourier transforms.

9. The method as in claim 8, wherein the correlating comprises:
circularly cross correlating the set of differential correlation samples against the differential secondary code sequence.

10. The method as in claim 8, wherein the correlating comprises:
computing a discrete Fourier transform of the set of differential correlation samples to produce a first set of results;
computing a discrete Fourier transform of the differential secondary code sequence to produce a second set of results;
multiplying the first set of results by a complex conjugate of the second set of results to produce a first product;
computing an inverse discrete Fourier transform of the first product.

11. The method as in claim 2, wherein the method further comprises:
correlating a set of differential correlation samples against a further delayed differential secondary code, based on the determined set of one or more expected secondary code sequences, to provide a set of third set of correlation outputs that is used to check the set of second correlation outputs.

12. The method as in claim 11 wherein the set of differential correlation samples used to construct the third set of correlation outputs uses a different delay than that used to construct the second set of correlation outputs.

13. The method as in claim 11 in which the second set of correlation outputs and the third set of correlation outputs are combined to produce a correlation output with higher fidelity.

14. The method of claim 13 in which the combining is one of (A) coherent combining by addition or (B) incoherent combining by addition with the latter done by either adding the magnitudes or squared magnitudes of the second and third sets of correlation outputs.

15. The method of claim 14 in which additional sets of correlation outputs are formed in the same manner as that producing the second and third sets and in which the delays used in forming each of the sets are different from one another.

16. The method of claim 3 in which the differential secondary code and the differential correlation samples used the same delays in their construction.

17. The method of claim 1, wherein if the determining of the one or more secondary code phases is unsuccessful or otherwise inadequate, then:
computing at least one additional differential secondary code sequence based on the locally generated set of one or more expected secondary code sequences;
computing at least one additional set of differential correlation samples based on the first correlation outputs and a complex conjugate of each of the first correlation outputs;
correlating the at least one additional set of differential correlation samples against the at least one additional differential secondary sequence codes to provide additional sets of correlation outputs;
determining, from the set of second correlation outputs and the additional sets of correlation outputs one or more secondary code phases of the one or more secondary codes.

18. The method of claim 17, wherein the differential correlation samples and the differential secondary code sequences used to form different sets of correlation outputs, employ delays in their construction, and wherein the delays for the different sets of correlation outputs differ from one another.

19. The method of claim 18, wherein the second correlation outputs and additional sets of correlation outputs are combined by addition of one of their magnitudes and their squared magnitudes, and wherein the combination is examined to determine the secondary code phases.

20. The method of claim 17, wherein the differential correlation samples and the differential secondary code sequences are computed using a first delay, and wherein the additional differential correlation samples and the additional differential secondary code sequences are computed using a second delay that is different than the first delay.

21. The method of claim 17, wherein the differential secondary code sequence is computed based on a product of an expected secondary code sequence and a first delayed version of the expected secondary code sequence and wherein the differential correlation samples are based on a product of the set of first correlation outputs and a first delayed version of the first set of correlation outputs, and the additional differential secondary code sequence is computed based on a product of an expected secondary code sequence and a second delayed version of the expected secondary code sequence and wherein the additional differential correlation samples are based on a product of the set of first correlation outputs and a second delayed version of the first set of correlation outputs, and the first delayed version has a first delay and the second delayed version has a second delay that is different than the first delay.

* * * * *